US007682246B2

(12) United States Patent
Cregan et al.

(10) Patent No.: US 7,682,246 B2
(45) Date of Patent: Mar. 23, 2010

(54) GAMING DEVICE AND METHOD HAVING FREE ACTIVATION MODE AND FREE ACTIVATION MODE WITH FREE ACTIVATION RETRIGGER

(75) Inventors: Karen M. Cregan, Kirrawee (AU); Anthony J. Baerlocher, Reno, NV (US); Ryan W. Cuddy, Reno, NV (US); Erick T. Ching, Reno, NV (US); Jasonlee Kissee Hohman, Sparks, NV (US)

(73) Assignee: IGT, Reno, NV (US)

(*) Notice: Subject to any disclaimer, the term of this patent is extended or adjusted under 35 U.S.C. 154(b) by 1238 days.

(21) Appl. No.: 11/217,182

(22) Filed: Sep. 1, 2005

(65) Prior Publication Data

US 2006/0068885 A1 Mar. 30, 2006

Related U.S. Application Data

(63) Continuation-in-part of application No. 10/661,443, filed on Sep. 12, 2003, now Pat. No. 7,074,127, which is a continuation-in-part of application No. 10/241, 255, filed on Sep. 11, 2002, now Pat. No. 7,056,213.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ............................ 463/25; 463/17; 463/18; 463/19; 463/20

(58) Field of Classification Search ............. 463/17–20
See application file for complete search history.

(56) References Cited

U.S. PATENT DOCUMENTS

| | | | | |
|---|---|---|---|---|
| 4,198,052 A | | 4/1980 | Gauselmann | |
| 4,281,835 A | * | 8/1981 | Seiden | 273/299 |

(Continued)

FOREIGN PATENT DOCUMENTS

| | | |
|---|---|---|
| AU | 564342 | 8/1987 |
| AU | 564355 | 10/1987 |

(Continued)

OTHER PUBLICATIONS

Williams Jackpot Stampede Deluxe Slot Machine Dotmation game description, written by WMS, printed from http:// www.pinrepair.com/slots/wms/jackstam.htm on Jun. 30, 2009, available in 1998.

(Continued)

*Primary Examiner*—John M Hotaling
*Assistant Examiner*—Kevin Y Kim
(74) *Attorney, Agent, or Firm*—K&L Gates LLP

(57) ABSTRACT

A gaming device including a free activation mode having a predetermined number of free activations wherein the probability of extending the free activation mode is increased by a triggering event which triggers an unlimited number of free activations. A termination event terminates the unlimited fee activations. A freezing event freezes the number of remaining free activations. A resetting event resets the number of remaining free activations. A locking event causes at least one symbol or at least one card to remain unchanged or lock during the unlimited free activations. The gaming device generates a plurality of symbols while not changing the locked symbol or re-deals the remaining cards an unlimited number of times until a termination event occurs.

29 Claims, 41 Drawing Sheets

U.S. PATENT DOCUMENTS 4,448,419 A 5/1984 Telnaes
4,838,552 A 6/1989 Hagiwara
4,991,848 A 2/1991 Greenwood et al.
5,016,879 A * 5/1991 Parker et al. ............ 273/126 A
5,085,436 A 2/1992 Bennett
5,102,134 A 4/1992 Smyth
5,308,065 A 5/1994 Bridgeman et al.
5,332,228 A 7/1994 Schultz
5,342,049 A 8/1994 Wichinsky et al.
5,393,057 A 2/1995 Marnell, II
5,393,061 A 2/1995 Manship et al.
5,407,200 A 4/1995 Zalabak
5,423,539 A 6/1995 Nagao
5,431,408 A 7/1995 Adams
5,449,173 A 9/1995 Thomas et al.
5,542,669 A 8/1996 Charron et al.
5,560,603 A 10/1996 Seelig et al.
5,569,084 A 10/1996 Nicastro et al.
5,647,798 A 7/1997 Falciglia
5,722,891 A 3/1998 Inoue
5,772,506 A 6/1998 Marks et al.
5,775,692 A 7/1998 Watts et al.
5,810,361 A 9/1998 Kadlic
5,823,873 A 10/1998 Moody
5,833,537 A 11/1998 Barrie
5,851,149 A * 12/1998 Xidos et al. ................... 463/42
5,855,514 A 1/1999 Kamille
5,918,880 A 7/1999 Voigt, IV et al.
5,935,002 A 8/1999 Falciglia
5,964,463 A 10/1999 Moore, Jr.
5,971,849 A 10/1999 Falciglia
5,988,638 A 11/1999 Rodesch et al.
6,003,867 A 12/1999 Rodesch et al.
6,004,207 A 12/1999 Wilson, Jr. et al.
6,012,982 A 1/2000 Piechowiak et al.
6,033,307 A 3/2000 Vancura
6,059,289 A 5/2000 Vancura
6,059,658 A 5/2000 Mangano et al.
6,089,977 A 7/2000 Bennett
6,102,400 A 8/2000 Scott et al.
6,120,031 A 9/2000 Adams
6,142,873 A 11/2000 Weiss et al.
6,142,874 A 11/2000 Kodachi et al.
6,142,875 A 11/2000 Kodachi et al.
6,155,925 A 12/2000 Giobbi et al.
6,159,095 A 12/2000 Frohm et al.
6,159,096 A 12/2000 Yoseloff
6,159,097 A 12/2000 Gura
6,173,955 B1 1/2001 Perrie et al.
6,174,233 B1 1/2001 Sunaga et al.
6,186,894 B1 2/2001 Mayeroff
6,190,254 B1 2/2001 Bennett
6,203,429 B1 3/2001 Demar et al.
6,213,874 B1 * 4/2001 Heflin ......................... 463/17
6,220,959 B1 4/2001 Holmes, Jr. et al.
6,224,483 B1 5/2001 Mayeroff
6,231,442 B1 5/2001 Mayeroff
6,231,445 B1 5/2001 Acres
6,234,897 B1 5/2001 Frohm et al.
6,251,013 B1 6/2001 Bennett
6,270,409 B1 8/2001 Shuster
6,270,411 B1 8/2001 Gura et al.
6,290,600 B1 9/2001 Glasson
6,299,165 B1 10/2001 Nagano
6,299,170 B1 10/2001 Yoseloff
6,302,398 B1 10/2001 Vecchio
6,305,686 B1 10/2001 Perrie et al.
6,311,976 B1 11/2001 Yoseloff et al.
6,312,334 B1 11/2001 Yoseloff
6,315,660 B1 11/2001 DeMar et al.
6,315,663 B1 11/2001 Sakamoto
6,315,665 B1 * 11/2001 Faith .......................... 463/23
6,319,124 B1 11/2001 Baerlocher et al.
6,322,078 B1 11/2001 Adams
6,336,860 B1 1/2002 Webb
6,340,158 B2 1/2002 Price et al.
6,358,144 B1 3/2002 Kaddlic et al.
6,364,768 B1 4/2002 Acres et al.
6,375,570 B1 4/2002 Poole
6,394,902 B1 5/2002 Glavich et al.
6,398,218 B1 6/2002 Vancura
6,398,644 B1 6/2002 Perrie et al.
6,413,162 B1 7/2002 Baerlocher et al.
6,419,579 B1 7/2002 Bennett
6,439,943 B1 8/2002 Aoki et al.
6,439,993 B1 8/2002 O'Halloran
6,443,452 B1 9/2002 Brune
6,454,266 B1 9/2002 Breeding et al.
6,461,241 B1 10/2002 Webb et al.
6,471,208 B2 10/2002 Yoseloff et al.
6,481,713 B2 11/2002 Perrie et al.
6,491,584 B2 12/2002 Graham et al.
6,494,454 B2 12/2002 Adams
6,537,150 B1 3/2003 Luciano et al.
6,537,152 B2 3/2003 Seelig et al.
6,561,904 B2 5/2003 Locke et al.
6,565,436 B1 5/2003 Baerlocher
6,602,137 B2 8/2003 Kaminkow et al.
6,604,740 B1 8/2003 Singer et al.
6,616,142 B2 9/2003 Adams
6,632,139 B1 10/2003 Baerlocher
6,632,140 B2 10/2003 Berman et al.
6,641,477 B1 11/2003 Dietz, II
6,712,694 B1 3/2004 Nordman
6,733,389 B2 5/2004 Webb et al.
6,805,349 B2 10/2004 Baerlocher et al.
6,869,360 B2 3/2005 Marks et al.
6,905,406 B2 6/2005 Kaminkow et al.
6,913,532 B2 7/2005 Baerlocher et al.
6,921,335 B2 7/2005 Rodgers et al.
6,955,600 B2 10/2005 Glavich et al.
7,066,814 B2 6/2006 Glavich et al.
7,169,042 B2 1/2007 Muir et al.
7,235,011 B2 6/2007 Randall et al.
7,258,611 B2 8/2007 Bigelow, Jr. et al.
7,322,887 B2 1/2008 Belger et al.
7,331,862 B2 2/2008 Rodgers et al.
7,331,866 B2 2/2008 Rodgers et al.
7,331,867 B2 2/2008 Baerlocher et al.
7,399,225 B2 7/2008 Kaminkow
7,473,174 B2 1/2009 Cuddy et al.
7,481,708 B2 1/2009 Baerlocher et al.
7,513,826 B2 4/2009 Cuddy
2001/0009865 A1 7/2001 Demar et al.
2002/0010017 A1 1/2002 Bennett
2002/0039918 A1 * 4/2002 Anderson et al. ............. 463/16
2002/0082076 A1 * 6/2002 Roser et al. ................... 463/25
2003/0060272 A1 3/2003 Glavich et al.
2003/0064783 A1 * 4/2003 Baerlocher et al. ............ 463/20
2003/0069062 A1 4/2003 Shimizu
2003/0073483 A1 4/2003 Glavich et al.
2003/0162585 A1 8/2003 Bigelow et al.
2003/0203753 A1 10/2003 Muir et al.
2004/0002372 A1 1/2004 Rodgers et al.
2004/0038731 A1 2/2004 Englman
2004/0048652 A1 3/2004 Ching et al.
2004/0053666 A1 3/2004 Vancura
2004/0053669 A1 3/2004 Gerrard et al.
2004/0053672 A1 3/2004 Baerlocher
2004/0072612 A1 4/2004 Rodgers et al.
2004/0137982 A1 7/2004 Cuddy et al.
2004/0147306 A1 7/2004 Randall et al.
2004/0266516 A1 12/2004 Thomas
2004/0266517 A1 12/2004 Bleich et al.

| | | | |
|---|---|---|---|
| 2005/0049035 A1 | 3/2005 | Baerlocher et al. |
| 2005/0070354 A1 | 3/2005 | Baerlocher et al. |
| 2005/0075163 A1 | 4/2005 | Cuddy et al. |
| 2005/0233801 A1 | 10/2005 | Baerlocher et al. |
| 2005/0266917 A1 | 12/2005 | Glavich et al. |
| 2006/0246989 A1 | 11/2006 | Glavich et al. |

FOREIGN PATENT DOCUMENTS

| | | | |
|---|---|---|---|
| AU | B-13331/88 | | 9/1988 |
| AU | 199717601 | B2 | 9/1997 |
| AU | 199917318 | A1 | 9/1999 |
| EP | 0 874 337 | A1 | 10/1998 |
| EP | 0 981 119 | A2 | 2/2000 |
| EP | 0984408 | A2 | 3/2000 |
| EP | 1 513 117 | A2 | 3/2005 |
| GB | 2 322 217 | A | 8/1998 |
| WO | WO 9732285 | | 9/1997 |
| WO | WO 00/32286 | | 6/2000 |
| WO | WO 00/66235 | | 11/2000 |
| WO | WO 00/76606 | | 12/2000 |
| WO | WO 01/26019 | A1 | 4/2001 |
| WO | WO 2004/025584 | A2 | 3/2004 |

OTHER PUBLICATIONS

Williams Jackpot Stampede Slot Machine game description, written by WMS, printed from http://www.pinrepair.com/slots/wms/jpstamp.htm on Jun. 30, 2009, available in 1995.
Fishin' Buddies Article published in Strictly Slots/Anchor Games, published in Apr. 2001.
Gold Exchange, Advertisement written by Bally Gaming Systems, available in 2005.
Happy Camper Advertisement written by IGT, published in 2001.
Hot Shot, Advertisement written by Atronic Casino Technology, Ltd., published in 2000.
Inca Sun Article published in Strictly Slots by Aristocrat, published in Apr. 2002.
Introducing the "Smiling Ape" Machine Advertisement (including Joker's Wild Poker description) written by IGT, published prior to 2001.
Jackpot Party Brochure and Articles written by WMS Gaming, Inc, published in 1988.
Joker's Wild Advertisement written by IGT, published prior to 2001.
Jumping Jackpots Advertisement written by Atronic Casino Technology, Ltd., published in 2003.
Kismet, Advertisement written by Atronic Casino Technology, Ltd., published in 2004.
The Latest Buzz Article written by Bally Gaming Systems, published in Fall 2000.
Little Green Men, Jr. Advertisement written by A.C. Coin and Slot Services Company, published prior to 2002.
Loco Loot Article written by Strictly Slots/Aristocrat Leisure Industries, PTY Ltd., published in May 2002.
Money in the Bank, Advertisement by Konami Gaming, published in Jun. 2001.
Mountain Money Article written by Strictly Slots/Aristocrat Leisure Industries, PTY Ltd., published in Jun. 2002.
On the House Advertisement written by Olympic Video Gaming, published prior to 2002.
Penguin Pays Advertisement written by Aristocrat Incorporated, published in 1998.
Reel Magic™ Gaming Machine Description written by IGT, available in 1986.
Break the Spell Article written by Strictly Slots/Atronic Casino Technology, Ltd., published in Sep. 2000.
Break the Spell Atronic Web Page, published in Jan. 2001.
Break the Spell Brochure, published in 1999.
Cash Chameleon Article written by Strictly Slots/Aristocrat Leisure Industries, PTY Ltd., published in Apr. 2001.
Cast Aways, Article in Strictly Slots written by Atronic Casino Technology, Ltd., published in Dec. 2000.
Catch a Wave Advertisement written by IGT, published in Dec. 2000.
Cheesy Money, Advertisement written by Atronic Casino Technology, Ltd., published in 2004.
Cossack Dance Advertisement written by Olympic Video Gaming, published prior to 2002.
Dam Lumberjack Beavers, Advertisement written by IGT, published in 2004.
Deep Blue Dollars, Article in Strictly Slots written by Atronic Casino Technology, Ltd., published in Jun. 2004.
Dolphin Treasure Advertisement written by Aristocrat Leisure Industries PTY., Ltd., published in 1996.
Double Diamond Line Advertisement written by Bally Gaming Systems, published in 2000.
Dream Maker, Advertisement written by Atronic Casino Technology, Ltd., published in 2002.
Enchanted Forest™ Gaming Description from Aristocrat, available in 1994.
Enchanted Unicorn Advertisement written by IGT, published in 2001.
Family Feud Bullseye advertisement, printed from www.igtonline.com/megajackpots/new__games/familyfeud__bullseye__slots.html and available in 2003.
Field Testing New Slots Article, written by Strictly Slots, published in Jul. 2000.
50 Lions, Advertisement, written by Aristocrat Leisure Industries, published in Sep. 2004.
Amazing Wins Article in Strictly Slots written by Bally Gaming Systems, published in Aug. 2005.
Archers Legend Article in Strictly Slots written by Konami, published in Feb. 2005.
Asian Princess, Article in Strictly Slots written by Aristocrat Leisure Industries, published in Mar. 2005.
At The Hop Advertisement written by Bally Gaming Systems, published in Fall 2002.
The Basics of Winning Video Poker (Chapter VI Deuces Wild & Chapter VII Jokers Wild) written by J. Edward Allen, published in 1990.
Bewitched—The Nosey Neighbor Advertisement, written by AC Coin and Slot/Product Guide published in 2006.
Black Swan Paytable Display written by IGT, published prior to 2001.
Blues Brothers SNL Advertisement written by Bally Gaming Systems, published in 2003.
Boot Scootin Article written by Strictly Slots/Aristocrat Leisure Industries, PTY Ltd., published prior to Mar. 2004.
Break the Spell Advertisement written by Atronic Casino Technology, Ltd., published in 1999.
Roamin Rhinos™ Video Slots, Gaming Machine Description printed from http://www.igt.com/GamingGroup/Games/game__detail.asp?toggle=ovr&pid=5.113.120&type__id=2374&p1=#cnt, published in 2002.
Rock & Rollin Article in Strictly Slots written by Atronic Casino Technology, Ltd., published in Jul. 2000.
Spin Till You Win Game Description written by IGT, published in 1996.
Symbol Feature Description in Australian UFO Gaming Machine written by Barcrest Ltd., published in 1995.
Wild Bear Salmon Run Advertisement written by IGT, published in 2003.
Wild Streak Advertisement written by WMS Gaming, Inc., published in 2001.
Your Real Key to Gaming Success Advertisement (including Roll Over Beethoven and Wild Fortune) written by Olympic Video Gaming, published date unknown.

* cited by examiner

| SYMBOL COMBINATION | AWARD |
|---|---|
| AAA | 10,000 |
| BBB | 1000 |
| CCC | 500 |
| DDD | 100 |
| EEE | 75 |
| FFF | 50 |
| GGG | 25 |
| HHH | 10 |
| WILD WILD WILD | 10 |
| ◇ ◇ ◇ | 5 |

FIG. 4A

| | PROBABILITY OF A SYMBOL ON | PROBABILITY OF A SYMBOL ON | PROBABILITY OF A SYMBOL ON | PROBABILITY |
|---|---|---|---|---|
| SYMBOL COMBINATION | REEL 1 | REEL 2 | REEL 3 | TOTAL |
| AAA | 1/20 | 1/20 | 1/20 | 1/8000 |
| BBB | 1/20 | 1/20 | 1/20 | 1/8000 |
| CCC | 1/20 | 1/20 | 1/20 | 1/8000 |
| DDD | 1/20 | 1/20 | 1/20 | 1/8000 |
| EEE | 1/20 | 1/20 | 1/20 | 1/8000 |
| FFF | 1/20 | 1/20 | 1/20 | 1/8000 |
| GGG | 1/20 | 1/20 | 1/20 | 1/8000 |
| HHH | 1/20 | 1/20 | 1/20 | 1/8000 |
| WLD WLD WLD | 1/20 | 1/20 | 1/20 | 1/8000 |
| ◇ ◇ ◇ | 1/20 | 1/20 | 1/20 | 1/8000 |
| ▭ ▭ ▭ | 10/20 | 10/20 | 10/20 | 1/8 |

FIG. 4B

| | PROBABILITY OF THE TRIGGER SYMBOL | PROBABILITY OF A SYMBOL ON | PROBABILITY OF A SYMBOL ON | PROBABILITY OF A SYMBOL ON | PROBABILITY |
|---|---|---|---|---|---|
| SYMBOL | | REEL 1 | REEL 2 | REEL 3 | TOTAL |
| A | 1/20 | | 1/9 | | 1/180 |
| B | 1/20 | | 1/9 | | 1/180 |
| C | 1/20 | | 1/9 | | 1/180 |
| D | 1/20 | | 1/9 | | 1/180 |
| E | 1/20 | | 1/9 | | 1/180 |
| F | 1/20 | | 1/9 | | 1/180 |
| G | 1/20 | | 1/9 | | 1/180 |
| H | 1/20 | | 1/9 | | 1/180 |
| WLD | 1/20 | | 1/9 | | 1/180 |

GAMING DEVICE AND METHOD HAVING FREE ACTIVATION MODE AND FREE ACTIVATION MODE WITH FREE ACTIVATION RETRIGGER

PRIORITY CLAIM

This application is a continuation-in-part of and claims the benefit of U.S. patent application Ser. No. 10/661,443, filed on Sep. 12, 2003, now U.S. Pat. No. 7,074,127, which is a continuation-in-part of and claims the benefit of U.S. patent application Ser. No. 10/241,255, filed on Sep. 11, 2002, now U.S. Pat. No. 7,056,213 the entire contents of which are incorporated herein.

This application is related to the following commonly-owned co-pending patent applications: "GAMING DEVICE HAVING A BONUS GAME WITH MULTIPLE PLAYER SELECTABLE AWARD OPPORTUNITIES," Ser. No. 10/237,207, "GAMING DEVICE HAVING FREE SPIN MODE WITH SYMBOL ELIMINATION," Ser. No. 10/953,818, "GAMING DEVICE HAVING WILD INDICATORS," Ser. No. 11/015,842, "GAMING DEVICE HAVING WILD INDICATORS," Ser. No. 10/982,096, "GAMING DEVICE WITH WILD ACTIVATION SYMBOLS AND WILD TERMINATION SYMBOLS." Ser. No. 10/966,223, "GAMING DEVICE HAVING A FREE SPIN GAME INCLUDING AN ACCUMULATED MODIFIER," Ser. No. 11/216,323, "GAMING DEVICE HAVING A PROBABILITY ENHANCING TRIGGER SYMBOL," Ser. No. 11/419,681, "GAMING DEVICE HAVING A PROBABILITY ENHANCING TRIGGER SYMBOL," Ser. No. 11/419,680, "GAMING DEVICE HAVING A PROBABILITY ENHANCING TRIGGER SYMBOL," Ser. No. 11/456,016, "GAMING DEVICE INCLUDING A GAME HAVING A WILD SYMBOL RELATED AWARD," Ser. No. 11/464,347, and "GAMING DEVICE HAVING A FREE SPIN GAME," Ser. No. 11/465,734.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming device manufacturers strive to make gaming devices that provide as much enjoyment and excitement as possible. Providing a game in which a player has an opportunity to win potentially large awards or credits is one way to enhance player enjoyment and excitement.

Currently, gaming machines or devices provide games wherein a player has one or more opportunities to obtain a winning symbol combination on mechanical or video reels. The winning symbol combination may be along the same payline or on different paylines (known as a scatter pay). By providing gaming devices with more winning symbol combinations, players have more opportunities to receive an award.

In known gaming devices, however, the probability of obtaining the largest award (i.e., the jackpot award) is typically much lower than the probability of obtaining the other awards in a game. Thus, although a player may obtain more awards in a game, these awards are generally the relatively small awards and not the relatively large awards such as the jackpot award.

Many jurisdictions have regulations that prohibit changing the probability of occurrence associated with the reel symbols. This makes it more difficult to create bonus or secondary games with high payouts using the bonus game reels and reel symbols.

Gaming devices that increase the probability of obtaining the relatively large award and specifically, the jackpot award, are desirable. To increase player enjoyment and excitement, it is desirable to provide new games and gaming devices which increase the likelihood or probability that the player will obtain one or more relatively large awards in a game.

SUMMARY

One embodiment of the present invention is directed to a gaming device including an award mode and a re-initiation mode of a primary game or bonus game where the probability of obtaining an award or an outcome and, specifically, a relatively large award increases when the player enters the award mode or the re-initiation mode of the bonus game.

In one embodiment, the gaming device includes a plurality of reels, each having a plurality of symbols. These symbols include a plurality of award symbols, at least one non-award symbol or null symbol or blank, at least one trigger symbol or symbol combination, and at least one wild symbol. One or more paylines are associated with the reels to indicate symbols or symbol combinations on the reels which are evaluated for winning symbol combinations. The symbols may be any suitable symbols such as letters, numbers, characters or any other suitable images. The award mode also includes a triggering event which, in one embodiment, includes a trigger symbol occurring on the reels. In one embodiment, the triggering event occurs when the trigger symbol is indicated on a designated reel on one of the paylines associated with the reels. In another embodiment, the triggering event occurs when the trigger symbol occurs on any of the paylines.

In a primary game, the gaming device initiates the award mode when the triggering event occurs in the game. In the award mode, the gaming device holds the reel including the trigger symbol stationary while activating or spinning the other reels until those reels indicate a wild symbol on the payline. The gaming device then holds the reels including the wild symbols stationary while reactivating or re-spinning the reel including the trigger symbol. Thus, the award mode effectively reduces the game to a single reel game where only one of the award symbols on the reel indicates a winning symbol combination in the award mode.

In the award mode, the gaming device re-activates or re-spins the reel including the trigger symbol until one of the award symbols is indicated on the payline on that reel. For instance, if a non-award or null symbol, or the trigger symbol is indicated on the payline in the award mode, the gaming device re-spins the reel until one of the award symbols or the wild symbol is indicated on the payline. The null symbols and the trigger symbol do not provide an award to the player in the award mode but, instead, cause the gaming device to re-spin the reels. Therefore, the player is guaranteed to receive one of the award symbols or the wild symbol in the award mode before the award mode ends. Reducing the number of symbols that may be indicated on the payline to end the game, increases the probability that any one of the award symbols will be indicated on the payline. The gaming device then provides the award associated with the indicated award symbol or the indicated award symbol combination to the player.

The award is added to the player's total award in a total award display and the bonus mode ends. In another embodiment, the player continues to re-activate the reels in the award mode if the player has spins remaining in the award mode.

The gaming device of the present invention effectively reduces the game to a single reel game or event which increases the probability or chance that a player will obtain an award in the award mode and, specifically, that the player will obtain a relatively large award such as a jackpot award in the award mode. For example, in a three-reel slot game, if each of the reels in the game includes twenty symbols including the trigger symbol, wild symbol, and non-award or null symbols, the probability or chance of obtaining an award symbol combination in that game is (1/20)×(1/20)×(1/20) or 1 in 8000.

In the award mode the game is reduced to a single reel game as described above. Therefore, the probability of obtaining an award symbol (or symbol combination) in the award mode significantly increases. The probability is determined by multiplying the probability of the trigger symbol being indicated in the primary game (i.e., 1 in 20) by the probability of indicating one of the award symbols occurring in the award mode (i.e., 1 in 9). Therefore, the probability of one of the award symbols (or symbol combinations) being indicated in the game (through the award mode) is (1/20)×(1/9), which equals a probability of (1/180). Thus, it is significantly more likely that the player will obtain one of the award symbols and, therefore, a winning award symbol combination in the game through the award mode. This increases the player's excitement and enjoyment of the game because the player has a greater opportunity or probability of obtaining the relatively large award or jackpot award in the award mode.

In one embodiment, a probability of being indicated on the payline is associated with each of the symbols on the reels. In one aspect of this embodiment, the probability associated with the trigger symbol is less than the probability associated with at least one of the award symbols, null symbols and the wild symbol on the reels. In another aspect of this embodiment, the probability associated with the trigger symbol is less than a plurality of the probabilities associated with the award symbols, null symbols and the wild symbol. In a further aspect of this embodiment, the probability associated with the trigger symbol is less than all of the probabilities associated with the award symbols, null symbols and the wild symbol in the game.

Similarly, in another embodiment, the award symbols include one relatively large award and several relatively small awards. In this embodiment, a probability of being indicated on the payline is associated with the award symbols such that the probability associated with the award symbol including the relatively large award is less than at least one of the probabilities associated with the award symbols including the relatively small awards being indicated on the payline. In another embodiment, the probability associated with the award symbol including the relatively large award is less than a plurality of the probabilities associated with the award symbols including the relatively small awards. In a further embodiment, the probability associated with the award symbol including the relatively large award is less than all of the probabilities associated with the award symbols including the relatively small awards.

In a further embodiment, the award mode of the present invention includes an award associated with a winning symbol combination including all wild symbols. In this embodiment, if the award mode is initiated and a wild symbol is indicated on the payline associated with the reels, in combination with the other wild symbols indicated on the payline, the gaming device provides the maximum or largest award in the game, such as the jackpot award. In another embodiment, the gaming device provides a predetermined award associated with a winning symbol combination including wild symbols in the game.

It should be appreciated that although the present application primarily discusses a trigger symbol, a combination of symbols (i.e., a trigger symbol combination) could be employed to trigger the award mode. It should also be appreciated that the trigger symbol could function as a wild symbol and one of the other reels could be re-activated.

In an alternative embodiment of the present invention, the probability-enhancing symbol includes a wild symbol which re-initiates or extends a bonus game. When a wild symbol occurs on at least one of a plurality of reels or designated reels, the gaming device locks, fixes, or holds stationary the position of the reel displaying the wild symbol and re-activates only the designated reels. The gaming device proceeds to hold stationary any designated reel displaying a wild symbol. As each reel displaying a wild symbol is held, the probability of obtaining a wild symbol on all of the designated reels is enhanced.

In one embodiment, the gaming device includes a plurality of reels, each having a plurality of symbols. The reels may be mechanical or video reels and include several symbols. In one embodiment, in addition to at least two wild symbols on separate or different reels, the symbols include a plurality of award symbols and at least one non-award symbol or null symbol or blank. The symbols may be any suitable symbols such as letters, numbers, characters or any other suitable images.

One or more paylines are included in the display to indicate symbols or symbol combinations on the reels which are evaluated for winning symbol combinations. It should be appreciated that any suitable number of paylines may be employed in the game.

A plurality of awards are associated with the award symbols or combination of award symbols according to a paytable. If an award symbol or combination of award symbols has an associated award and is indicated on an activated payline, the gaming device provides the associated award or awards in each spin of the reels. In one embodiment, no award is associated with a null symbol.

In one embodiment, the game play includes providing one or more free spins of the reels to the player. A "spins remaining" display indicates the number of spins remaining in a game. The number of free spins may be randomly determined, predetermined, determined by a wager made by a player, or determined according to any suitable method. In each spin, the gaming device determines the award, if any, associated with any indicated award symbols on the reels as discussed above.

The gaming device, in one embodiment, provides the player with a total award in each of the spins where the total award is based on the award and/or modifiers associated with the award symbols indicated in each spin. The total award in each of the spins is added to the player's total award indicated in the total award display. The gaming device or the player continues to spin the reels until there are no spins remaining. The gaming device then provides the player with the total award indicated in the total award display at the end of the game.

In one embodiment, upon a triggering event in a base game or bonus game, the player enters a game-extending or bonus game-extending or re-initiation mode. In one embodiment, the re-initiation mode is triggered when a wild symbol is displayed on one of the designated reels or paylines. In one embodiment, the wild symbol occurs when the wild symbol is indicated on a designated reel on one of the paylines associated with the reels. In another embodiment, the wild symbols occurs on the reels when the wild symbol is indicated on any of the paylines. In a further embodiment, the wild symbol occurs on a designated reel if the wild symbol is generated at any displayed position on the reel. Thereafter, in one embodiment of the re-initiation mode, certain designated reels undergo a predetermined number of activations to determine if the player will continue in the base or bonus game.

In the re-initiation mode, the gaming device holds stationary or fixes the position of the reel(s) which include wild symbols. The gaming device concurrently, either simultaneously or sequentially, activates or spins the other designated reels a predetermined or accumulated number of free spins or until a wild symbol is displayed on the reels or indicated on a payline. Alternatively, the gaming device reactivates or re-spins any of the reels not displaying a wild symbol including, non-designated reels. If wild symbols are generated and displayed on each of the designated reels or paylines within the predetermined number of spins, the gaming device re-initiates the bonus game. In another embodiment, if the player has spins remaining in the re-initiation mode, the gaming device continues to re-activate the non-designated reels in the re-initiation mode to potentially increase the total award.

In one embodiment, the game reduces the number of reels on which a wild symbol must be displayed by locking or holding stationary the reel or reels that display a wild symbol as described above. Reducing the number of reels on which wild symbols must appear in order for the bonus game to be extended increases the probability that any one of the wild symbols will be indicated on the payline or reel. In one embodiment, in which fewer than the total number of reels are designated to display wild symbols to re-initiate the bonus game, the gaming device effectively reduces the game to a double or single-reel game or event. The reduction of the number of reels on which a wild symbol must be displayed increases the probability or chance that a combination of reels displaying wild symbols will occur to re-initiate the bonus game and obtain a larger award.

The probability is determined by multiplying the probability of the wild symbol being indicated on each of the reels or on the same payline of each of the reels in the bonus game. As discussed above, in a three-reel slot game, if each of the reels in the game includes twenty symbols, including one wild symbol, the probability or chance of obtaining a combination of wild symbols on the same paylines of all three reels is (1/20)×(1/20)×(1/20) or 1 in 8000 or 0.0125%. The probability of indicating wild symbols on the same payline for two reels is for two reels is (1/20)×(1/20), which equals a probability of 1 in 400 or 0.25%, and, for one reel, 1 in 20 or 5%. Thus, it is significantly more likely that the player will obtain the combination of wild symbols required to extend the bonus game when the reels are locked upon displaying a wild symbol. This increases the player's excitement and enjoyment of the game because the player has a greater opportunity or probability of obtaining the relatively large award or jackpot award in subsequent play of the bonus game.

In one embodiment, a probability of being indicated on the payline is associated with each of the symbols on the reels. In one aspect of this embodiment, the probability associated with the wild symbols is less than the probability associated with at least one of the award symbols, and null symbols on the reels. In another aspect of this embodiment, the probability associated with the wild symbol is less than a plurality of the probabilities associated with the award symbols and null symbols. In a further aspect of this embodiment, the probability associated with the wild symbol is less than all of the probabilities associated with the award symbols and null symbols.

Similarly, in another embodiment, the award symbols include one relatively large award and several relatively small awards and have a probability of being indicated on the payline associated with the award symbols as discussed above.

In another embodiment, during the re-initiation mode, the gaming device provides a predetermined award associated with a winning symbol combination including wild symbols in the game. The wild symbol in this embodiment represents any symbol necessary to create a winning combination. For example, if a combination of three like symbols adjacent to one another on a payline generate an award, then two like symbols adjacent to a wild symbol will provide a winning combination to the player.

In a further embodiment, the re-initiation mode of the present invention includes an award associated with a winning symbol combination including a wild symbol or a combination including all wild symbols. In this embodiment, if the re-initiation mode is triggered and the wild symbols are indicated on the same payline, the gaming device provides the maximum or largest award in the game, such as the jackpot award.

Upon re-initiation of the bonus game, the gaming device resumes providing the player the award associated with any winning symbol or symbol combination indicated on the reels. It should be appreciated that the player may again be transferred to an award mode as discussed above. Any award provided to the player is added to the player's total award in a total award display, and the bonus mode continues until another wild symbol is generated on a designated reel or payline.

It should be appreciated that the present invention can be achieved with other suitable symbols besides the wild symbol.

Although the present invention is described with respect to a free spins game or a bonus game in certain embodiments, it should be appreciated that the present invention may be employed as a primary game, or bonus game or any other suitable type of game in a wagering gaming device. Additionally, although the present invention is described with respect to a reel type game, it should be appreciated that the present invention may be employed in any suitable non-reel type games such as a video poker game.

It should thus be appreciated that in one embodiment, the present invention provides a gaming device including a primary game operable upon a wager by a player, and a triggering event associated with the primary game. After the triggering event occurs, a generation of one or more symbols occurs without an additional wager by the player. The player is provided any award associated with any of the generated symbols from the generation. This generation and award process is repeated until a designated symbol or symbol combination occurs. In one embodiment, there is a limit to the number of generations. Other embodiments do not include a pre-set limit. After the designated symbol or symbol combination occurs, a subsequent event occurs. The result of the subsequent event is either a non-terminating result or a terminating result. In one embodiment, the terminating result (such as the failure to generate a designated number of symbols such as designated or wild symbols) and the non-terminating result (such as the generation of a designated number of designated or wild symbols). If the non-terminating result occurs, the generation and award process begins again. If the terminating result occurs, the generation and award process does not begin again and the game ends.

In one further embodiment, the gaming device includes a game operable upon a wager by a player, a plurality of reels in the game, a plurality of symbols on the reels, and a triggering event associated with the generation of one or more designated symbols on the reels. After the triggering event occurs, a generation of a plurality of the symbols occurs on the reels without an additional wager by the player. The player is provided any award associated with any winning combinations of generated symbols on the reels from the generation. The generation and award steps are repeated until a designated symbol or symbol combination occurs on the reels. If the designated symbol or symbol combination occurs, a subsequent event occurs, wherein the result of that event is either a terminating result or a non-terminating result are based on the number of designated symbols generated in said event. If the non-terminating result occurs, the generation and award process begins again. If the terminating result occurs, the generation and award process does not begin again.

In a further embodiment, the gaming device includes a game operable upon a wager by a player, a plurality of reels in the game, and a plurality of symbols on the reels which include at least two designated symbols. One of the designated symbols is on each of two different reels. A triggering event is associated with the generation of one or more designated symbols on the reels. After the triggering event, a generation of a plurality of the symbols on the reels occurs without an additional wager by the player. The player is provided any award associated with any winning combinations of generated symbols on the reels from the generation. This generation and award process continues until one of the designated symbols is generated on one of the reels in the generation. If one of the designated symbols is generated on one of the reels in the generation, the position of the reel with the designated symbol is locked for a designated number of further generations of symbols on a designated number of other reels. If a non-terminating event occurs such as a designated number of other designated symbols being generated on the reels in the designated number of further generations, the locked reel is unlocked and the above generation and award process begins. If a terminating result occurs such as designated number of other wild symbols are not generated on the reels in the designated number of further generations, no further generations of the reels occurs until another wager is made in the game. It should be appreciated that one embodiment includes providing the player any award associated with any winning combinations of generated symbols on the reels from each further generation. In one embodiment, if one of said designated symbols is generated on one of said reels in one of the further generations, that reel is locked, and the designated number of further generations of symbols occurs on a plurality of the reels without generated designated symbols. In one embodiment, each reel that generates one of the designated symbols is locked for the subsequent further generations of symbols until the designated number of other designated symbols are generated on the reels or the designated number of other designated symbols are not generated on the reels in the designated number of further generations.

In one embodiment, the gaming device includes a free activation mode. In the free activation mode, the gaming device provides a designated initial number of free activations. This designated initial number can be predetermined, randomly determined, determined through a sub-game or sequence, determined based on the player's wager or wager level, determined based on the player's status (such as through a player tracking system), or in any other suitable manner. Upon or after initiation of each free activation of a game, the remaining number of free activations changes in the free activation mode. In one such embodiment, the remaining number decreases by one. When the number of remaining free activations reaches a designated number such as zero, the free activation mode terminates.

In one embodiment, the free activation mode includes an initial number of free activations. Upon each free activation, the number of remaining free activations decreases by one and the free activation mode continues until the number of remaining free activations reaches zero. If any of the free activations results in any of the winning outcomes, the gaming device provides any awards associated with such winning outcomes to the player. In one embodiment, if a triggering event or freezing event occurs in the free activation mode prior to the number of remaining free activations reaching zero (or, alternatively, prior to the end of the free activation mode) the number of remaining free activations freeze (i.e., remain unchanged) while the gaming device provides additional free activations. In one embodiment, the additional free activations includes an unlimited number of free activations. The gaming device continues to provide this unlimited number of additional free activations until a terminating event occurs. In one embodiment, the terminating event must occur in one of the additional free activations. In other embodiments, the terminating event occurs over a series of the additional free activations. After the terminating event occurs, the gaming device recommences providing the number of remaining free activations (i.e., from the initial number of free activations).

In one alternative embodiment, the gaming device provides the unlimited free activations upon the triggering or freezing event only if a predetermined condition is satisfied. For example, the condition may be a minimum level or wager by the player in the primary game or any other suitable condition may be employed.

In one alternative embodiment, the free activation mode includes a resetting event which resets the number of remaining free activations to the initial number of free activations. In one embodiment, if the resetting event occurs after the triggering event or freezing event, but prior to the terminating event (i.e., during the unlimited number of free activations), the gaming device provides the initial number of free activations (rather than the frozen number of remaining free activations) upon the occurrence of the terminating event which ends the unlimited number of free activations. If the resetting event does not occur prior to the terminating event during the unlimited free activations, the player receives the same number of or frozen number of remaining free activations as just prior to the occurrence of the freezing event.

In alternative embodiments, it should be appreciated that the resetting event may occur at any time during any of the free activations, such as before or simultaneously with the triggering event or freezing event or before or simultaneously with the terminating event. In one embodiment, the resetting event does not function to reset the number of remaining free activations unless a prior or subsequent game event activates the resetting event. It should be appreciated that other suitable conditions such as a player's wager level can be used to determine if the resetting event will function.

In another embodiment, the gaming device includes a plurality of resetting events, where each resetting event is associated with a certain remaining number or range of free activations. In this embodiment, the occurrence of a non-associated resetting event lacks a resetting function or the gaming device assigns such a resetting event another suitable function.

In a further embodiment, the resetting events are accumulated or stored for later use by the player. Such accumulated resetting events may be activated or used at any appropriate time as determined by the gaming device. The resetting event thus increases player excitement by providing additional award opportunities.

It should be appreciated that the freezing event and the resetting event described above may be mutually exclusive thus functioning independently of one another, designated freezing events may be associated with designated resetting events, or any suitable relationship between these functions may be suitably employed.

In one embodiment, the free activation mode includes a plurality of symbol generators which are operable to generate a plurality of symbol combinations in the free activation mode. In one such embodiment, the symbol generators are a plurality of reels operable to generate a plurality of symbols. In this embodiment, different designated combinations of the symbols can respectively function as the freezing and resetting events.

In one embodiment, in addition to causing the number of remaining free activations to freeze, the occurrence of the triggering event causes one of the symbols, one of the symbol combinations, or one of the symbol generators such as one of the reels to lock (i.e., remain unchanged) during the unlimited free activations. The occurrence of the triggering event having a locking function (sometimes referred to herein as the locking event) thus causes at least one symbol in a generated plurality of symbols to lock or remain unchanged during the unlimited free activations. The gaming device continues generating symbol combinations while keeping the locked symbol constant until the occurrence of the terminating event which causes the gaming device to unlock any locked symbols and recommence providing the number of remaining free activations. In alternative embodiments, the one or more symbols lock during one of a plurality of the unlimited free activations.

In alternative embodiments, it should be appreciated that the gaming device may lock one or more symbols occurring simultaneously with the triggering event, lock another one or more of the other symbols, lock a plurality of symbols, or lock any other suitable combination of symbols. Further, when the terminating event causes the gaming device to unlock any locked symbols, the gaming device may unlock one, more, or each of the locked symbols or the gaming device may unlock any suitable combination of symbols.

It should be appreciated that the triggering event having the lock function may be associated with any suitable designated symbol combination and any suitable designated symbol position. The symbol combination may include, for example, symbols on a plurality of reels or symbols such as those associated with a deck of cards on one or more cards in a hand of cards.

In one embodiment, the gaming device includes a plurality of reels and designates one or more reels to remain locked or stationary upon the occurrence of the triggering event having the lock function. In this embodiment, the gaming device ascribes the lock function to a lock symbol occurring on at least one of the reels. Upon the occurrence of the lock symbol, the gaming device locks at least one symbol on at least one reel and continues to generate symbol combinations on the non-stationary or non-locked reels while keeping the number of remaining free activations unchanged. The gaming device continues to generate an unlimited number of symbol combinations until the occurrence of a terminating event. The terminating event causes the gaming device to unlock any locked reels and to recommence reducing the number of remaining free activations with each subsequent free activation. In one embodiment, the free activations continue until the number of remaining free activations reaches zero or until the occurrence of another triggering event which causes the gaming device to provide an unlimited number of free activations until the occurrence of another terminating event. Thus, it should be appreciated that for all embodiments, the unlimited number of free activations may be repeated.

It should be appreciated that the reels may be associated with the type of generated lock symbol, such as if the lock symbol includes a modifier or the number of generated lock symbols occurring on the reels. In one embodiment, the gaming device includes a plurality of lock symbols where each lock symbol is associated with a game function, such as a designated number or range of remaining or initial free activations or any suitable game function. In a further embodiment, designated lock symbols are associated with designated reels or with other designated symbols. The occurrence of a non-associated lock symbol on the reels can lack function or the gaming device assigns those lock symbols another suitable function.

In another embodiment, the gaming device includes activated and non-activated terminating events. In this embodiment, the occurrence of a non-activated terminating event will not cause the gaming device to recommence changing the number of remaining free activations.

In a further embodiment, the present invention is employed in a card game such as a video poker game. In this embodiment, the video poker game includes a plurality of cards which include certain designated cards. The occurrence of one or more designated cards includes initiating free activation functions, such as freezing the number of remaining free activations, locking one or more cards, or resetting the number of remaining free activations, as described above.

In one embodiment, in the free activation mode the gaming device deals a poker hand including a designated card having a lock function. The gaming device thus initiates an unlimited number of free activations or deals while holding the designated card and re-dealing the remaining cards until one or more cards having a terminating function occurs. In another embodiment, the gaming device provides a base game including an initial limited number of free activations or deals. During one of the free activations or deals, the gaming device deals a card having a freeze function. This commences an unlimited number of free activations or deals while freezing the remaining number of free activations or deals. The unlimited free activations or deals continue until the gaming device deals a card having a terminating function. The gaming device then terminates the unlimited free activations or deals and commences the countdown of the remaining number of free activations or deals, if any remain.

Although a limited number of card game embodiments are described, it should be appreciated that any of the embodiments described herein are equally applicable to any type of game including but not limited to a reel-type game, a card game, a primary game, a sub-game, a bonus game, a secondary game, or any suitable game.

It is therefore an advantage of the present invention to provide a gaming device that provides an increased probability of obtaining awards in a game.

Another advantage of the present invention is to provide a gaming device that increases the probability of obtaining a relatively large award in a game.

It is a further advantage of the present invention to provide a gaming device that increases the probability of obtaining the jackpot award in a game.

It is a further advantage of the present invention to provide a gaming device that increases the probability of extending the bonus game in a game.

Another advantage of the present invention is to provide a gaming machine having an enhanced free activation mode with an initial number of free activations and a triggering event in the free activation mode which causes the remaining number of free activations in the free activation mode to freeze and an unlimited number of free activations to commence, and a terminating event which causes the number of remaining free activations to unfreeze.

Another advantage of the present invention is to provide a free activation mode having an initial number of free activations, an unlimited number of free activations, and a resetting event which causes the number of remaining free activations to reset.

Another advantage of the present invention is to provide a triggering event in the free activation mode which causes the remaining number of free activations to freeze and a locking event which causes at least one symbol to lock during an unlimited number of free activations which continue until the occurrence of a terminating event.

A further advantage of the present invention is to provide a free activation mode having an initial number of free activations, a triggering event which causes the number of remaining free activations to freeze, an unlimited number of free activations to commence until the occurrence of a terminating event which causes the number of remaining free activations to unfreeze, and a resetting event during the unlimited number of free activations which causes the number of remaining free activations to reset.

Another advantage of the present invention is to provide a free activation mode having an initial number of free activations, a triggering event which causes the number of remaining free activations to freeze, at least one symbol to lock during an unlimited number of free activations until the occurrence of a terminating event, wherein an occurrence of a resetting event during the unlimited number of free activations causes the number of remaining free activations to reset.

Additional features and advantages of the present invention are described in, and will be apparent from, the following Detailed Description of the Invention and the figures.

BRIEF DESCRIPTION OF THE FIGURES

FIG. 4A is probability table illustrating the probability of each of the symbols being indicated on each of the reels in a primary game.

FIG. 4B is probability table illustrating the probability of each of the symbols being indicated on each of the reels in an award mode.

DETAILED DESCRIPTION OF THE INVENTION

Gaming Device and Electronics

Figure 1A:
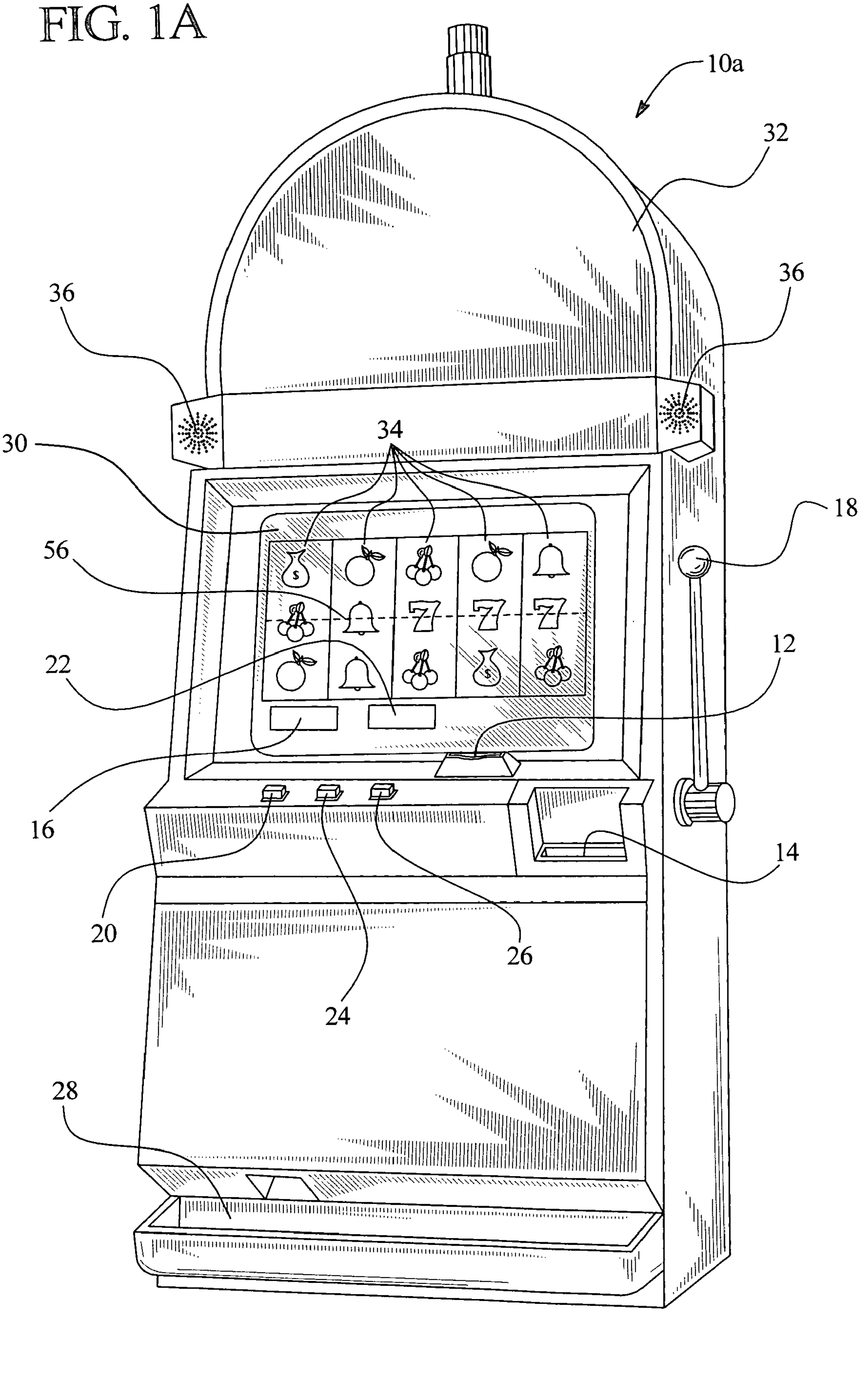
FIG. 1A is a front perspective view of one embodiment of the gaming device of the present invention.
Figure 1B:
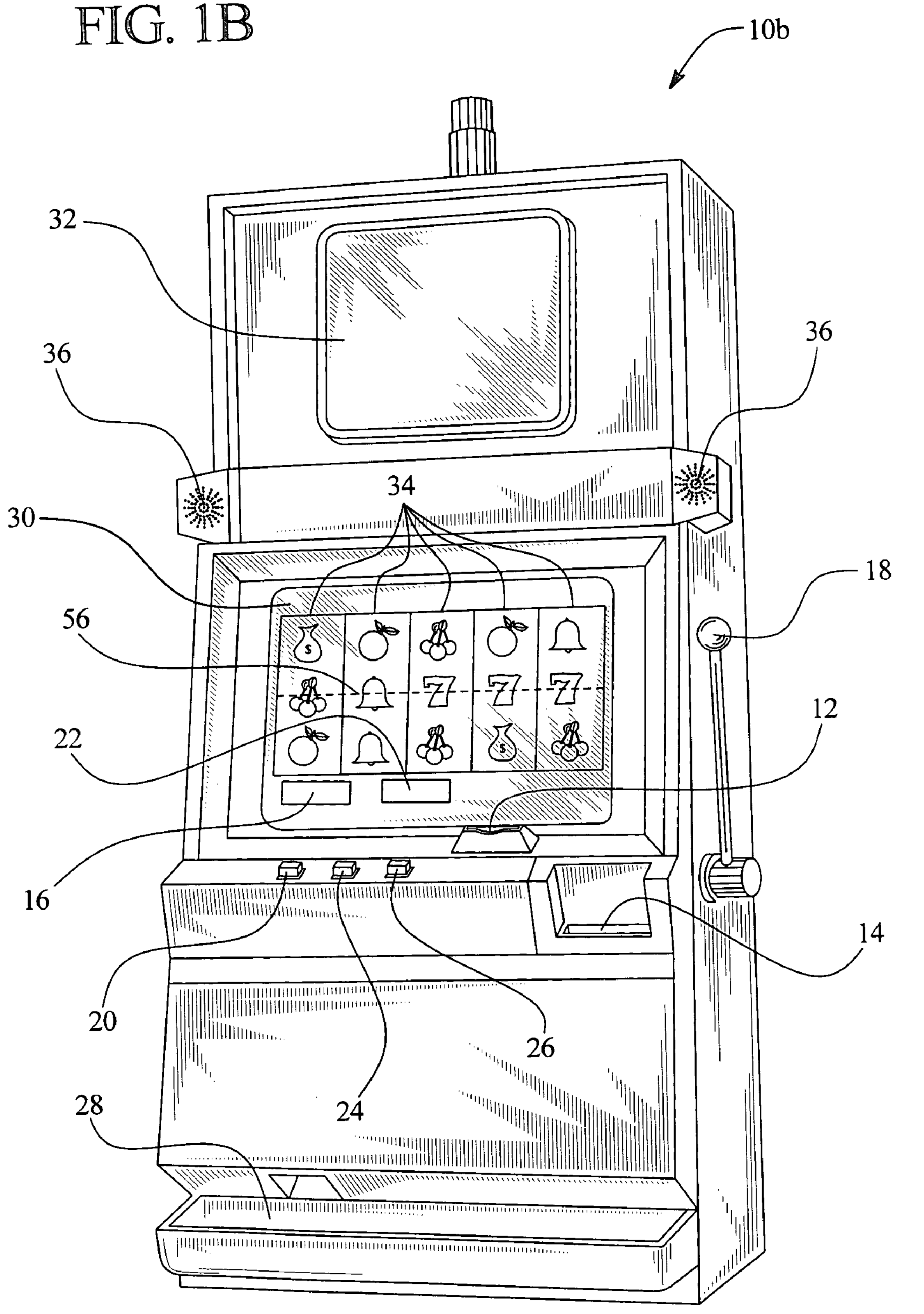
FIG. 1B is a front perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 in one embodiment has the controls, displays and features of a conventional slot machine. It is constructed so that a player can operate it while standing or sitting, and gaming device 10 is preferably mounted in a cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device, which a player can use in a desktop or laptop personal computer or other computerized platform.

Gaming device 10 can incorporate any primary game such as slot, poker, blackjack or keno, and any of the bonus triggering events and bonus games associated with these primary games. The symbols and indicia used on and in gaming device 10 may be in mechanical, electrical, electronic or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player, which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. Other bet or wager indicators such as a bet max button may also be employed in the gaming device of present invention.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, an upper display device 32, and the alternative embodiment shown in FIG. 1B includes a central display device 30 as well as an upper display device 32. Gaming device 10 in one embodiment displays a plurality of reels 34 such as three to five reels 34 in mechanical or video form at one or more of the display devices. A display device can be any viewing surface such as glass, a video monitor or screen, a liquid crystal display or any other display mechanism. If the reels 34 are in video form, the display device for the video reels 34 is preferably a video monitor. Each reel 34 displays a plurality of indicia such as bells, hearts, fruits, numbers, letters, bars or other images which preferably correspond to a theme associated with the gaming device 10. Furthermore, gaming device 10 preferably includes speakers 36 for producing sounds such as music.

Figure 2:
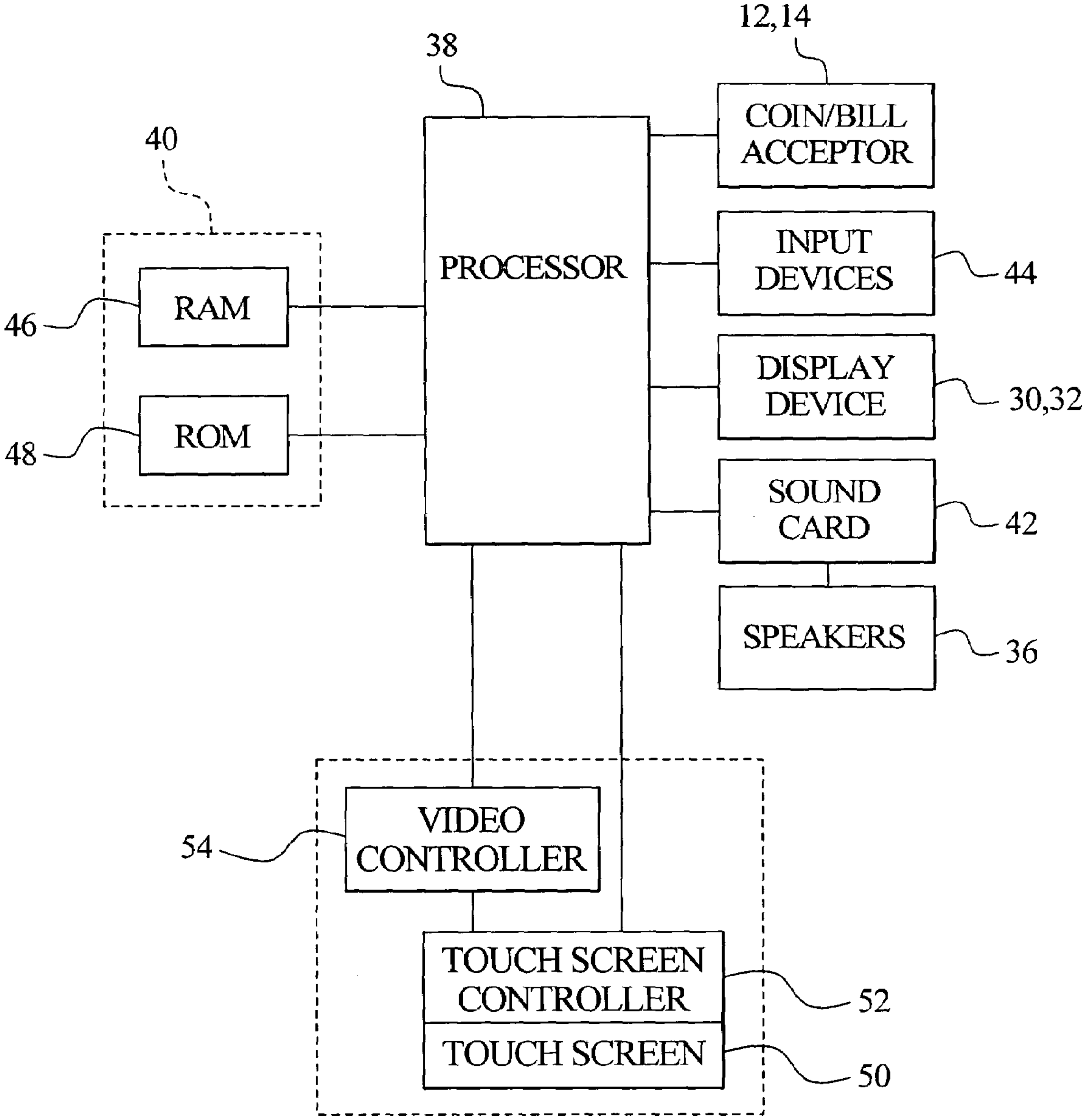
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. One or more secondary processors may also be employed in conjunction with the primary processor to control certain aspects of the game function. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a network server for communication to a playing station such as over a data network such as a local area network (LAN), wide area network (WAN), Internet connection, microwave link, and the like. The processor 38 and memory device 40 are generally referred to herein as the "computer" or "controller."

With reference to FIGS. 1A, 1B and 2, to operate the gaming device 10, in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, in one embodiment gaming device 10 also gives players the opportunity to win credits in a bonus round. This type of gaming device 10 will include a program which will automatically begins a bonus round when the player has achieved a qualifying condition in the game. This qualifying condition can be a particular arrangement of indicia on a display device. The gaming device 10 may use mechanical devices or a video-based central display device 30 to enable the player to play the bonus round. In one embodiment, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Probability Enhancing Trigger Symbol

Referring to FIGS. 1C, 3A, 3B, 4A and 4B, one embodiment of the reels of the present invention is illustrated where three reels are employed in a game. It should be appreciated that any suitable number of reels may be employed in the primary game. In this embodiment, each of the reels 34*a*, 34*b* and 34*c* includes symbols 100, which are represented by letters A, B, C, D, E, F, G and H, non-award or null symbols or blanks 104, at least one trigger symbol 102 and at least one wild symbol 105. It should be appreciated that any suitable number and types of symbols may be employed in a game according to the present invention. Each symbol is positioned at a reel stop position or reel stop on each of the reels. Therefore, one of the symbols such as one of the award symbols, one of the null symbols, the trigger symbol or the wild symbol will be indicated on a payline in the game.

Figures 3A, 3B:
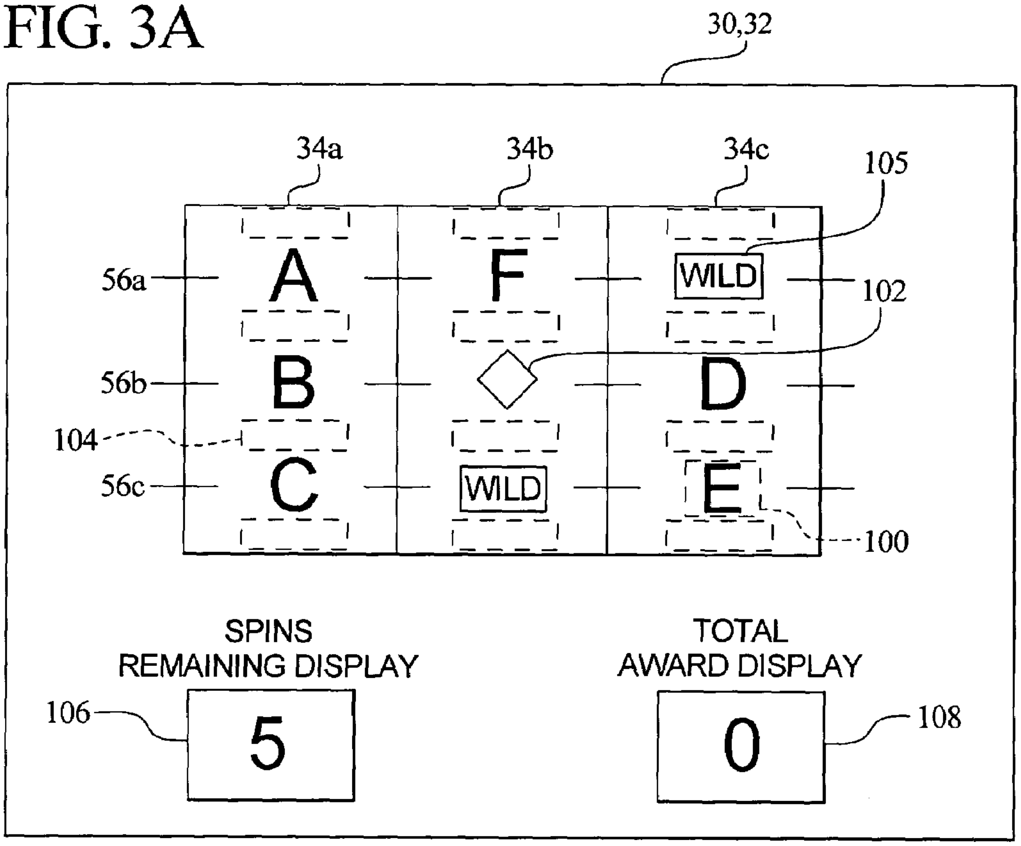
FIG. 3A is an enlarged elevation view of one of the display devices of FIGS. 1A and 1B illustrating one embodiment of the present invention.
FIG. 3B is an award table illustrating the symbol combinations and the awards associated with the symbols combinations of the embodiment of FIG. 3A.

Referring to FIG. 3A, in one embodiment the gaming device displays a plurality of reels and specifically three reels 34*a*, 34*b* and 34*c*. The reels include a plurality of symbols such as the letters A, B, C, D, E, F, G and H. The reels also include at least one trigger symbol, such as a diamond symbol 102. It should be appreciated that one or more of the reels may include at least on trigger symbol. Additionally, each of the reels includes at least one wild symbol 105 and at least one null symbol or blank 104. A probability of being indicated is associated with each of the symbols on the reels. In the primary game, the probability of each of the symbols being indicated on one of the reels is one in twenty (1/20) or 5.0% as shown in the probability table illustrated in FIG. 4A. If a triggering event occurs in the primary game, an award mode is initiated. In the award mode, the primary game is effectively reduced to a one-reel game. In addition, the null symbols 104 or blanks, and the trigger symbol, each re-spin or re-activate the reels. Thus, the effective number of symbols on the reels is reduced from twenty symbols to nine symbols, which further increases the probability that one of the symbols will be indicated on the reels. Several paylines, such as paylines 56*a,* 56*b* and 56*c* are associated with the reels. It should be appreciated that one or more paylines may be associated with the reels. A spins remaining display 106 indicates the number of spins remaining in the game. A total award display indicates the total value of the awards accumulated by the player in the game.

The gaming device provides the player with a number of spins in the game. The number of spins may be randomly determined, predetermined or determined in any suitable manner. The player uses the spins to activate or spin the reels 34*a*, 34*b* and 34*c*. The gaming device provides an award associated with one or more winning symbol combinations indicated on one of the paylines 56*a*, 56*b* or 56*c* associated with the reels. The player continues to spin the reels until the player has no spins remaining as indicated by the spins remaining display 106.

The trigger symbol or diamond symbol 102 increases the probability that the player will obtain one of the awards in the game and specifically increases the probability that the player will obtain the largest award such as the jackpot award in the game. The game preferably includes only one trigger symbol, designated as a diamond symbol 102, on one of the reels 34 in the game. In one embodiment, the middle reel 34*b*, includes the trigger symbol or diamond symbol 102. If the diamond symbol 102 is indicated on one of the paylines 56*a*, 56*b* or 56*c*, the gaming device initiates an award mode. In the award mode, the gaming device freezes or holds the reel 34*b* including the trigger symbol 102 stationary while the gaming device activates or spins the remaining reels or outside reels 34*a* and 34*c*, which are adjacent to the middle reel 34*b*. The gaming device activates or spins these reels until a wild symbol 105 is indicated on the same payline as the trigger symbol or diamond symbol 102.

Once the wild symbols 105 are indicated on reels 34*a* and 34*c* and on the same payline as the trigger symbol 102, the gaming device holds or keeps these reels stationary. The symbols on payline 56*b* are wild symbol 105*a* on reel 34*a*, trigger symbol or diamond symbol 102 on reel 34*b* and wild symbol 105*b* on reel 34*c*. The gaming device now re spins or re-activates reel 34*b* until an award symbol such as one of the letters is indicated on payline 56*b*. Any award symbol 100 indicated on that payline will provide a symbol combination having three identical symbols matching the award symbol 100 indicated on that payline. This occurs because two of the symbols on that payline are the wild symbols 105*a* and 105*b* as illustrated in FIG. 5C. Because only the middle reel 34*b* is re-activated or re spun during the game to determine the award, the game is reduced to a one reel or single reel game. The player now only needs to obtain one award symbol to win an award in the award mode. More specifically, the player only has to spin one reel 34*b* to obtain the largest award such as the jackpot award in the game. Thus, because the award mode reduced the game to a one reel or single reel game, the probability of obtaining any of the awards, and specifically the largest award in the game, increases significantly.

In the award mode, when the middle reel 34*b* is re-activated and the trigger symbol or diamond symbol 102 is indicated on payline 56*b*, the gaming device re spins or re-activates reel 34*b*. Thus in one embodiment, the trigger symbol or diamond symbol does not provide an award to the player in the game. In another embodiment, an award is associated with the trigger symbol and is provided to the player if the trigger symbol is indicated on the reel after the reel is re-activated in the award mode.

Similarly, if a non-award or null symbol (i.e., blank) 104 is indicated on payline 56*b* on reel 34*b*, the gaming device re spins or re-activates reel 34*b*. Thus, a null symbol does not provide an award to the player; rather, the reels are re-spun to give the player another opportunity to obtain one of the awards in the game. Once an award symbol 100 is indicated on the designated payline on reel 34*b*, the gaming device provides an award associated with the award combination including those symbols. If the award symbol happens to be the jackpot symbol, the player obtains three of the jackpot symbols and therefore, the jackpot award in the game. The award received by the player in the game is transferred to the total award display 108 and provided to the player when the game ends. In one embodiment, the game ends when the player obtains an award in the game. In another embodiment, the game ends when the player runs out of spins as indicated by the spins remaining display 106.

In a further embodiment, the gaming device includes a modifier such as a multiplier which changes such as by increasing when the null symbol occurs on the reel. The modifier such as the multiplier is employed in one embodiment to increase the award determined by the generated symbol on the reel.

By effectively reducing the game to a single reel or one reel game, the present invention significantly increases the probability of obtaining an award in the game without changing the random probability of occurrence. In particular, the present invention increases the probability or the likelihood that the player will obtain the largest award such as the jackpot award in the game. For example, in a typical reel-type game, a player must obtain one of a plurality of designated symbol combinations on one or more of the paylines associated with a set of reels to obtain an award in the game. The gaming device or player spins the reels and the reels randomly indicate symbols on one or more of the paylines associated with the reels. If a winning symbol combination is indicated on one of the designated winning paylines in the game, the gaming device provides an award associated with that winning symbol combination. The probability of obtaining a particular symbol combination, however, is based on the number of reels in a game and the number of symbols included on those reels. Thus, the more reels and symbols in a game, the less likely or less probable it is that the player will obtain one of the winning symbol combinations in that game.

For example, a particular game of the gaming device may include three reels, such as reels 34*a*, 34*b* and 34*c* in FIG. 3A. In this example, each of the reels includes twenty reel positions, which include nine award symbols as symbols A, B, C, D, E, F, G, and H, one wild symbol, one trigger symbol and ten null symbols. In this example, the symbols must occur or be indicated on payline 56*b* to provide a winning symbol combination in the game. Thus, at the beginning of the game each symbol has a 5% (1/20) chance or probability of being indicated on payline 56*b* on each of the reels as illustrated in FIG. 4A. As a result, the overall probability that a particular symbol combination will occur on that payline is (1/20)×(1/20)×(1/20), which equals (1/8000) or 0.013%. Therefore, in this example, because each symbol has a 5% (1/20) chance or probability of being indicated on a single payline on the reels, the overall probability of a particular symbol combination occurring on that payline in the primary game (without the award mode) is (1/8000) or 0.013%.

Referring to FIG. 3B, an example of a payout or award table is illustrated. In this example, a winning symbol combination in the primary game includes three identical symbols. For instance, the jackpot award or largest award indicated on the table is the award of ten thousand associated with the symbol combination including three A symbols (i.e., A, A, A). The award associated with the other winning symbol combinations are also shown in the table. It should be appreciated that any suitable combination of symbols in a game may be designated as a winning symbol combination.

Referring to FIG. 4A, a probability table for a primary game or base game indicates the probability of each of the symbols being indicated on a payline for each reel in the three reel slot game shown in FIG. 3A. The table also indicates the probability of being indicated on a payline associated with each of the winning symbol combinations shown in FIG. 3B for each of the symbols on the reels and the probability of three null symbols or blanks being indicated on the payline. As illustrated in the table, the probability of each of the award symbols (i.e., A, B, C, D, E, F, G and H) being indicated on any one of the reels is (1/20). The probability of a winning symbol combination including one of the award symbols, the trigger symbol or the wild symbol, being indicated on the designated payline is (1/8000) (i.e., (1/20)×(1/20)×(1/20)). The probability of three null symbols or blanks being indicated on the payline is ((10/20)×(10/20)×(10/20)) or (1/8). Therefore, a player has a one in eight thousand chance in the primary game to obtain one of the winning symbol combinations, and specifically of obtaining the jackpot award in the game.

In the award mode of the present invention, the number of reels is effectively reduced to one reel or one active reel such as reel 34*b*. As a result, the probability of obtaining a particular symbol or a particular symbol combination increases significantly. Referring to FIG. 4B, a probability table illustrates the probabilities of each of the symbols being indicated on the reel in the award mode. Additionally, the table illustrates the probability of a winning symbol combination, which in the award mode is one award symbol, being indicated on the payline in the award mode. Because the trigger symbol and the null symbols cause the reel to re-spin in the award mode, the number of effective award symbols in the award mode is reduced to nine. Therefore, the probability of each of the award symbols or the wild symbol being indicated on the payline in the game (through the award mode) is (1/180), which is the probability of the trigger symbol being indicated on the payline in the primary game (1/20) multiplied by the probability of any one of the award symbols or the wild symbol being indicated on the payline in the award mode, which is (1/9). The probability of one of the award symbols or the wild symbol being indicated in the game (through the award mode) is therefore, (1/20)×(1/9) or (1/180) as shown in FIG. 4B. Accordingly, the overall probability of obtaining a specific symbol combination is (0.013% (1/8000)+0.56% (1/180) which equal 0.573%.

Referring to FIG. 3A, in one example of the award mode of the present invention, if a trigger symbol or diamond symbol 102 is indicated on payline 56*b* in a primary game, an award mode is initiated and the outside reels 34*a* and 34*c* are re-activated or re-spun until wild symbols are indicated on payline 56*b*. Then, the reels 34*a* and 34*c* are held stationary while the middle reel 34*b* is re-activated or re-spun until an award symbol is indicated on payline 56*b*. The probability or likelihood of obtaining a particular symbol combination on the reels has now increased because the player only has to obtain one award symbol on reel 34*b* in order to obtain an award in the game.

Figure 1C:
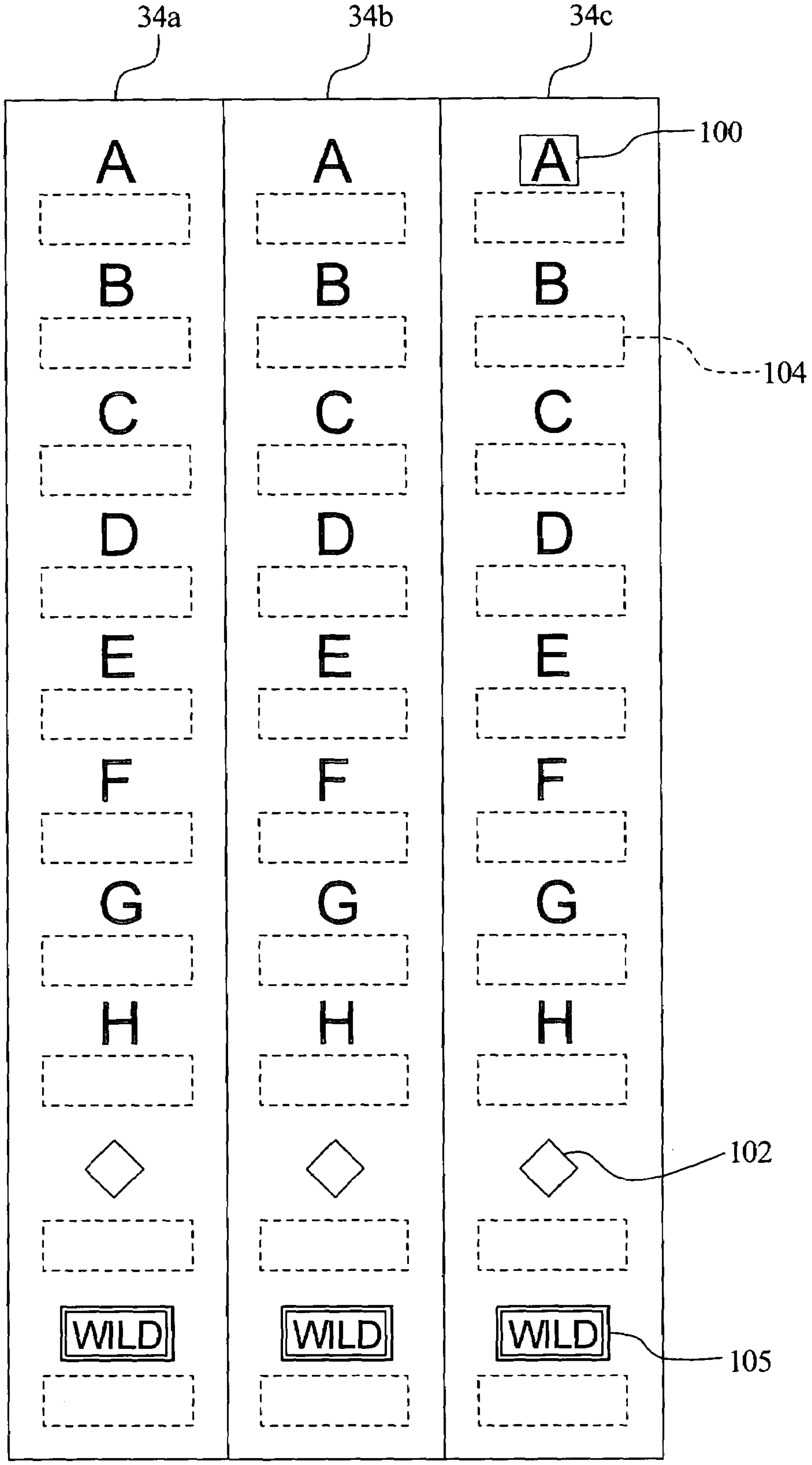
FIG. 1C is a enlarged elevation view of a set of reels and the reel stop positions included on the reels in a three reel slot game.

In this example, the middle reel 34*b* includes twenty reel positions including eight award symbols, one wild symbol, a trigger symbol or diamond symbol 102, and ten null symbols 104 as shown in FIGS. 1C and 3A. Therefore, the player initially has a one in twenty chance of obtaining the trigger symbol or diamond symbol 102 on reel 34*b* in the primary game as described above. In the award mode, if the player obtains the trigger symbol 102 or one of the null symbols 104 on payline 56*b* after the reel 34*b* is re-activated, the gaming device re-spins or re-activates reel 34*b* again until an award symbol 100 is indicated on payline 56*b*. Because the trigger symbol 102 and the null symbols 104 re-spin or re-activate the reels in the award mode, the actual number of symbols that provide an award and end the bonus mode are nine (i.e., the eight award symbols and the wild symbol). Therefore, the player has a one in nine chance of obtaining an award symbol 100 in the award mode and thereby a 11.1% chance of obtaining a winning symbol combination on payline 56*b*. As a result, the overall probability of obtaining a winning symbol combination on the reels in the award mode is determined by taking the probability of obtaining the trigger symbol or diamond symbol 102 on reel 34*b* in the initial or primary game, which is 1 in 20 (1/20), multiplied by the probability or the likelihood of one of the award symbols being indicated on payline 56*b*, which is 1 in 9 (1/9). The overall probability therefore equals (1/180) or 0.56% for obtaining any one of the winning symbol combinations on the reels in the game (through the award mode) as shown in FIG. 4B. Thus, the probability of obtaining a winning symbol combination on the reels in the primary game is 1 in 8000 or 0.013% and this probability increases to 1 in 180 or 0.56% in the award mode. This significantly increases a player's opportunities or chances of obtaining one of the awards in the game and specifically a relatively large award such as the jackpot award. This increases a player's excitement and enjoyment of the game.

Referring to FIGS. 5A through 5F, an example of one embodiment of the present invention is illustrated where the player obtains a trigger symbol or diamond symbol 102 in the primary game or primary mode.

Figure 5A:
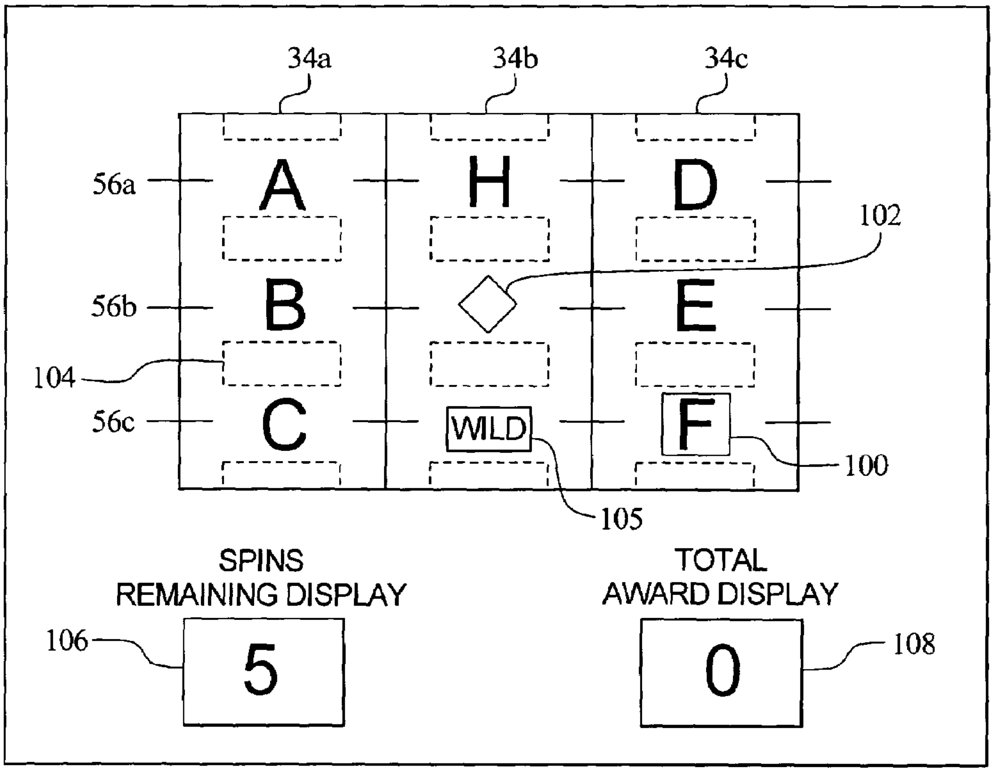
FIGS. 5A, 5B, 5C, 5D, 5E and 5F are enlarged front elevation views of an example of the embodiment shown in FIG. 3 illustrating a primary game and an award mode initiated by the occurrence of a triggering event in the primary game.
Figure 5B:
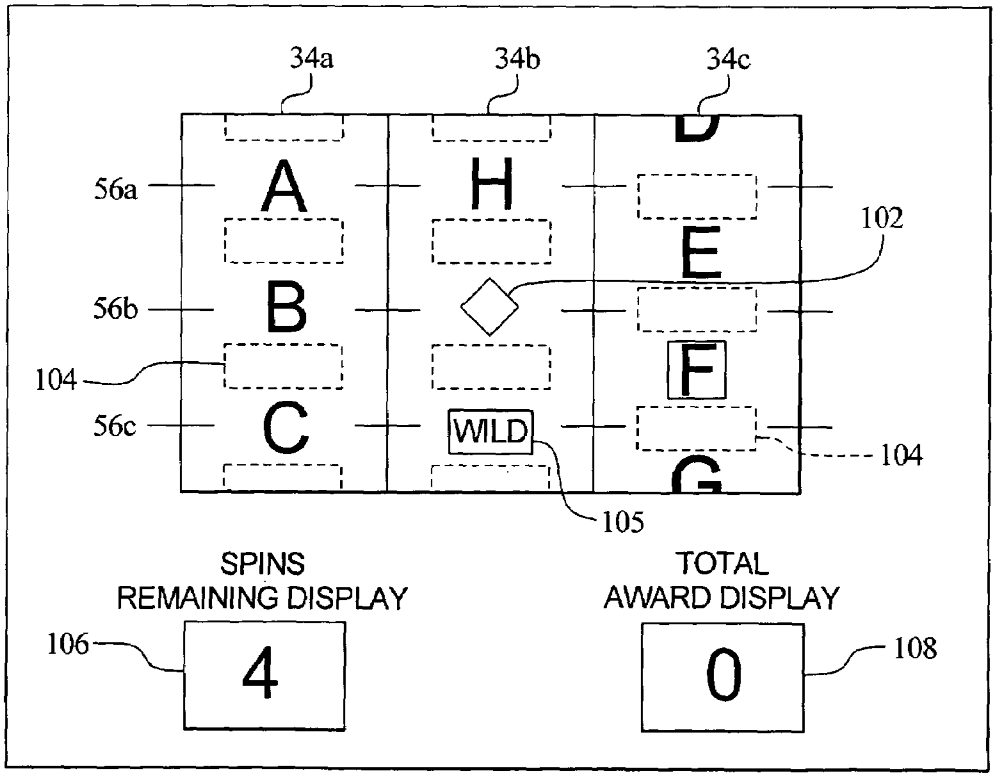
Figure 5C:
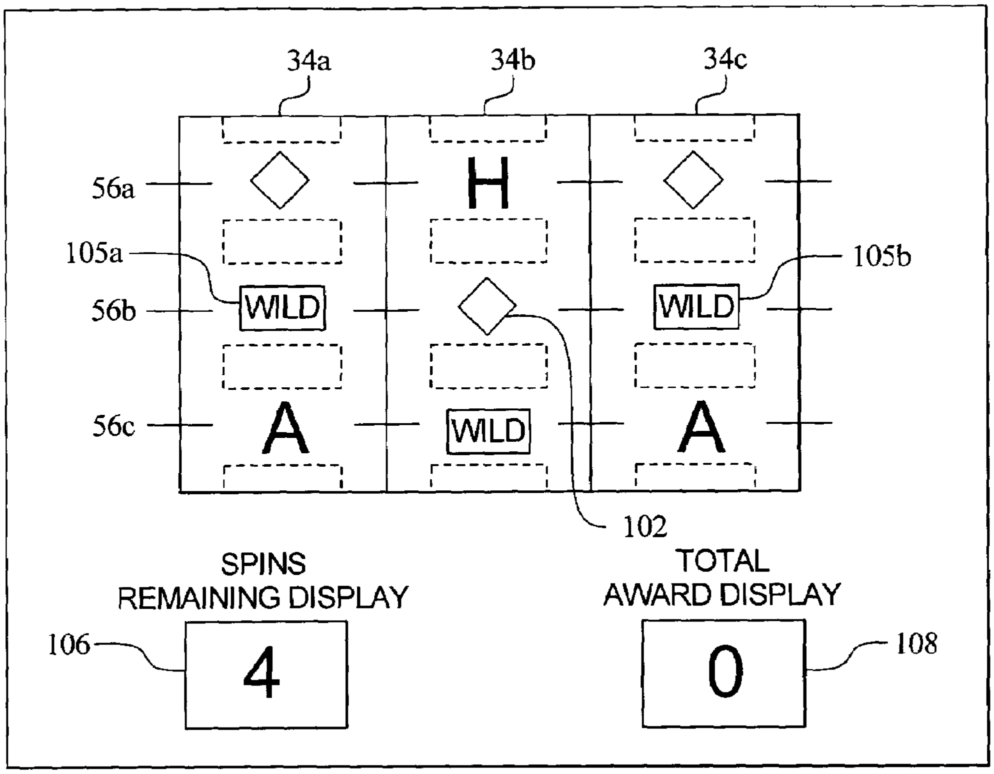

This example includes three reels 34*a*, 34*b* and 34*c* as shown in FIG. 5A, where each reel includes a plurality of award symbols A, B, C, D, E, F, G and H, one trigger symbol designated as diamond symbol 102, one wild symbol 105 and ten null symbols 104. The player begins the game with five spins as indicated by the spins remaining display 106 as shown in FIG. 5A. Additionally, the player begins the game with an award of zero as indicated by the total award display 108. The player uses their first spin as shown in FIG. 5B to activate or spin the reels. A trigger symbol or diamond symbol 102 is indicated on payline 56*b* on reel 34*b*. The trigger symbol or diamond symbol 102 initiates the bonus mode of the present invention.

Referring to FIG. 5C, the gaming device freezes or holds reel 34*b* stationary while spinning or re-spinning the outside reels 34*a* and 34*c* until wild symbols 105*a* and 105*b*, respectively, are indicated on payline 56*b* on those reels. As indicated by the spins remaining display 106, the number of spins does not decrease when these reels are activated or re-activated to indicate the wild symbols. Additionally, the total award display 108 indicates that the player does not obtain an award for obtaining the trigger symbol (i.e., diamond symbol 102) or the wild symbols 105*a* or 105*b*. In another embodiment, the gaming device provides an award associated with the trigger symbol and/or the wild symbols.

Figure 5D:
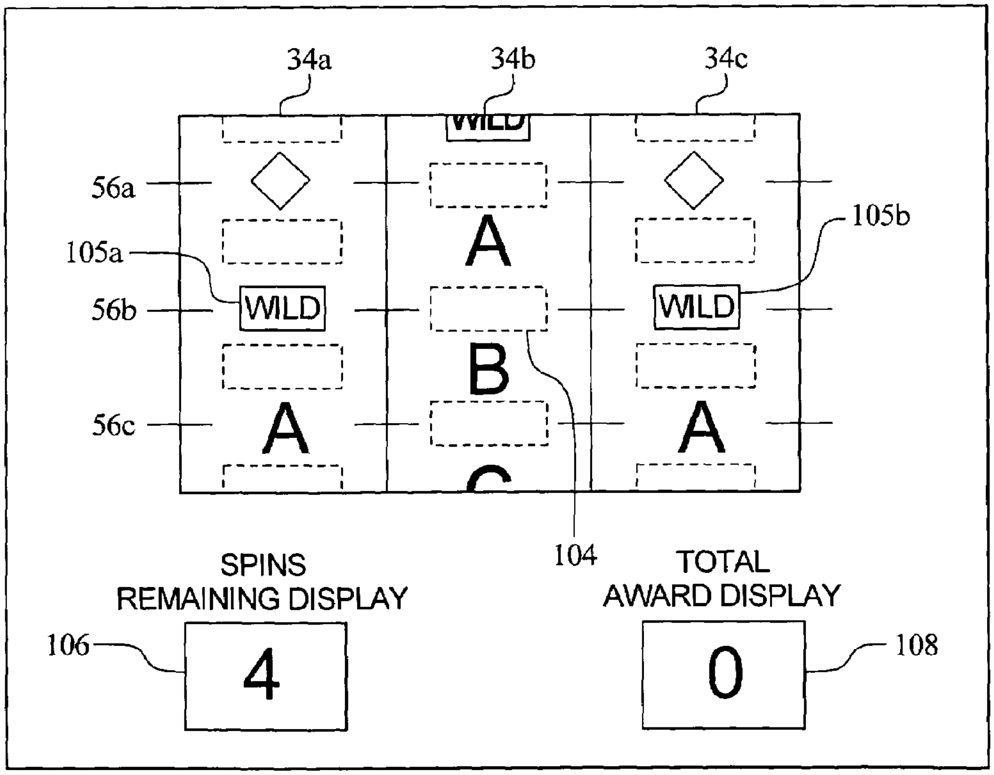

Referring to FIG. 5D, the outside reels 34*a* and 34*c* are stationary or cannot be re-activated, therefore the gaming device or player can only re-activate or re-spin reel 34*b*. In FIG. 5D the gaming device re-activates reel 34*b* and a null symbol 104 is indicated on payline 56*b*. The symbol combination of a wild symbol 105*a*, a null symbol 104 and wild symbol 105*b* on reels 34*a*, 34*b* and 34*c*, respectively, is not a winning symbol combination in the game. Therefore, the player does not receive an award for this symbol combination. However, the null symbol 104 does not end the game, but instead causes the gaming device to automatically re-spin or re-activate reel 34*b*. Thus, the null symbol 104 provides the player with another opportunity to obtain an award symbol in the game. The number of spins remaining in the award mode does not decrease as indicated by the spins remaining display 106 and the total award still remains at zero as indicated by the total award display 108.

Alternatively, as indicated above, the game upon the occurrence of the null symbol can change such as increment a modifier (such as a multiplier) which is employed to modify and preferably increase the award to the player.

Figure 5E:
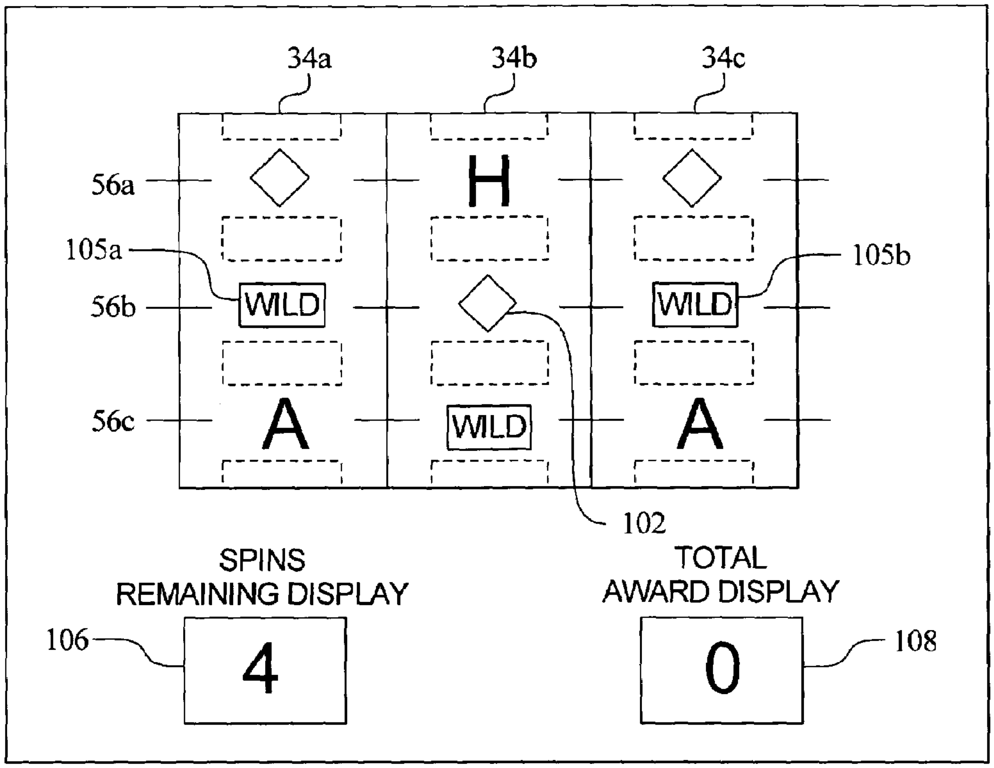

Referring to FIG. 5E, the gaming device or player re-activates reel 34*b* in the game. The trigger symbol or diamond symbol 102 is indicated on payline 56*b* on reel 34*b*. The resultant symbol combination is the wild symbol 105*a*, the trigger symbol 102 and the wild symbol 105*b*, on reels 34*a*, 34*b* and 34*c*, respectively, which is not a winning symbol combination. Similar to the null symbol 104 shown in FIG. 5D, the trigger symbol or diamond symbol 102 causes the gaming device to re-activate or re-spin reel 34*b*. Therefore, the player has another opportunity to obtain an award symbol in the game. The number of spins remaining in the bonus mode and the total award did not change in the game as indicated by the spins remaining display 106 and the total award display 108.

Figure 5F:
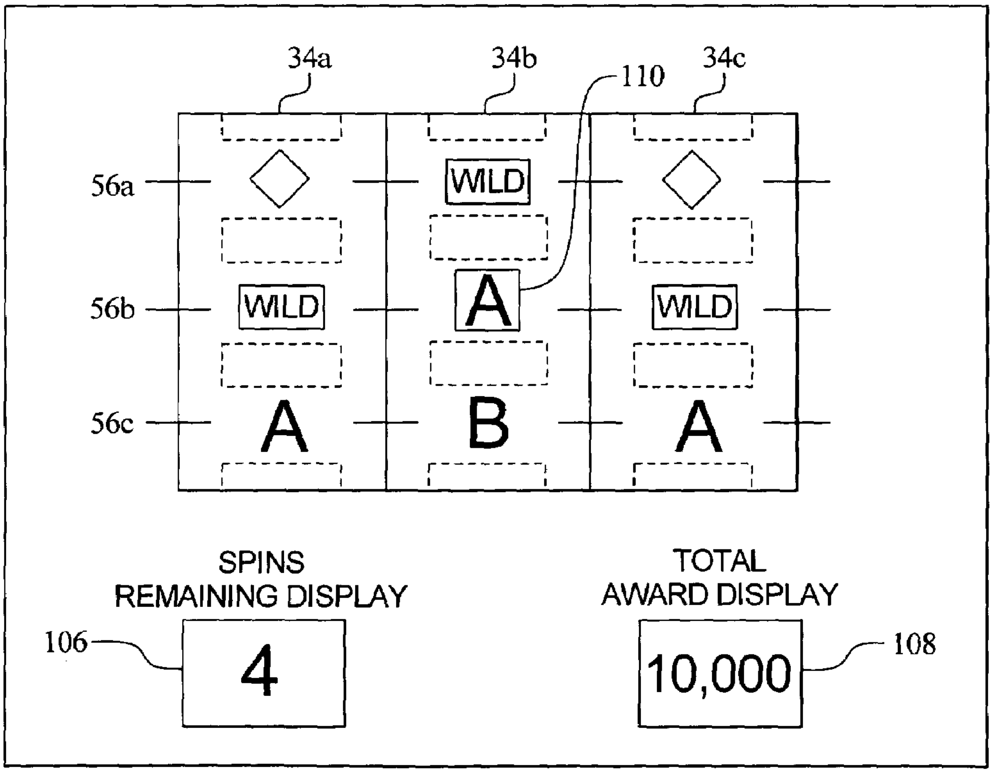

Referring to FIG. 5F, the gaming device or player re-spins and re-activates reel 34*b* in the award mode. After this spin, an award symbol designated by the letter A (110) is indicated on payline 56*b* on reel 34*b*. As a result, a winning symbol combination including wild symbol 105*a* on reel 34a, award symbol 110 on reel 34*b* and wild symbol 105*b* on reel 34*c* is indicated on payline 56*b*. This symbol combination provides a combination of three A symbols 110 because the wild symbols act or equal the award symbol 110. In this example, a combination including three A symbols provides the jackpot or largest award of ten thousand to the player as indicated by the total award display 108. Thus, the trigger symbol or diamond symbol 102 increases the probability or likelihood that the player will obtain an award and particularly the jackpot award in the game. The player has four spins remaining as indicated by the spins remaining display 106. In one embodiment, the player uses the remaining spins to spin the reels four more times in the award mode. In another embodiment, the game ends when the player obtains an award in the game.

Figure 6:
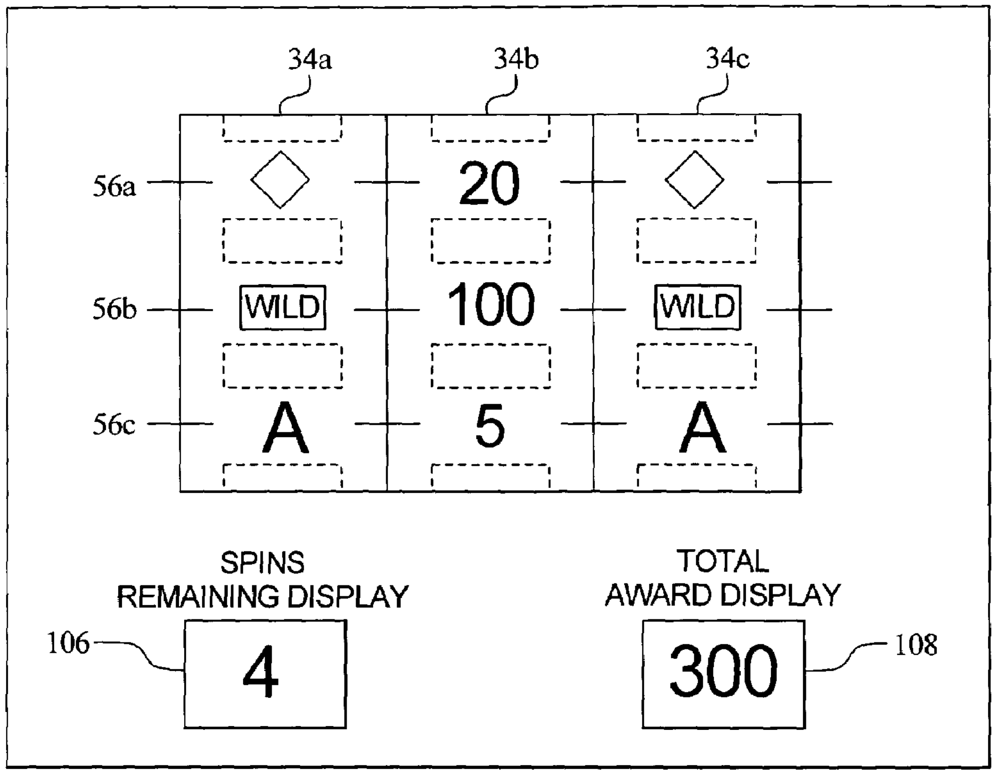
FIG. 6 is an enlarged elevation view of one of the display devices of FIGS. 1A and 1B illustrating another embodiment of the present invention.

Referring to FIG. 6, another embodiment of the present invention is illustrated where the symbols on the middle or central reel 34*b* include awards, such as the values of twenty, one hundred and five. In the award mode of this embodiment, the player re-spins or re-activates reel 34*b* until one of the award values are indicated on payline 56*b*. Instead of obtaining a winning symbol combination in the game, the player obtains three times the value of the indicated award or value on payline 56*b*. For example, in FIG. 6, the award of one hundred is indicated on payline 56*b* in the award mode. Therefore, the combination of the award of one hundred with the wild symbols 205*a* and 205*b* provide an award of three hundred because the wild symbols match the award value indicated on payline 56*b* on reel 34*b*. Thus, the player obtains an award of three hundred as indicated by the total award display 108 in the award mode. It should be appreciated that any symbols, values or any combination of symbols or values may be employed on the reels in the award mode of the game of the present invention.

Figure 7:
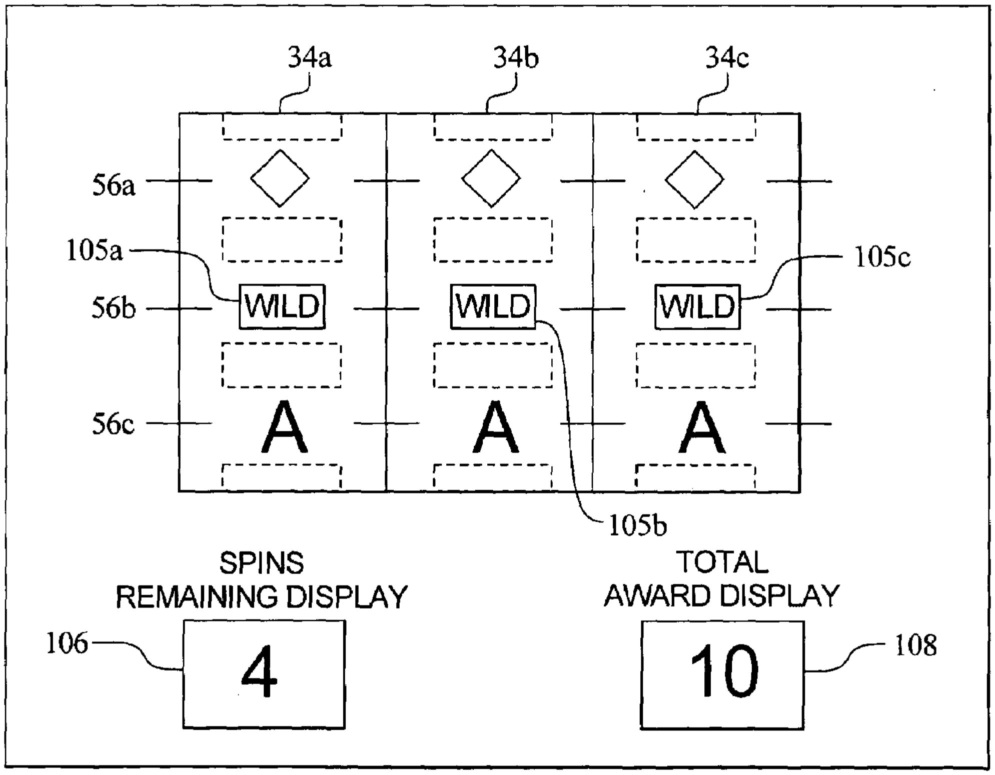
FIG. 7 is an enlarged elevation view of one of the display devices of FIGS. 1A and 1B illustrating a further embodiment of the present invention.

Referring to FIG. 7, a further embodiment of the present invention is illustrated where the middle or center reel 34*b* includes a wild symbol 105*b*. In this embodiment, the player re-spins reel 34*b* after obtaining the trigger symbol or diamond symbol 102 as described above. If the player obtains the wild symbol on payline 56*b* on reel 34*b*, the player obtains a symbol combination including three wild symbols 105*a*, 105*b* and 105*c*. Thus, the player obtains the largest award or the highest or most desirable symbol combination associated with the game such as the jackpot symbol combination because the player obtained three wild symbols on payline 56*b*. Thus, the wild symbol 105*b* increases the probability that the player will obtain the largest award such as the jackpot award in the game. In another embodiment, an award or award value is associated with the symbol combination including the wild symbol as shown in FIG. 3B.

In one alternative embodiment of the present invention, the number of spins of the reel can be limited such as to a predetermined number, a randomly determined number, or a number based on another functional game element such as the player's wager.

Probability-Enhancing Wild Symbol

Referring now to FIGS. 8, 9A to 9D, and 10A to 10D, in one alternative embodiment of the present invention, the probability-enhancing symbol is a wild symbol. In a preferred embodiment, when a designated number such as one or more wild symbols 101, 103, and 105 appear on or are displayed on at least one of five reels 34*a*, 34*b*, 34*c*, 34*d*, and 34*e*, during a primary or secondary game, a bonus game re-initiation mode of the game is triggered. The reels may be mechanical reels or video reels as described above. It should be appreciated that any suitable number of reels may be employed in the base or bonus game. In this embodiment, each of the reels 34*a*, 34*b*, 34*c*, 34*d* and 34*e* includes award symbols 100*a* to 100*h*, which are represented by letters A 100*a*, B 100*b*, C 100*c*, D 100*d*, E 100*e*, F 100*f*, G 100*g*, and H 100*h*, non-award or null symbols or blanks 104, and at least one wild symbol 101. It should also be appreciated that, although the award symbols are illustrated as letters, the award symbols may be any suitable symbols such as conventional symbols on slot machines, wherein individual symbols or specific combinations of symbols result in wins or award outcomes.

Figure 9A:
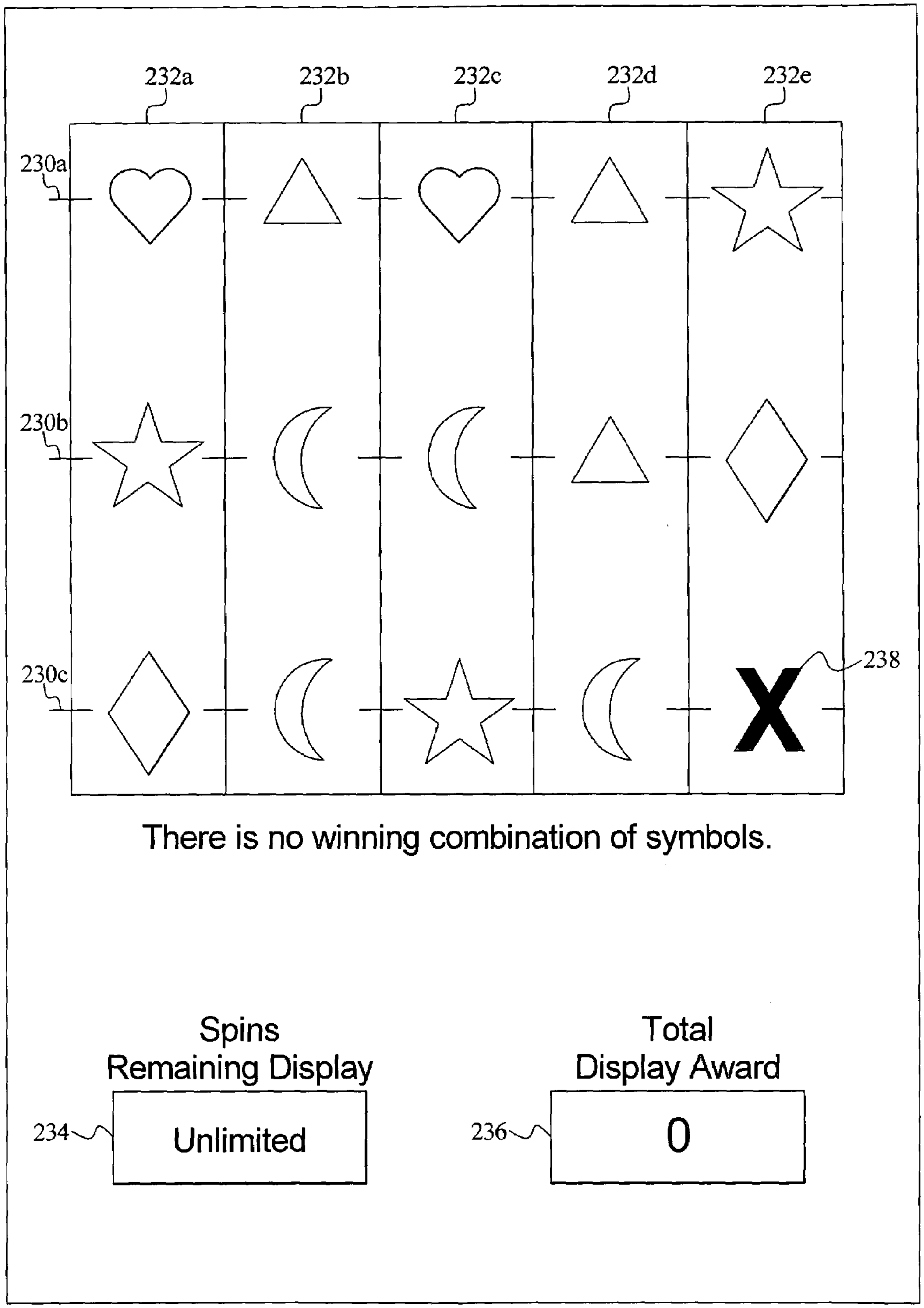
FIGS. 9A, 9B, 9C, 9D, 9F, 9G, and 9H, are enlarged front elevation views of one of the display devices of FIGS. 1A and 1B illustrating an example of one of the embodiments of the present invention where non-designated reels remain activated during a re-initiation mode.
Figure 9B:
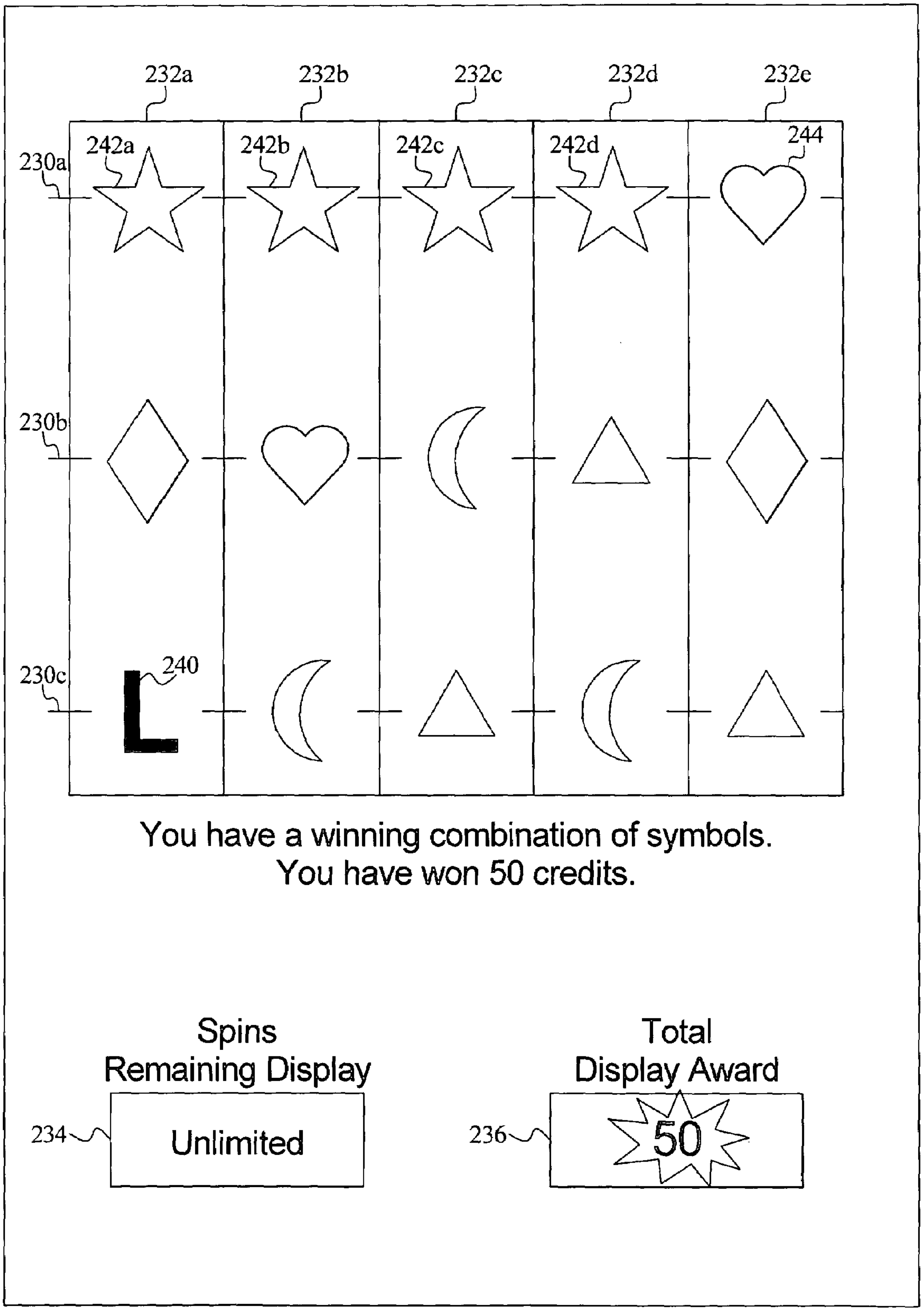
Figure 9C:
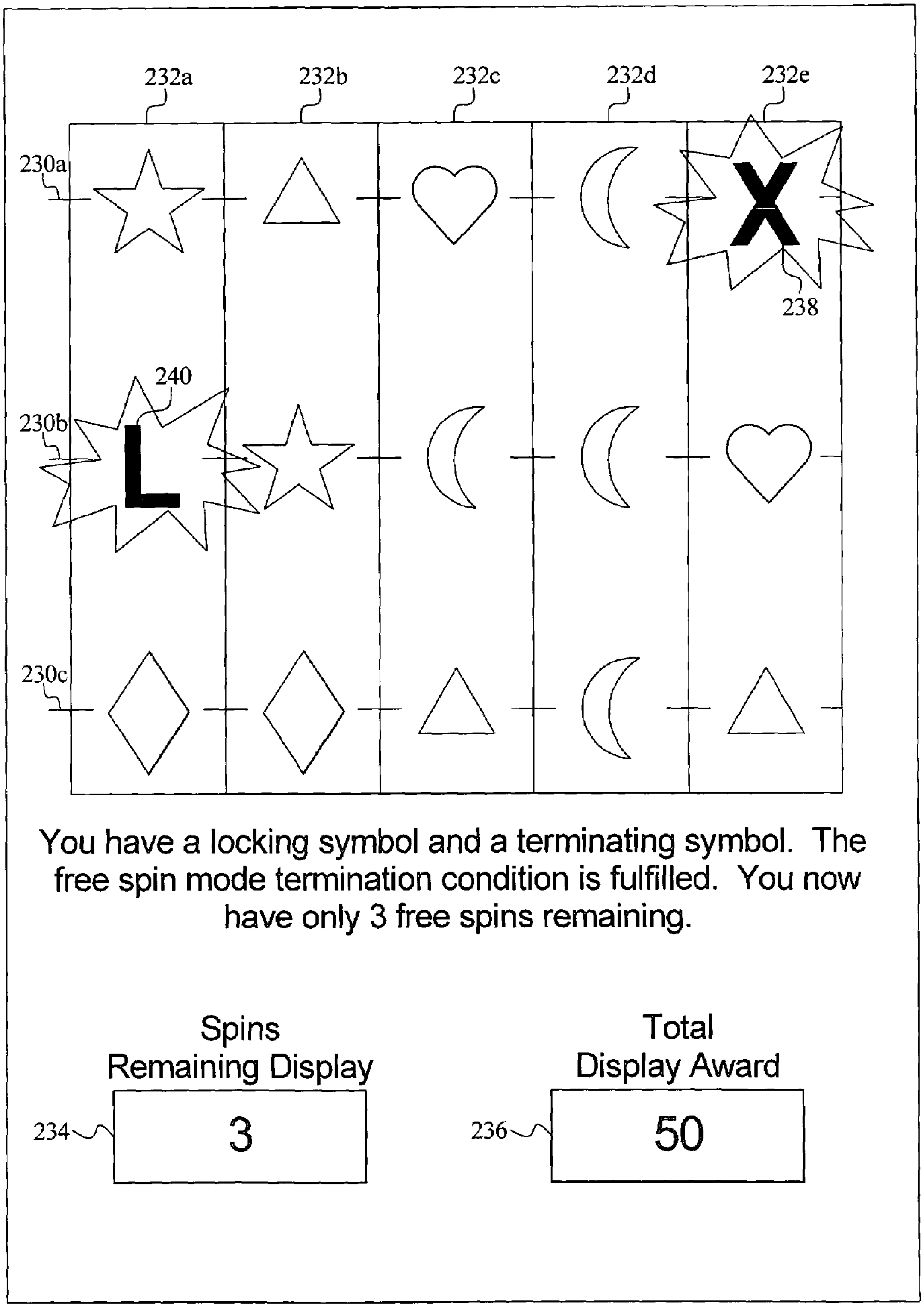
Figure 9D:
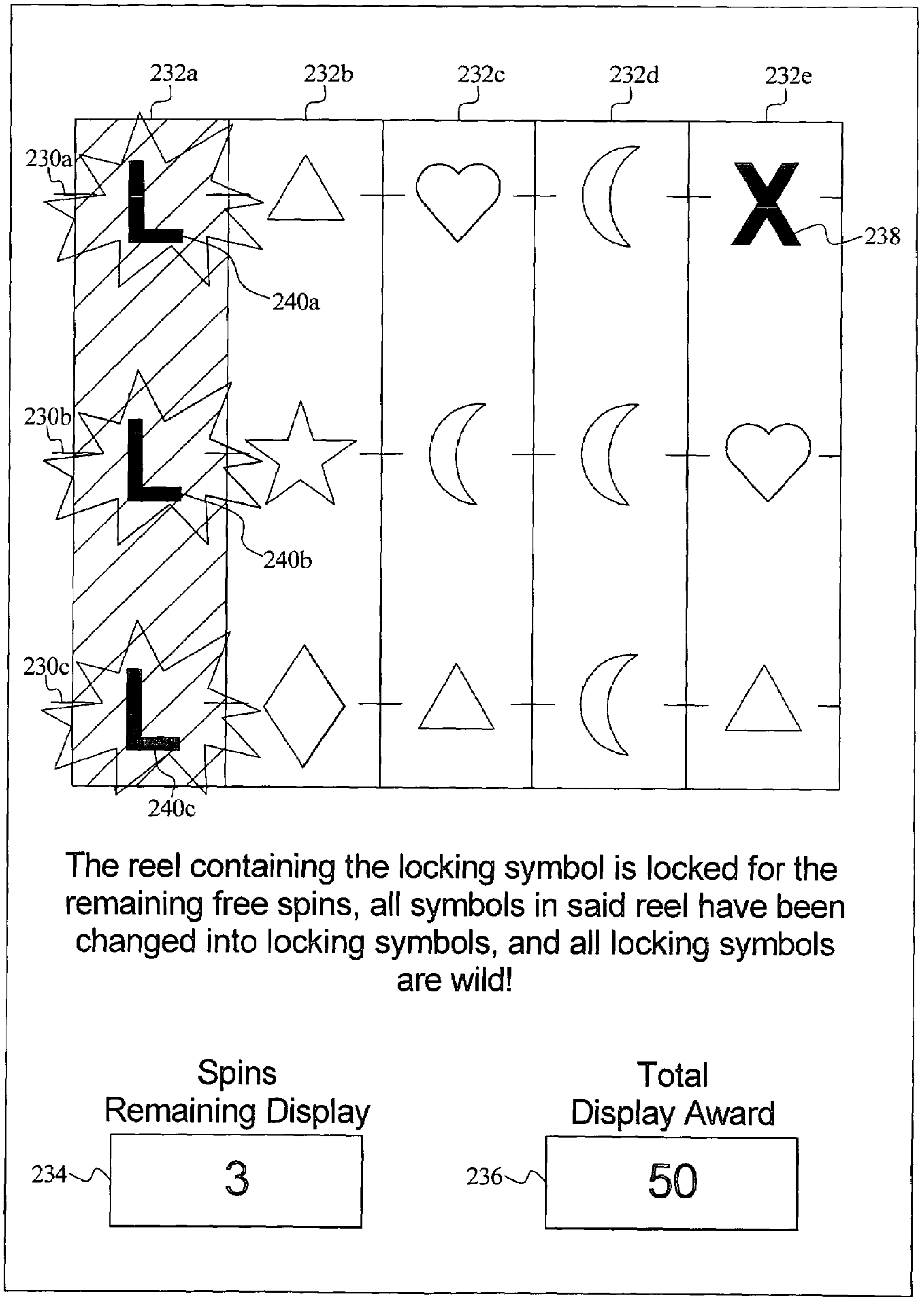
Figure 9E:
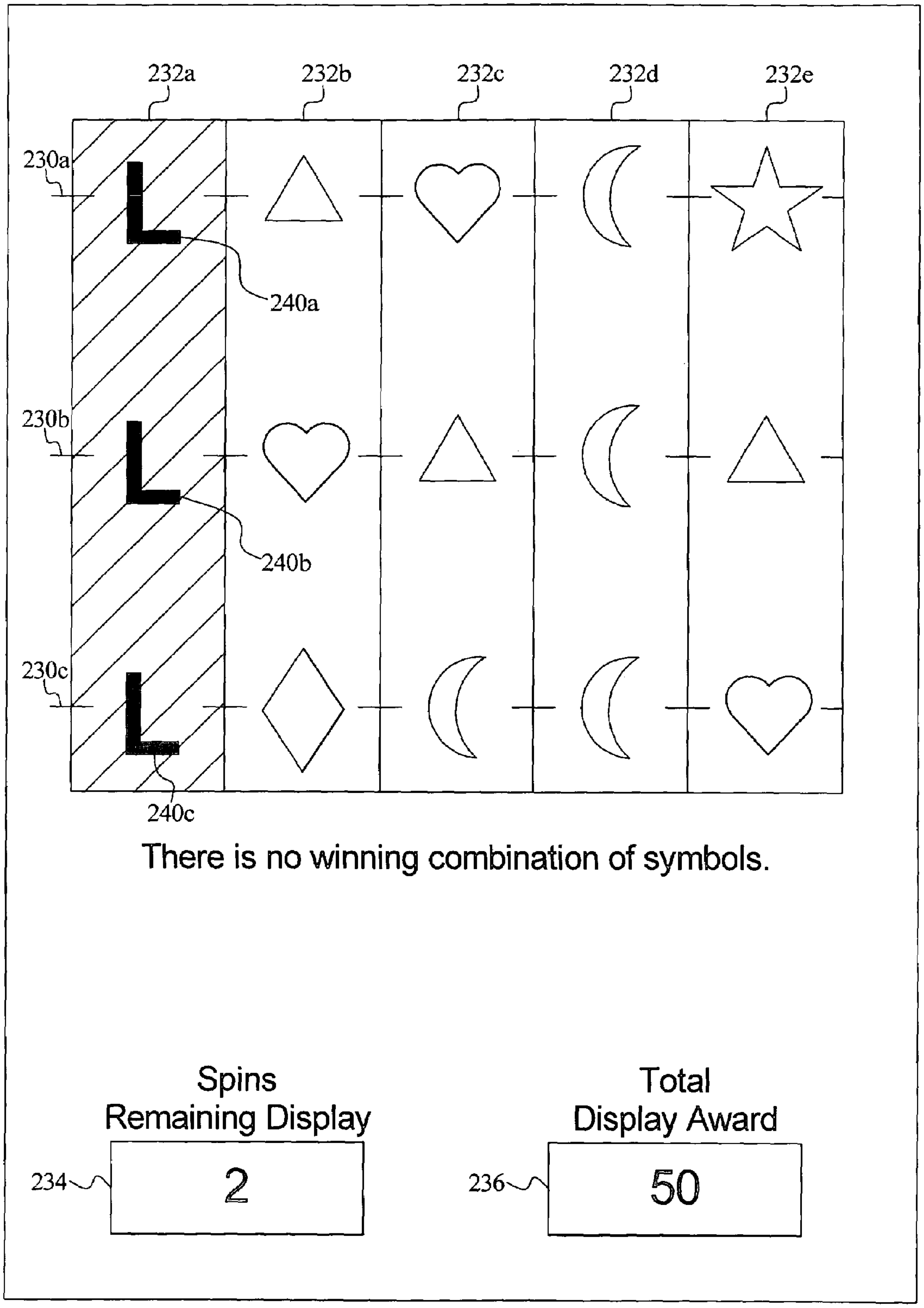
Figure 9F:
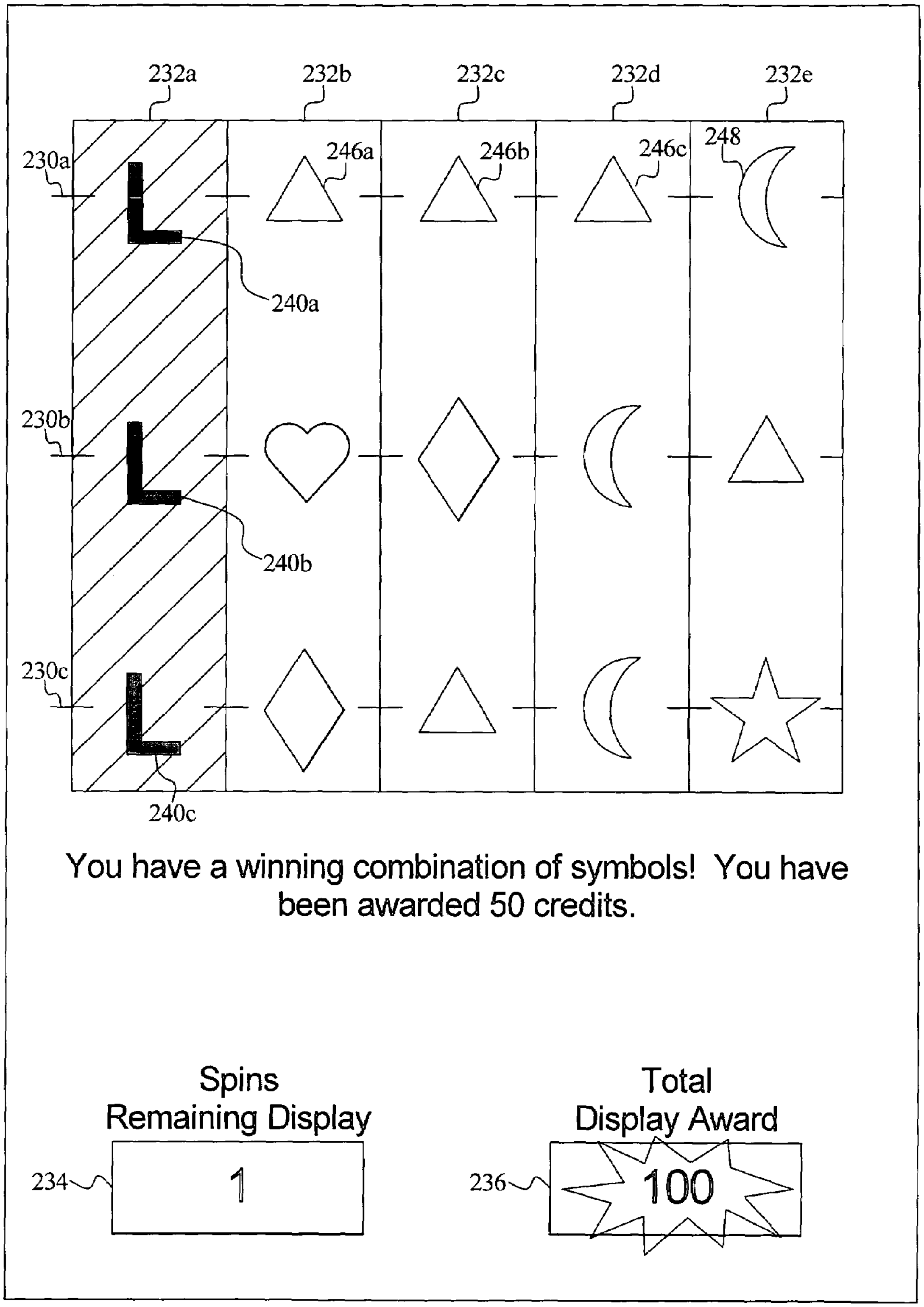
Figure 9G:
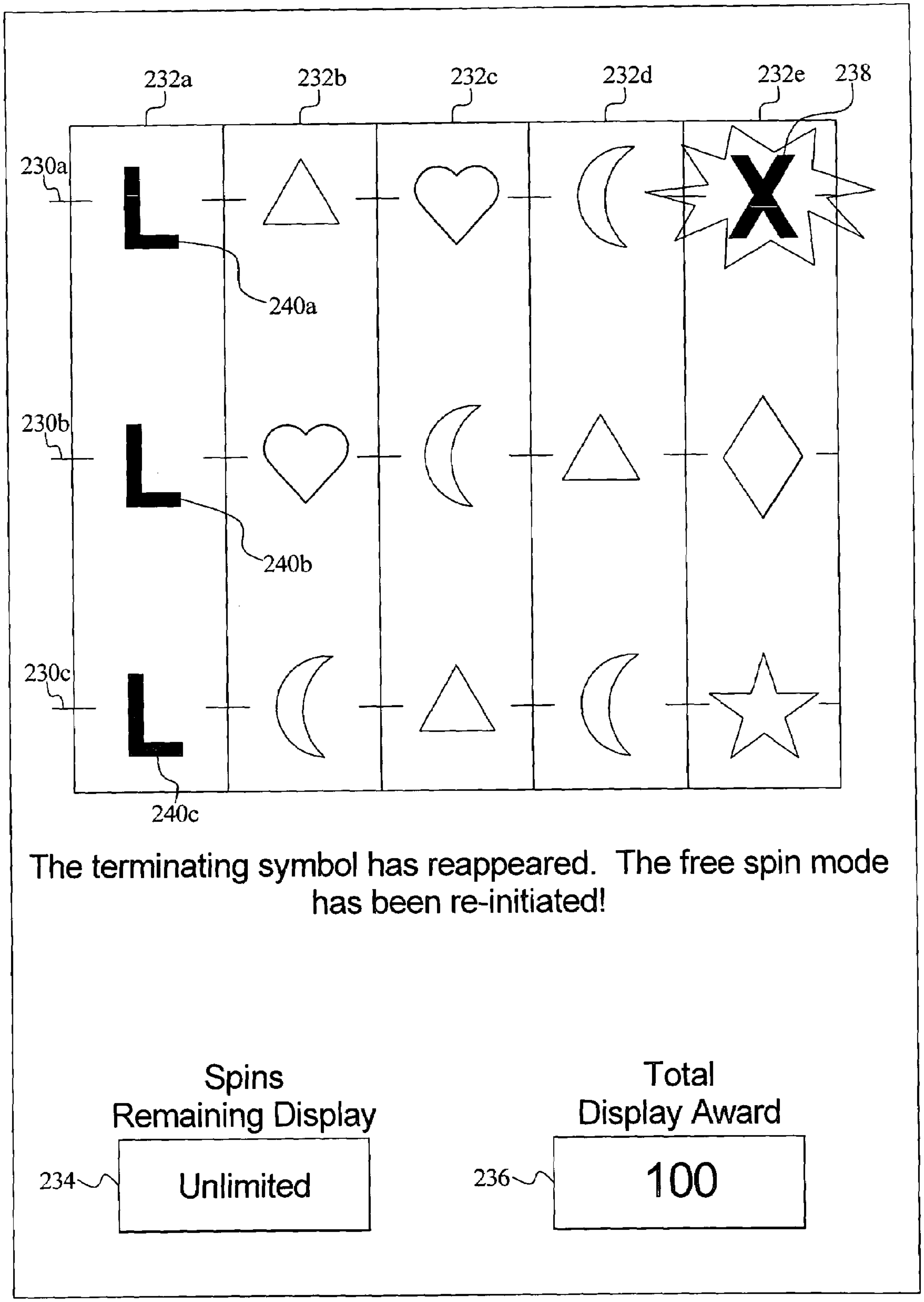
Figure 9H:
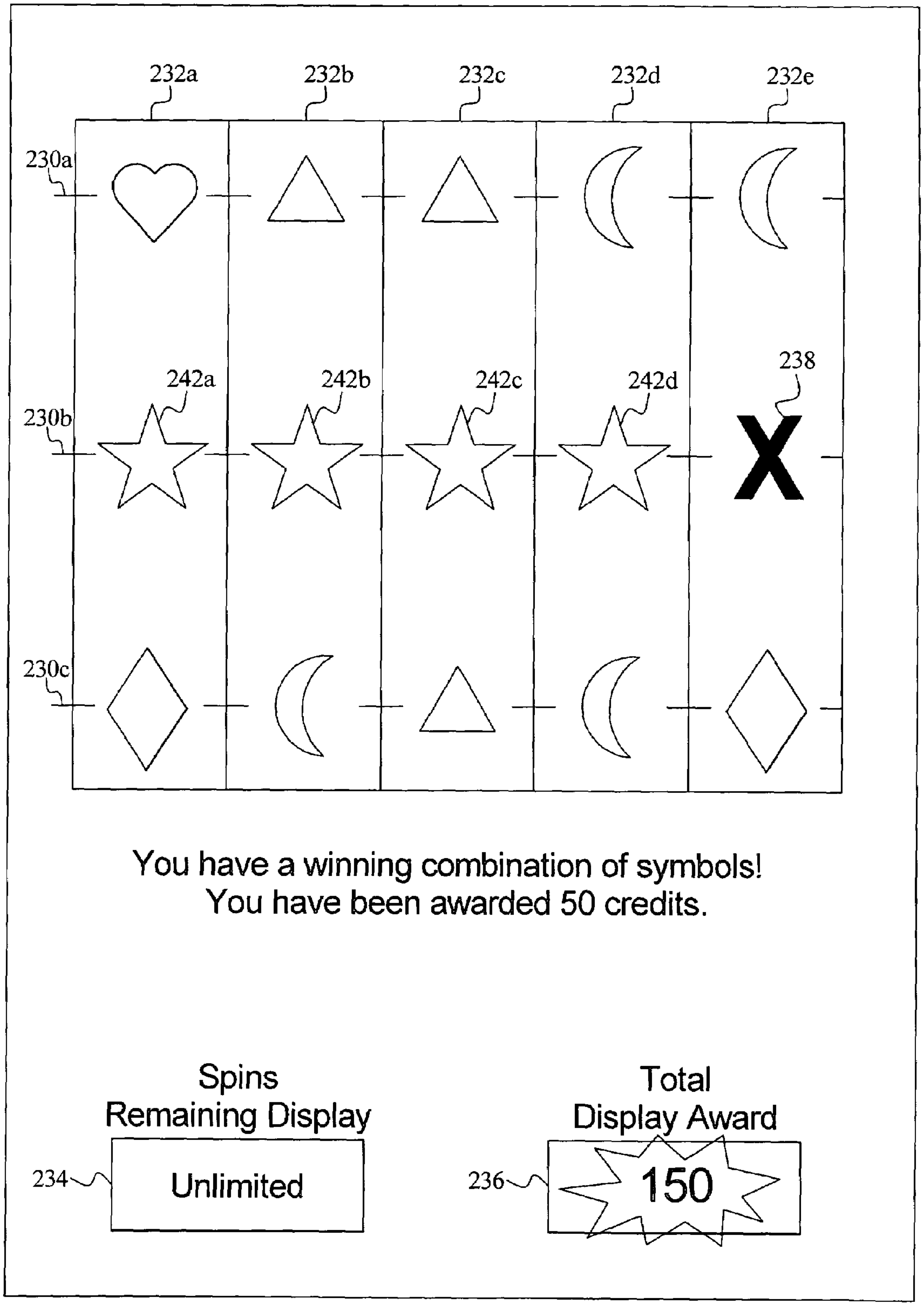

In one embodiment, the middle three reels 34*b*, 34*c*, and 34*d* are designated to be activated in the re-initiation mode of the secondary game and include at least one wild symbol 101, 103, and 105 on each designated reel 34*b*, 34*c* and 34*d*, respectively as best illustrated in FIG. 9D. It should be appreciated that one or more of the other, non-designated reels 34*a* and 34*e* may include at least one wild symbol and may be activated in the re-initiation mode. Each symbol is positioned at a reel stop position or reel stop on each of the reels. Therefore, one of the symbols, such as one of the award symbols 100, one of the null symbols 104, or the wild symbols 101, 103, and 105 will be indicated on at least one of the paylines in the game.

A plurality of awards are associated with the award symbols 100 or combinations of award symbols as illustrated in the example paytable in FIG. 3B. It should be appreciated that an alternative or different paytable may be used in the re-initiation mode. The awards may be values, credits, free spins, free games, modifiers such as multipliers, or any other suitable outcome or outcomes. In one embodiment, a null symbol does not provide an award to the player.

Figure 8:
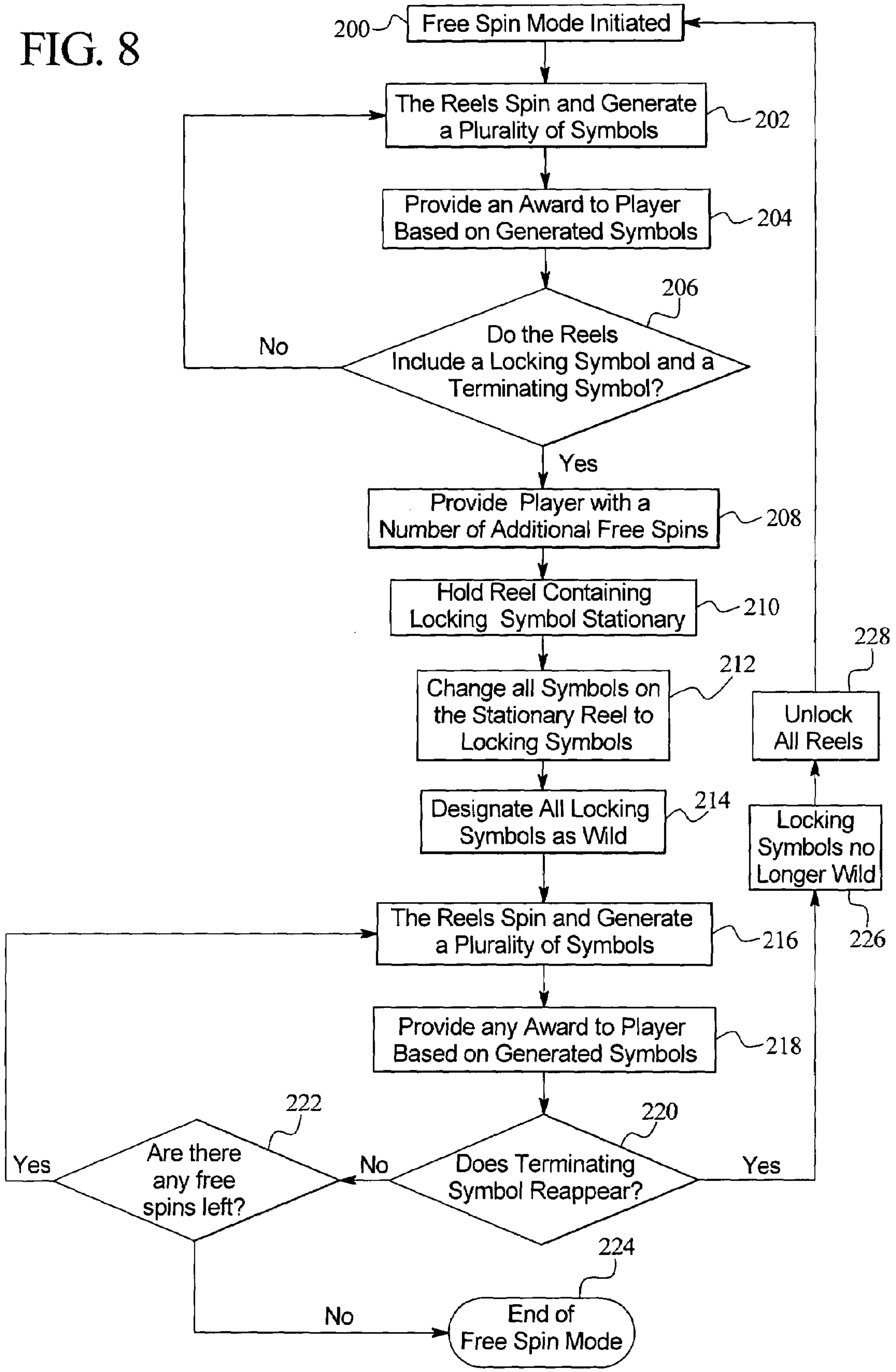
FIG. 8 is an enlarged front elevation view of one of the display devices of FIGS. 1A and 1B illustrating an example of one of the embodiments of the present invention before a re-initiation mode is initiated.

In an example of one embodiment of the present invention illustrated in FIG. 8, the gaming device provides the player with one or more free spins of the reels in a primary or bonus game after the player achieves a bonus-triggering or qualifying condition during the primary game. The triggering event may be a symbol or a combination of symbols occurring on the reels, or any other suitable event. The designated number of spins may be predetermined, randomly determined, based on an event in the base game, or determined using any other suitable method. In the free spins game, the gaming device or the player spins or activates the reels 34*a*, 34*b*, 34*c*, 34*d*, and 34*e* for the determined or designated number of spins.

The gaming device continues to spin the reels and to provide the player with an award, if any, in each of the free spins of the reels until there are no free spins remaining in the game as indicated by the spins remaining display 106.

In one embodiment, the gaming device provides an award associated with at least one winning symbol combinations indicated on one of the paylines 56*a*, 56*b*, or 56*c* associated with the reels. Alternatively, the gaming device provides the player any awards associated with the award symbols indicated on any activated payline 56*a*, 56*b*, or 56*c*. In each of the activations, the gaming device illustrated in FIG. 8 indicates the award or awards 117 in an award display 107 associated with any award symbols and updates a total award display 108, which indicates the awards accumulated by the player in the game. It should be appreciated that the gaming device or player may choose to determine the total award 118 after each of the free spins or after a plurality of free spins in the game.

In the example illustrated in FIG. 8, the gaming device activates or spins the reels at the beginning of, or during a free spins bonus game. The reels stop, and a combination of three identical symbols appear adjacent to one another along payline 56*b*. According to the paytable in FIG. 3B, the player receives an award 117 of seventy-five associated with the combination of three E symbols on a payline 56*b*. The award 117 of seventy-five is displayed in the award display 107, and the total award display 108 is updated to give the player a total award 118 of seventy-five in the game. The player has only two spins 116 remaining in the game as indicated by the spins remaining display 106. The gaming device activates or spins the reels 34*a* to 34*e*.

Referring to FIG. 9A, the reels 34*a* to 34*e* stop spinning and indicate a wild symbol 101 on the middle reel 34*c*. In one embodiment, the presence of the wild symbol 103 on the display, initiates a re-initiation mode of the gaming device. It should be appreciated that more than one wild symbol may be displayed on the reels to begin a re-initiation mode. Alternatively, the wild symbol 101 must be indicated on one of the paylines 56*a*, 56*b*, or 56*c* to initiate a re-initiation mode.

In the re-initiation mode, the gaming device activates or provides the player a predetermined or randomly determined number of free spins of the remaining non-fixed reels 34*a*, 34*b*, 34*d*, and 34*e* while fixing, locking or holding stationary the reel 34*c* displaying the wild symbol 103. In this example, the player is provided a predetermined number of five free spins at the onset of the re-initiation mode, resetting the spins remaining display 106 to five instead of one. Alternatively, the number of free spins provided to the player in the re-initiation mode are added to the number of spins remaining in the secondary game or are based on another event in the game. In an alternative embodiment, an unlimited number of free spins are provided until a lock feature initiates and then the player must acquire a designated number of wild symbols to re-initiate the free spin mode. If such symbols are not obtained, no further free spins are provided to the player. Thus, there can be no limit on when the re-trigger event has to occur. The event after the triggering event in the free spin mode thus includes a terminating result and a non-terminating result based on whether the number of designated symbols are generated in a limited number of tries or activations of one or more of the reels.

In one embodiment, the outside reels remain activated to display generated combinations of symbols representing awards. Although the outside reels remain activated and are able to be spun along with the designated reels, in one embodiment, only the other two designated middle reels 34*b* and 34*d* must display wild symbols on the reels to continue the bonus game. Alternatively, the gaming device requires wild symbol 103 to be indicated on the same payline 56*b*, or another payline 56*a* or 56*c* as the wild symbol 101 to continue the bonus game.

FIG. 9B illustrates one example of an embodiment of the present invention which enables the player to accumulate awards during the re-initiation mode using one or more wild symbols. In one embodiment, the wild symbol itself does not provide an award to the player in the game. In another embodiment, an award is associated with the wild symbol and is provided to the player if the wild symbol is indicated on the reel after the reel is re-activated in the re-initiation mode. In another embodiment, the wild symbol is considered to represent any symbol for the purpose of determining if a combination of symbols exists which correspond to an award. It should be appreciated that any of the aforementioned wild symbol embodiments can be combined in a game as in the illustrated example.

In the illustrated example of one embodiment, the re-initiation mode uses the paytable used in the primary or secondary game to determine the awards associated with different symbol combinations. Alternatively, a different paytable may be used in the re-initiation mode.

Referring to FIG. 9B, two F symbols 100*f* are displayed adjacent to the wild symbol 101. The wild symbol 101, in this embodiment, represents an F for the purposes of generating a combination of three F symbols. The combination of three F symbols 100*f* in this embodiment corresponds to an award 117 of fifty according to the paytable of FIG. 3B. The award 117 of fifty is added to the previous total award 118 of seventy-five to bring the total award 118 to one-hundred twenty-five as indicated in the total award display 108. No wild symbol was generated in the first of five free spins; therefore, the gaming device re-spins or re-activates the designated reels 34*b* and 34*d* having no wild symbols displayed and the non-designated reels 34*a* and 34*e*.

In FIG. 9C, a wild symbol 103 is indicated on reel 34*d*. In one embodiment, if a wild symbol is displayed on at least one of the remaining middle reels 34*b* or 34*d*, the gaming device holds or keeps the reel stationary along with the originally indicated wild symbol 101 on reel 34*c*. Alternatively, the gaming device does not hold stationary the reel unless a wild symbol is displayed on the same payline 56*b* of at least one of the remaining middle reels 34*b* or 34*d* as the originally indicated wild symbol 101 on reel 34*c*.

Also, in FIG. 9C, two identical award symbols appear adjacent to a wild symbol. The "D" symbol 100*d* appears on the same payline on reels 34*a* and 34*b* as the wild symbol displayed on reel 34*c*. In one embodiment, this combination, according to the table in FIG. 3B, represents an award of one-hundred. The award 117 of one-hundred is added to the total award display 108 to yield a total award 118 of two hundred twenty-five.

In FIG. 9D, the gaming device generates and displays a third wild symbol 105 on the designated middle reel 34*b*. In one embodiment, the bonus game is extended when a wild symbol appears on each of the three designated reels 34*b*, 34*c*, and 34*d*. Alternatively, the wild symbol must appear on an activated payline on each of the three designated reels. In a further embodiment, the wild symbols 101, 103, and 105 must appear on the same activated payline. In FIG. 9D, the presence of three wild symbols 101, 103, and 105 on the three middle reels 34*b*, 34*c*, and 34*d*, extends the bonus game. As a result, in one embodiment, the player is provided additional free spins 116 to be used in the extended bonus game. The bonus game will continue until, in one embodiment, a wild symbol appears on any of the designated reels or activated or non-activated paylines. In one embodiment, the bonus game will continue until a wild symbol appears on one of the three middle reels 34*b*, 34*c*, and 34*d*.

In addition to re-initiating the bonus game, in one embodiment, if the wild symbols appear on the same payline, any award symbol indicated on the same payline of the reel adjacent to the indicated wild symbols will provide a winning symbol combination according to the paytable of FIG. 3B. In FIG. 9D, because two wild symbols are on the same payline 56*b*, in an embodiment where the outside reels remain active during the re-initiation mode, an award symbol displayed on a reel on either side of the wild symbol pair will generate an award. In FIG. 9D, the "E" symbol is displayed on reel 34*a*, adjacent and on the same payline 56*b* on reels 34*b* and 34*c* as the wild symbols 101 and 103. The two wild symbols in this embodiment function as symbols identical to the third adjacent symbol 100*e*. This symbol combination of three identical "E" symbols corresponds to award 117 of seventy-five in the paytable illustrated in FIG. 3B. The award 117 of seventy-five is then added to the total award display 108 to yield a total award 118 of three-hundred indicated in the total award display 118. Therefore, in this embodiment, when two wild symbols are on adjacent reels and are indicated on the same payline on both reels, the gaming device only needs to generate one award symbol adjacent to the wild symbols to win an award in the re-initiation mode. It should be appreciated that the player, in one embodiment, can qualify for more than one award based on multiple award-generating combinations on the reels.

Figure 10A:
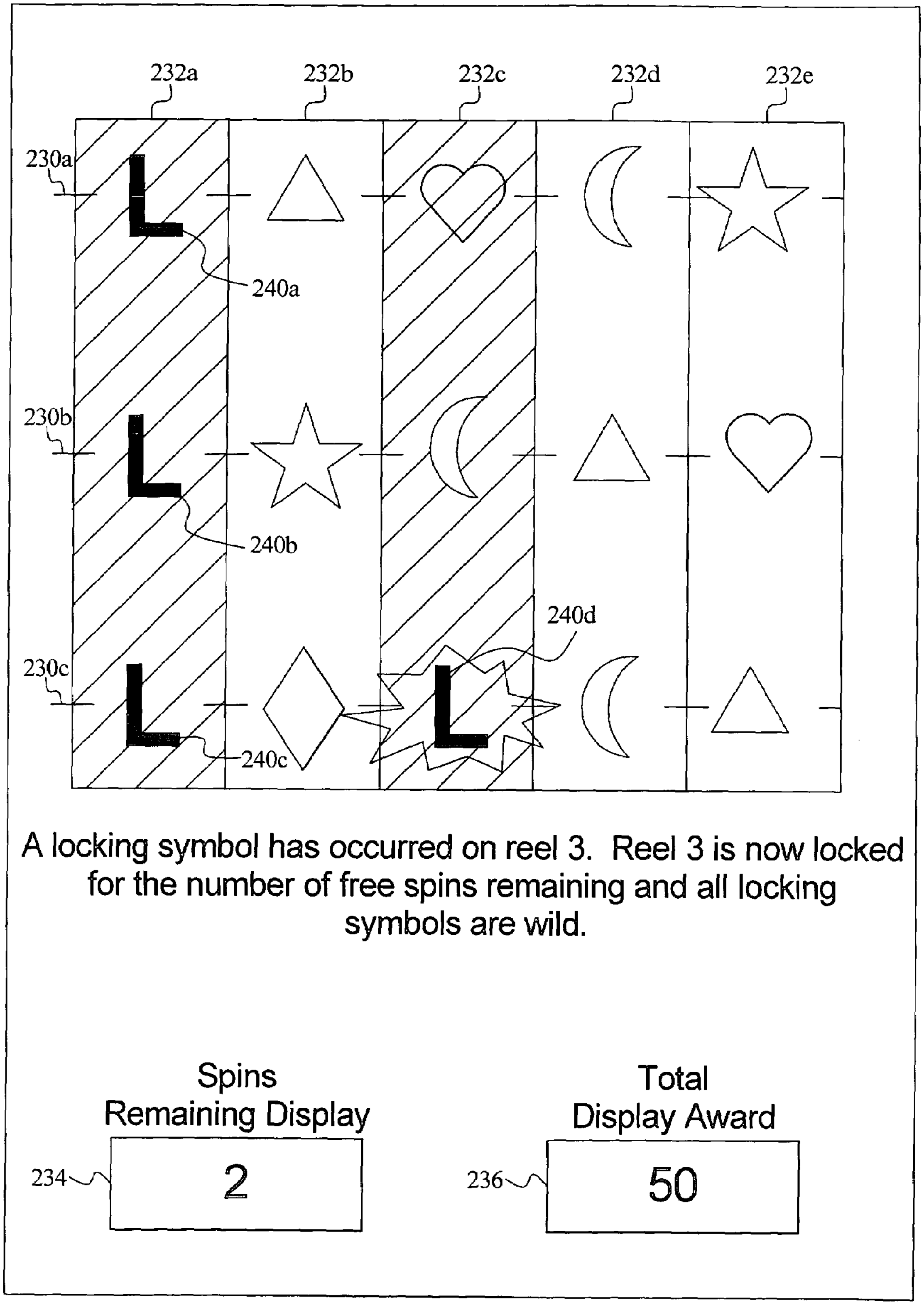
FIGS. 10A, 10*b*, are enlarged front elevation views of one of the display devices of FIGS. 1A and 1B illustrating an example of one of the embodiments of the present invention where non-designated reels are locked during a re-initiation mode.

Referring now to FIGS. 10A to 10D, in an alternative embodiment, the gaming device inactivates non-designated reels reducing the number of reels to the designated reels on which to generate a symbol combination. In FIG. 10A, the display reveals the same result of the spin in FIG. 9A continued from the game in FIG. 8. The gaming device fixes, locks or holds stationary the non-designated reels 34*a* and 34*e* along with the designated reel 34*c* displaying wild symbol 101. Therefore, only the other two designated reels 34*b* and 34*d* remain activated to determine whether a bonus game is extended and to generate awards. As in the previous embodiment, the player is provided a renewed number of five free spins. Although the gaming device provides the player five free spins to generate a wild symbol on each of the designated reels or paylines of reels 34*b* and 34*d*, in one embodiment, the gaming device continues to provide the player awards throughout the re-initiation mode.

Figure 10B:
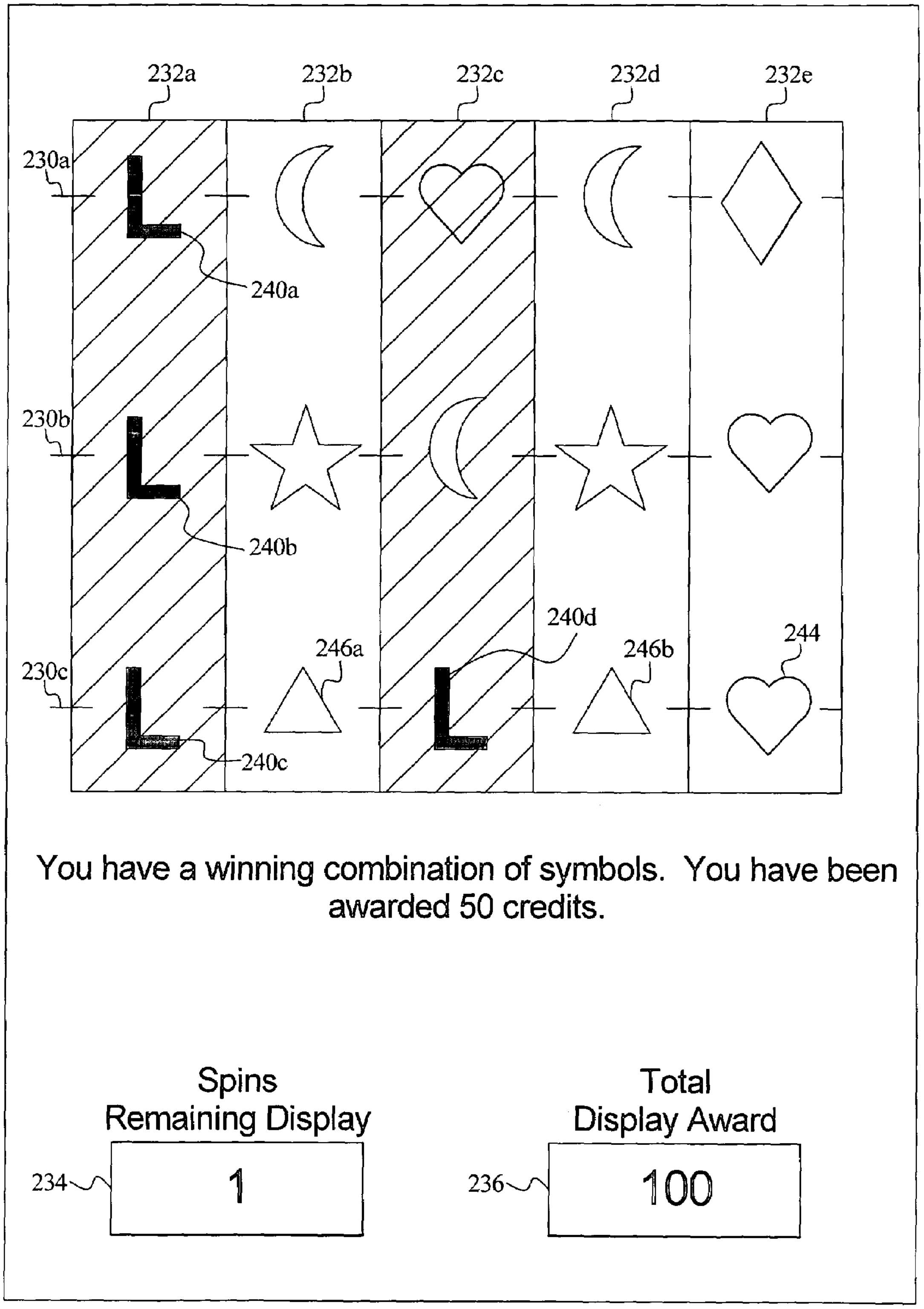

In FIG. 10B, designated reels 34*b* and 34*d* are reactivated or re-spun. In one embodiment, the symbols displayed on the non-designated reels are considered in determining whether a symbol combination representing an award is present. In FIG. 10B, the "E" symbol 100*e* on reel 34*e* combines with the "E" symbol generated on reel 34*d* and the wild symbol 101 on reel 34*c* to produce a combination of three "E" symbols representing an award 117 of seventy-five according to the paytable of FIG. 3B. Seventy-five is then added to the total award display 108 of FIG. 8, bringing the accumulated total award 118 to one-hundred fifty as displayed in the total award display 108.

In FIG. 10C, designated reels 34*b* and 34*d* are reactivated or re-spun because no wild symbol was generated on either of the reels in the previous spin. In this spin, a wild symbol 103 appears on reel 34*d* of the display and that reel is locked. The player now has three spins to generate one wild symbol on reel 34*b* in order to reinitiate the bonus game and, in one embodiment, to receive an additional number of free spins.

Because no combination of symbols representing an award according to the paytable in FIG. 3B exists, no award is provided to the player.

In FIG. 10D, a wild symbol is displayed on reel 34*b*. In the illustrated embodiment, the bonus game is reinitiated if a wild symbol is displayed anywhere on each of the designated reels 34*b*, 34*c*, and 34*d*. Alternatively, the wild symbols must appear on the same payline to reinitiate the bonus game. In such an embodiment, in the illustrated example of FIG. 10D, the remaining spins are used to generate a wild symbol 103 on the same payline 56*b* on reel 34*d* as the wild symbols 101 and 105 on reels 34*b* and 34*c*.

It is desirable for the player, in one embodiment, for two wild symbols to appear on the same payline of the reels. The remaining activated reel can then generate an award by displaying any award symbol on the same payline as the displayed wild symbols. In the example illustrated in FIG. 10D, a null symbol or blank is indicated on the same payline 56*b* as the two wild symbols 135 and 105 on adjacent reels. However, the gaming device does not provide an award to the player for this combination.

In one embodiment, if the bonus game is not re-initiated, the gaming device provides the player the award 118 in the total award display 108. If the bonus game is re-initiated, in one embodiment, the award 118 is added to the award display of the subsequent bonus game. In FIG. 10D, three wild symbols 101, 103 and 105 appear on the designated reels 34*b*, 34*c*, and 34*d*; therefore, the player receives an additional number of free spins or activations to be used in the base game or subsequent bonus game.

It should be appreciated that fixing or locking a reel in a position once a favorable symbol is displayed alters the probability that an award or wild symbol will be generated. As discussed above, the probability of generating a combination of award symbols is increased when the number of reels activated is decreased.

In one embodiment, only one wild symbol out of twenty symbols is present on each of three designated reels. Consequently, the probability of a wild symbol being indicated on a particular payline to begin the re-initiation mode of the game is 1 in 20 chances or 5%. Alternatively, as in the illustrated embodiment, the probability of a wild symbol being displayed anywhere on a reel, and not on a particular payline, is 7 in 20 chances or 35% (each reel displays seven of the twenty symbols for each spin). Similarly, the overall probability that two other wild symbols will be displayed on the other designated reels adjacent to the reel displaying the original wild symbol is (7/20)×(7/20), which equals (49/400) or 12.25%. In contrast, in the embodiment in which the combination of wild symbols must appear on the same payline, the probability that two other wild symbols will be displayed on the same payline as the original wild symbol is (1/20)×(1/20), which equals (1/400) or only 0.25%.

Enhanced Free Activation Mode

Figure 11:
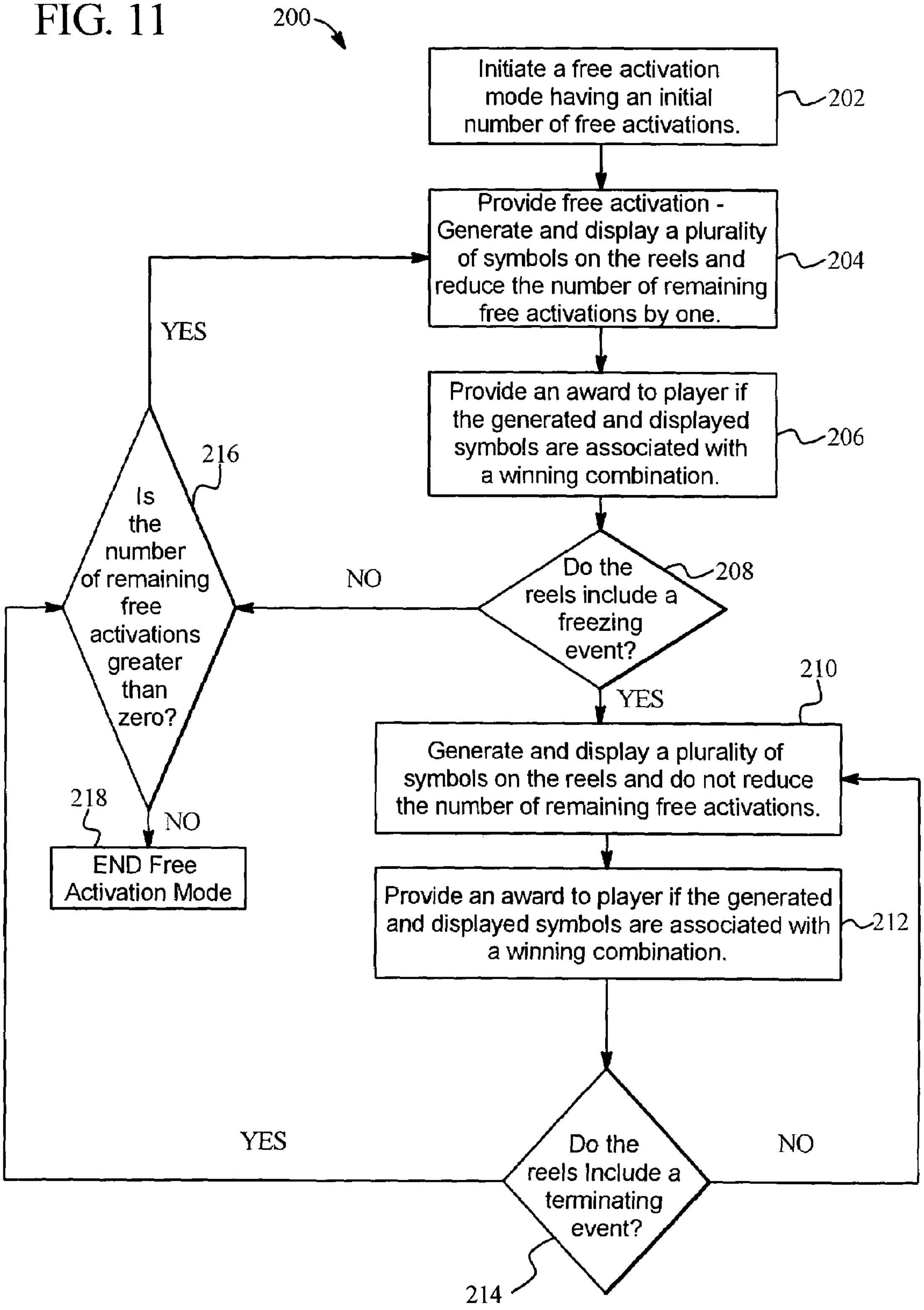
FIG. 11 is a flowchart of one of the embodiments of the present invention including a free activation mode having an initial number of free activations and where a freezing event causes the number of remaining free activations to freeze until a terminating event occurs.

Referring now to FIG. 11, in one embodiment, as shown in flowchart 200, the gaming device initiates a free activation mode having an initial number of free activations as indicated by block 202. It should be appreciated that the free activations may be of any game, such as a slot-type reel game, a card game, or any other suitable game. In the illustrated examples described below, the game is a slot-type game including a plurality of reels and a plurality of symbols on the reels. In one embodiment, the gaming device provides a free activation thereby generating and displaying a plurality of symbols on the reels as indicated by block 204. In this example, the gaming device also decreases by one the number of remaining free activations after each free activation of the reels as indicated by block 204.

It should be appreciated that the number of remaining free activations in the free activation mode may increase or decrease by any value after each subsequent activation. In one alternative embodiment, the change in value of the number of remaining free activations is constant after each subsequent activation. In another embodiment, the change in value of the number of free activations is not constant and the gaming device implements an alternative value-changing method after each activation, after a predetermined number of activations, or after any suitable number of activations. In one embodiment, rather than subtracting value, the gaming device adds value to the number of remaining free activations. In one embodiment, the gaming device determines whether to add or subtract value from the number of remaining free activations based on an event occurring in the game, a player selection, or through any other suitable method.

After providing a free activation, the gaming device determines if any of the generated and displayed symbols are associated with a winning combination of symbols as indicated by block 206. After each free activation of the reels, the gaming device determines if the generated and displayed symbols include a freezing event as indicated by decision diamond 208. It should be appreciated that in alternative embodiments the gaming device determines if the reels include the freezing event after each free activation, after every other free activation, after a designated number of free activations, or after certain free activations as determined by the gaming device.

In one embodiment, the free activation mode includes a freezing event which causes the number of remaining free activations to freeze or remain unchanged during subsequent free activations (hereinafter sometimes referred to as the freeze function or the freeze symbol). Such a freezing event causes the gaming device to provide an unlimited number of additional free activations until the occurrence of a terminating event.

In one embodiment, the freeze symbol is associated with only one of the reels. In another embodiment, the freeze symbol is associated with one or more of the reels and up to all the reels. In an alternative embodiment, a plurality of freeze symbols are associated with a plurality of the reels. In further embodiments, it should be appreciated that any one or more of the symbols can act as the freeze symbol. In one embodiment, the freeze symbol is a unique symbol or symbol combination and its occurrence initiates the freezing function (as described in more detail herein). In another embodiment, the freeze symbol is a wild symbol and, in addition to or instead of initiating the freezing function, substitutes for any of the other symbols. In a further embodiment, one or more of the symbols is adapted to initiate the freezing function. In one embodiment, the occurrence of the freeze symbol is independent of the outcome of the generated and displayed symbol combination. In another embodiment, the occurrence of the freeze symbol is dependent on the outcome of the generated and displayed symbols.

Turning back to FIG. 11, if the freezing event occurs, the gaming device provides an unlimited number of additional free activations until the occurrence of a terminating event. More specifically, the gaming device generates and displays a plurality of symbols on the reels and does not reduce the number of remaining free activations as indicated by block 210. If the generated and displayed symbols are associated with a winning combination, the gaming device provides the player with an award associated with the winning symbol combination as indicated by block 212.

After providing one of the unlimited additional free activations, the gaming device determines if the generated and displayed symbols are associated with a terminating event as indicated by decision diamond 214. In one embodiment, the plurality of symbols include at least one terminating symbol associated with a terminating event. The occurrence of the terminating event causes the gaming device to determine if the number of remaining free activations is greater than zero as indicated by decision diamond 216 (described below).

In alternative embodiments, the terminating event requires terminating symbols on two or more activations. It should thus be appreciated that the terminating event may be any suitable combination of symbols or events.

If the generated and displayed plurality of symbols do not include a freezing event as indicated by decision diamond 208, the gaming device proceeds to decision diamond 216 and determines if any free activations remain. If the number of remaining free activations is greater than zero, the gaming device generates and displays a plurality of symbols on the reels and reduces by one the number of remaining free activations as indicated by block 204. If the number of remaining free activations is not greater than zero, the gaming device ends the free activation mode as indicated by block 218.

Figure 12:
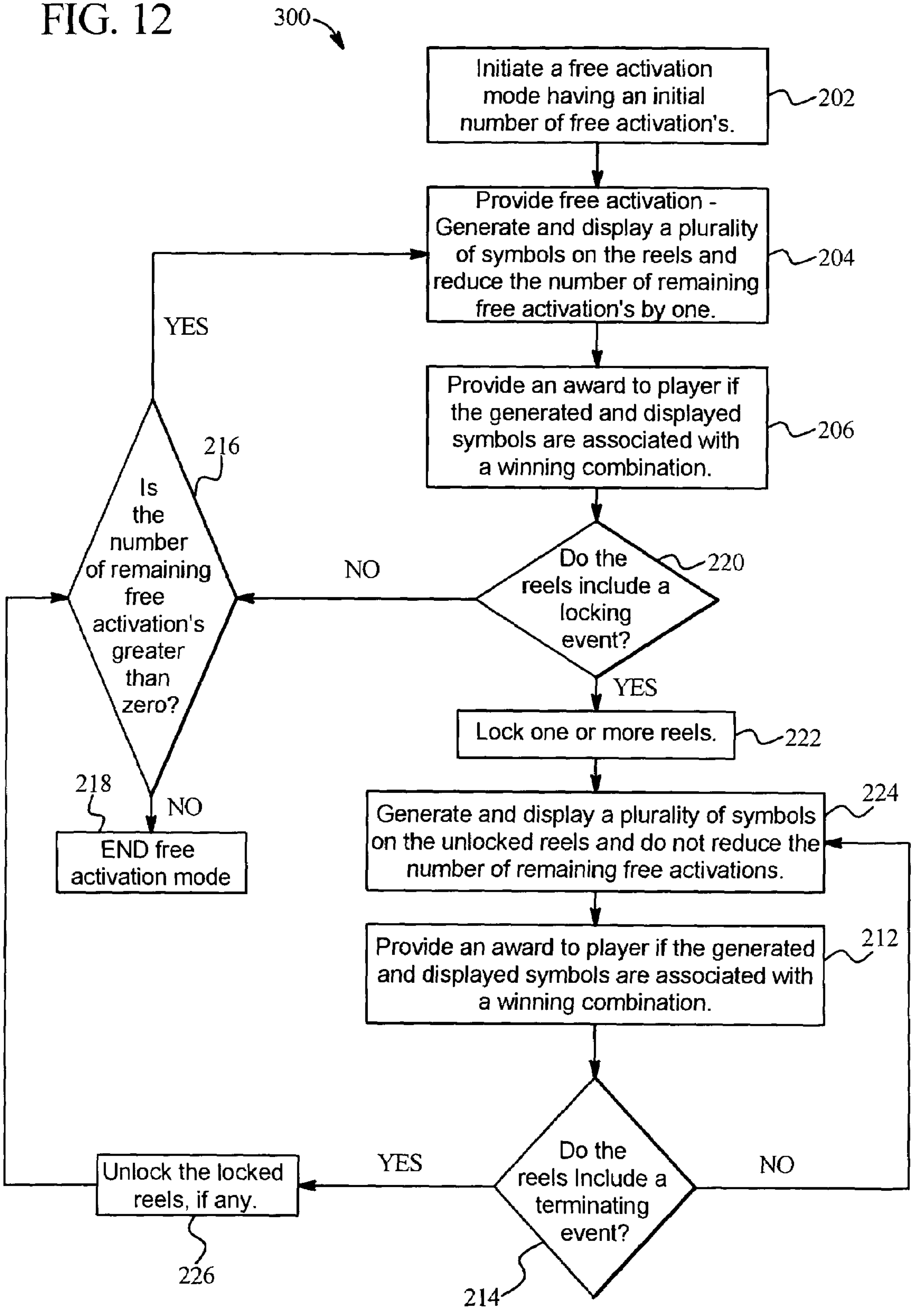
FIG. 12 is a flowchart of another one of the embodiments of the present invention including a free activation mode having an initial number of free activations where a locking event causes one or more designated reels to lock and the number of remaining free activations to freeze until a terminating event occurs.

Referring now to FIG. 12, in an alternative embodiment, as shown in flowchart 300, the gaming device includes a locking event, such as the occurrence of one or more lock symbols as indicated by decision diamond 220. In one embodiment, the locking event includes the freezing function of the freezing event and, additionally, the locking event causes one or more reels to lock during the unlimited number of additional free activations. In one embodiment, the occurrence of the lock symbol is independent of the outcome of the generated and displayed symbol combination. In another embodiment, the occurrence of the lock symbol is dependent on the outcome of the generated and displayed symbols. In one embodiment, the generated symbol combination includes the lock symbol and is a winning combination which is associated with an award. In another embodiment, the combination of symbols including the lock symbol is not associated with a winning combination.

In alternative embodiments, it should be appreciated that the gaming device may lock a plurality of the symbols and may determine which symbols or reels to lock in any suitable fashion. Upon the occurrence of the terminating event, the gaming device may unlock one, more, or each of the locked symbols or may continue to hold locked one or more of the designated symbols when the gaming device recommences reducing the number of remaining free activations. In one embodiment, the lock symbol is associated with only one of the reels. In another embodiment, the lock symbol is associated with one or more reels and up to all the reels. In an alternative embodiment, a plurality of lock symbols is associated with a plurality of the reels. It should be appreciated that any of the symbols can act as the lock symbol. In one embodiment, the lock symbol is a unique symbol or combination and its occurrence initiates the locking function. In another embodiment, the lock symbol is a wild symbol and, in addition to or instead of initiating the locking function, substitutes for any of the other symbols. In one embodiment, the locking symbol on a reel acts as an expanding wild symbol which causes one or more of the other symbols on the locked reel to function as wild symbols. In a further embodiment, one or more of the symbols are adapted to initiate the locking function.

Upon the occurrence of the locking event during one of the free activations, the gaming device determines which symbols and/or reels to lock in a predetermined fashion, randomly, or using any suitable method. The gaming device locks those reels, as indicated by block 222, and generates and displays a plurality of the symbols on the unlocked reels without reducing the number of remaining free activations as indicated by block 224. As described above, the gaming device determines if the generated and displayed symbol combination for the additional free activation is associated with a winning symbol combination and provides the player an award as indicated by block 212.

The gaming machine determines if the terminating event occurs as indicated by decision diamond 214. When the terminating event occurs, the gaming device unlocks any locked reels as indicated by block 226. The gaming device determines if any free activations remain as indicated by decision diamond 216. As described above, if the number of remaining free activations is greater than zero, the gaming device provides another one of the free activations and reduces by one the number of remaining free activations as indicated by block 204. If the number of remaining free activations is not greater than zero, the gaming device ends the free activation mode as indicated by block 218.

In alternative embodiments, another game event causes the number of remaining free activations to change and the player is provided with a modified number of remaining free activations. The modification may occur in a predetermined fashion, a game event directed fashion, or as a result of any suitable method. In another embodiment, the terminating event or other designated event nullifies or modifies the freeze function and/or the lock function.

Figure 13:
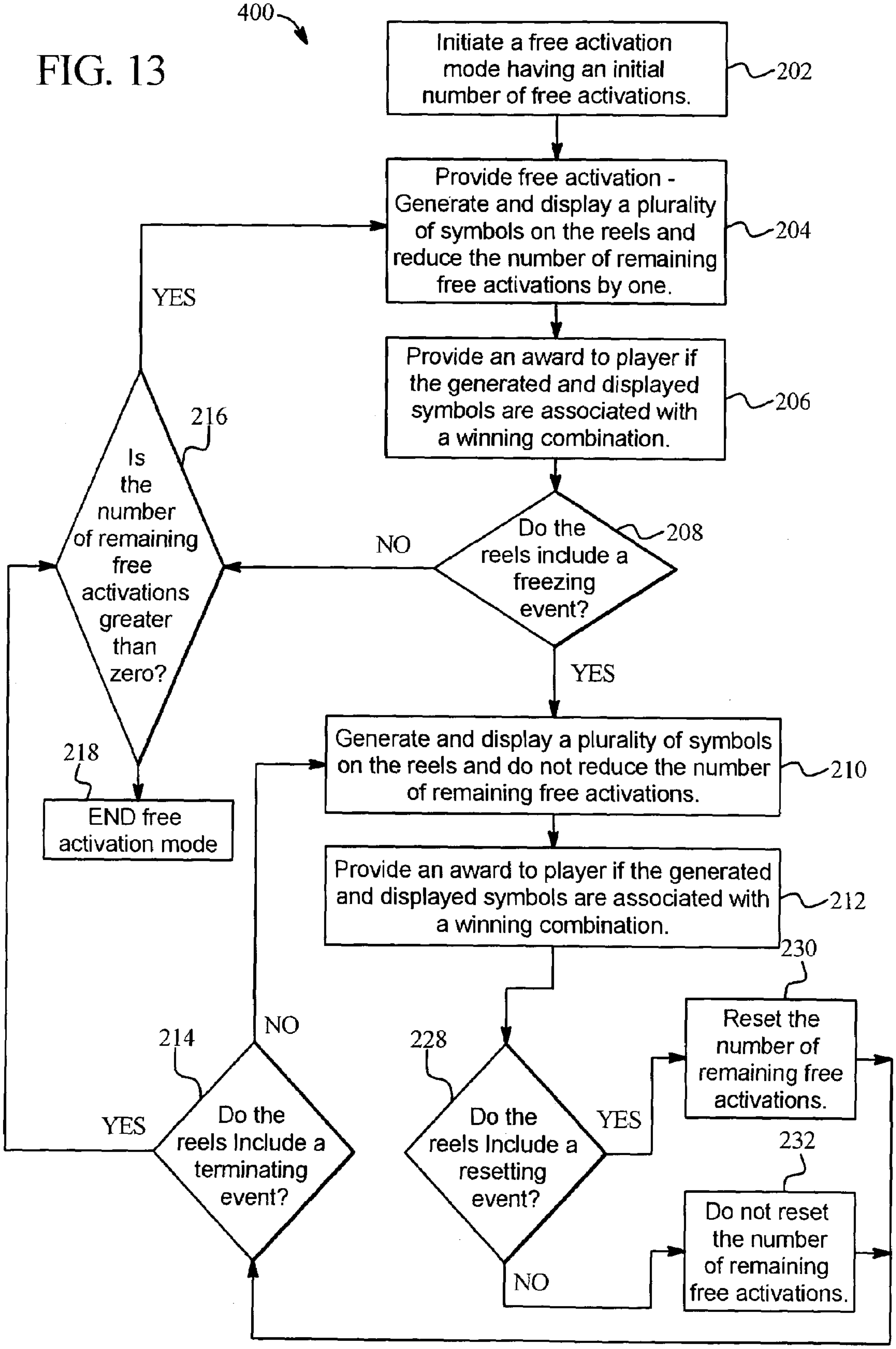
FIG. 13 is a flowchart of another one of the embodiments of the present invention including a free activation mode having an initial number of free activations, a freezing event which causes the number of remaining free activations to freeze until a terminating event occurs, and a resetting event which causes the number of remaining free activations to reset.

Referring now to FIG. 13, in a further alternative embodiment, the free activation mode includes a determination of whether at least one resetting event occurs. In one embodiment, after each of the additional free activations, the gaming device determines if the reels include such a resetting event as indicated by decision diamond 228. In this alternative embodiment, the gaming device determines if the reels include in the resetting event during the unlimited number of additional free activations. In one embodiment, at least one of the additional free activations after the freezing event includes a resetting event which causes the number of remaining free activations in the free activation mode to be reset as indicated by block 230. If no resetting event has occurred, the gaming device does not reset the number of remaining free activations as indicated by block 232.

It should be appreciated that the gaming device may change or modify the number of remaining free activations to any suitable number, such as the same number of free activations as initially provided. In one embodiment, the resetting event is associated with a designated symbol or symbol combination which is a unique symbol combination. In one embodiment, the designated symbol combination is also a winning symbol combination. Alternatively, the designated combination is a non-winning combination. In another embodiment, the gaming device adapts any suitable combination to act either temporarily (i.e., for only one generation of the reels) or more permanently (i.e., for more than one generation of the reels) to be the designated combination. It is also contemplated that the resetting event can occur prior to or simultaneously with the freezing event, locking event, or the terminating event. The gaming device determines to which number to reset the number of remaining free activations or the number of free activations to add to or subtract from the number of remaining free activations using any suitable method.

In an alternative embodiment, the gaming device determines if the resetting event is associated with a freezing event, locking event, or terminating event. In another embodiment, the gaming device ascribes another suitable function to such a resetting event, such as being a wild symbol or triggering another game function. In an alternative embodiment, the resetting event has an associated multiplier with causes the number of remaining free activations to be modified according to the multiplier, such as 2×. In an example with the 2× multiplier, the gaming device would double the number of remaining free activations.

Referring now to FIGS. 14A to 16C, in examples of the various embodiments of the present invention, the gaming device includes or displays a plurality of reels 252*a*, 252*b*, 252*c*, 252*d*, and 252*e*. In the illustrated embodiments, three paylines 250*a*, 250*b*, and 250*c* are associated with the reels. The reels include a plurality of symbols. The symbols in this example are shapes such as stars, triangles, heats, moons, and diamonds. It should be appreciated that the symbols may be shapes, numbers, letters, characters, or any other suitable images.

Figure 14A:
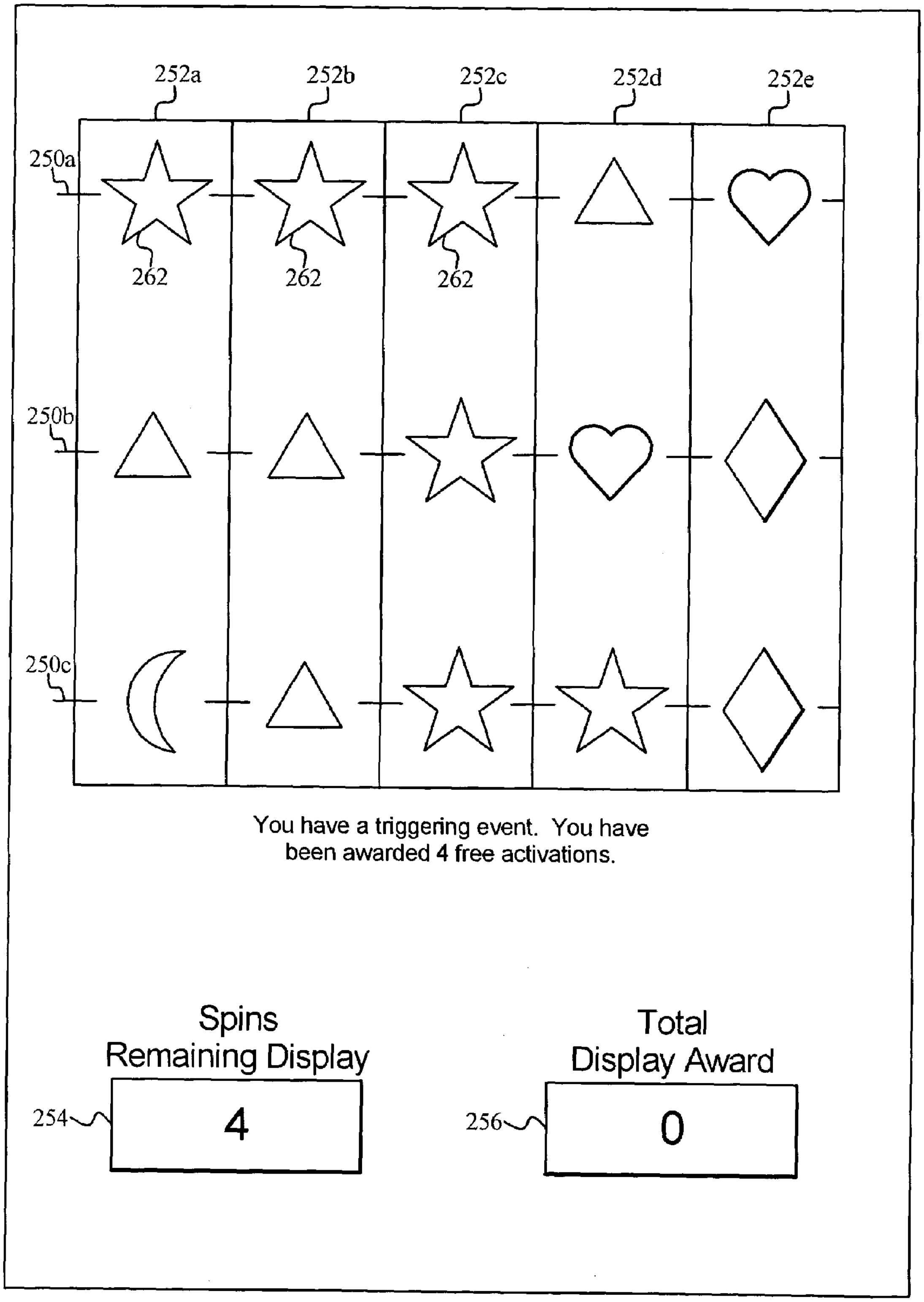
FIGS. 14A, 14B, 14C, 14D, 14E, 14F, and 14G are enlarged front elevation views of one of the display devices of FIGS. 1A and 1B illustrating an example of one of the embodiments of the present invention where a freezing event provides an unlimited number of additional free activations and a terminating event ends the unlimited number of additional free activations.

FIG. 14A illustrates the reels after a play of a primary game of the gaming device in which a free activation mode triggering event has occurred. It should be appreciated that the free activation mode triggering event may occur in the primary game, a bonus game, a sub-game, in any other suitable game or in another matter such as a mystery award. The free activation mode triggering event may include any suitable symbol or combination of symbols or any other suitable event. In this example, three star symbols 262 trigger the free activation mode and cause the gaming device to provide the player with four free activations as indicated by the spins remaining display 254. In this example, the three star symbols are not associated with an additional award and thus the total award display 256 indicates an award of zero. It should be appreciated that the free activation mode triggering event may be associated with any of a plurality of awards in the game. For example, an event triggering the free activation mode may be associated with an award. It should also be appreciated that none, a plurality, or every activation in the free activation mode may be associated with an award.

Figure 14B:
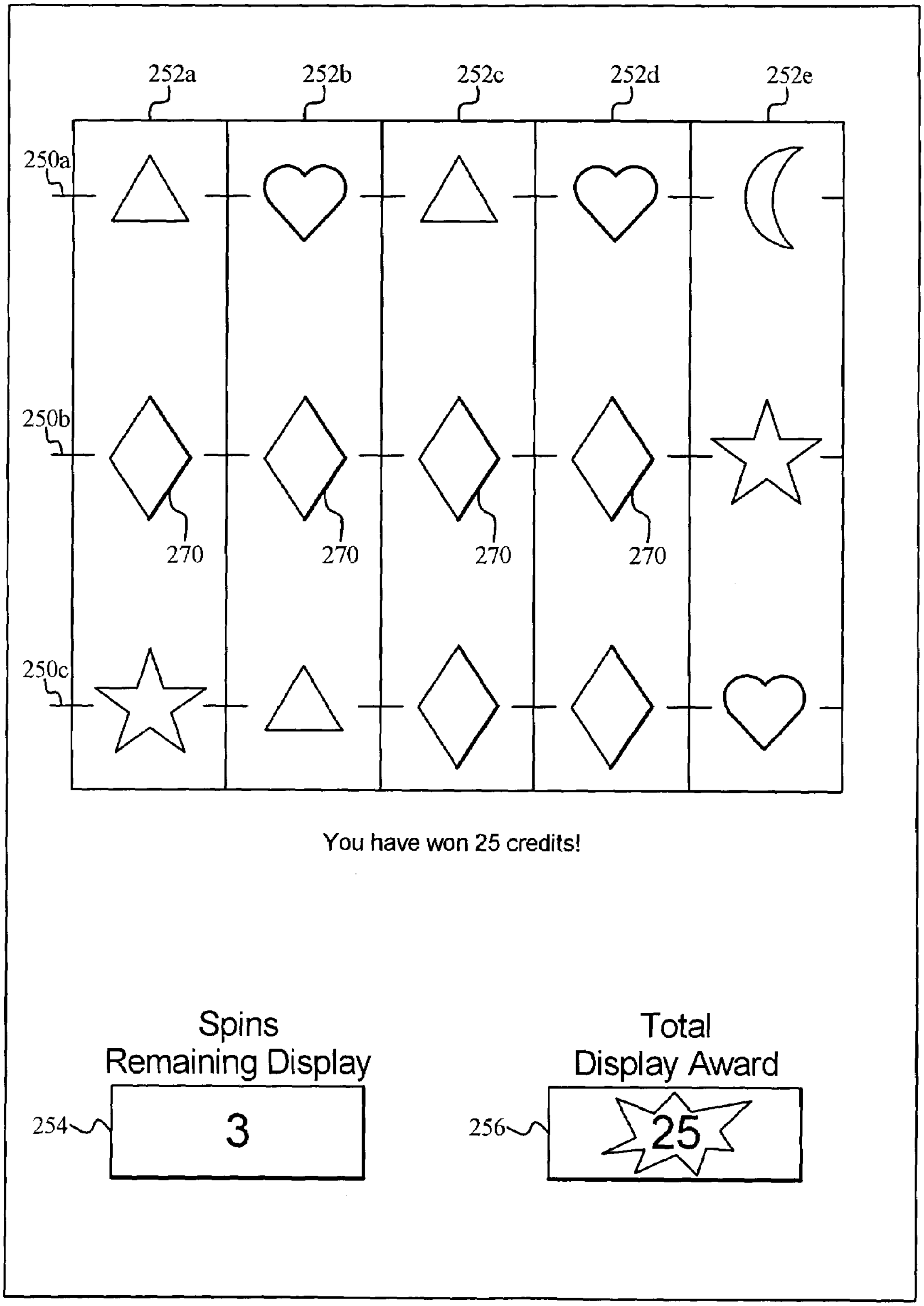

FIG. 14B illustrates the reels after the gaming device has provided the first free activation. In this example, the first free activation resulted in a winning symbol combination of four diamond symbols 270 as displayed on payline 250*b*. It should be appreciated that the first free activation (or any of the free activations) may result in any one of the awards or may not result in any award. In this example, the gaming device displays the message, "YOU HAVE WON 25 CREDITS!" to indicate to the player that twenty-five credits have been awarded for the winning symbol combination as indicated on the total award display 256. The spins remaining display 254 indicates the number of remaining free activations of three.

Figure 14C:
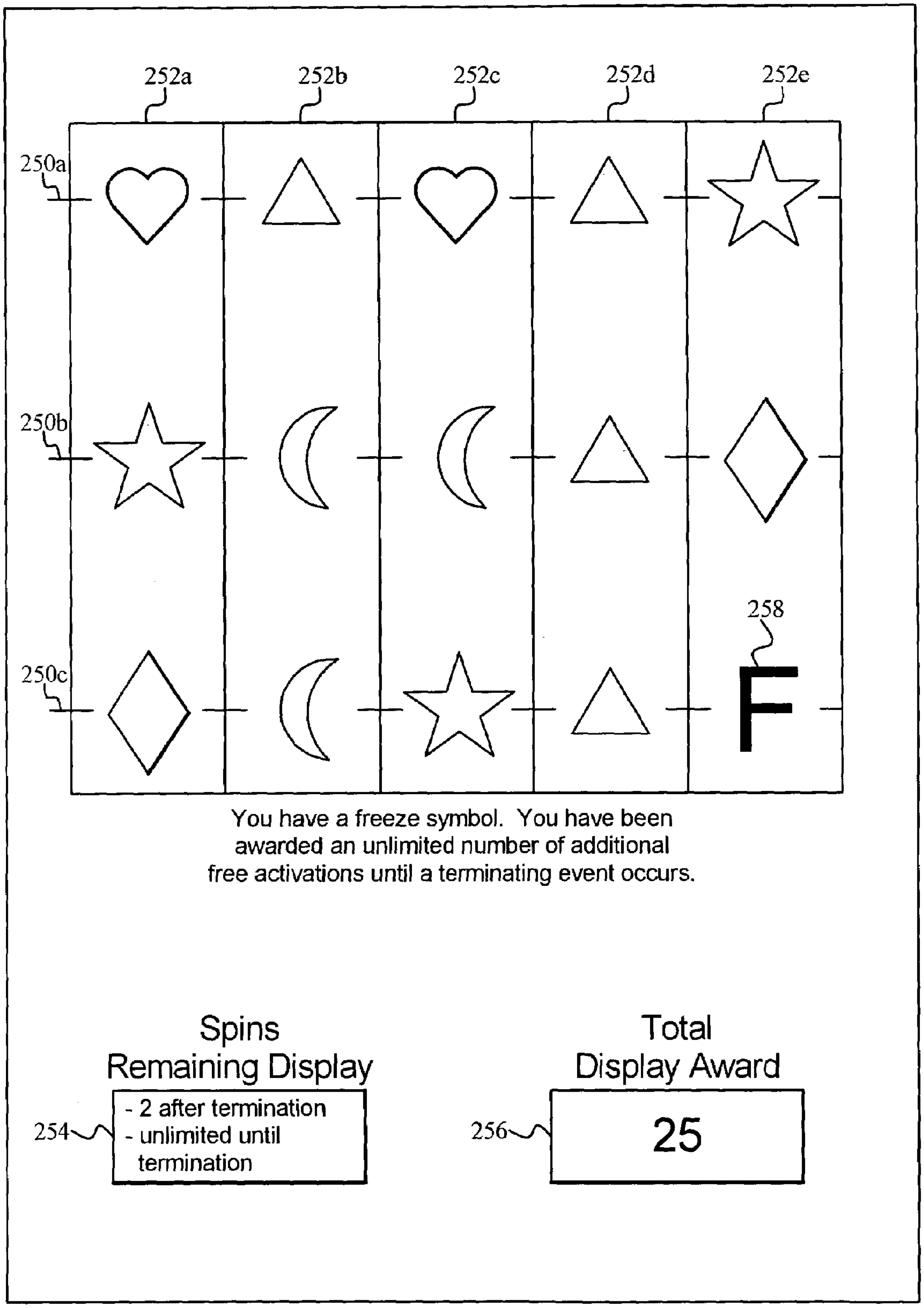

FIG. 14C illustrates the reels after the gaming device has provided the second of the four initially provided free activations. In this example, the second free activation results in the occurrence of a freeze symbol 258 (illustrated as "F" in FIG. 14B) as displayed on the part of payline 250*c* associated with reel 252*e*. As discussed above, the freeze symbol causes the gaming device to freeze the number of remaining free activations and to provide additional unlimited free activations until the occurrence of a terminating event. In this example, the gaming device displays the message, "YOU HAVE A FREEZE SYMBOL. YOU HAVE BEEN AWARDED AN UNLIMITED NUMBER OF FREE ACTIVATIONS UNTIL A TERMINATING EVENT OCCURS." Thus, the spins remaining display 254 indicates that the player has two free activations remaining after termination and an unlimited number of free activations until termination. In this example, the freeze symbol is not associated with an award, so the total award display 256 continues to display twenty-five.

Figure 14D:
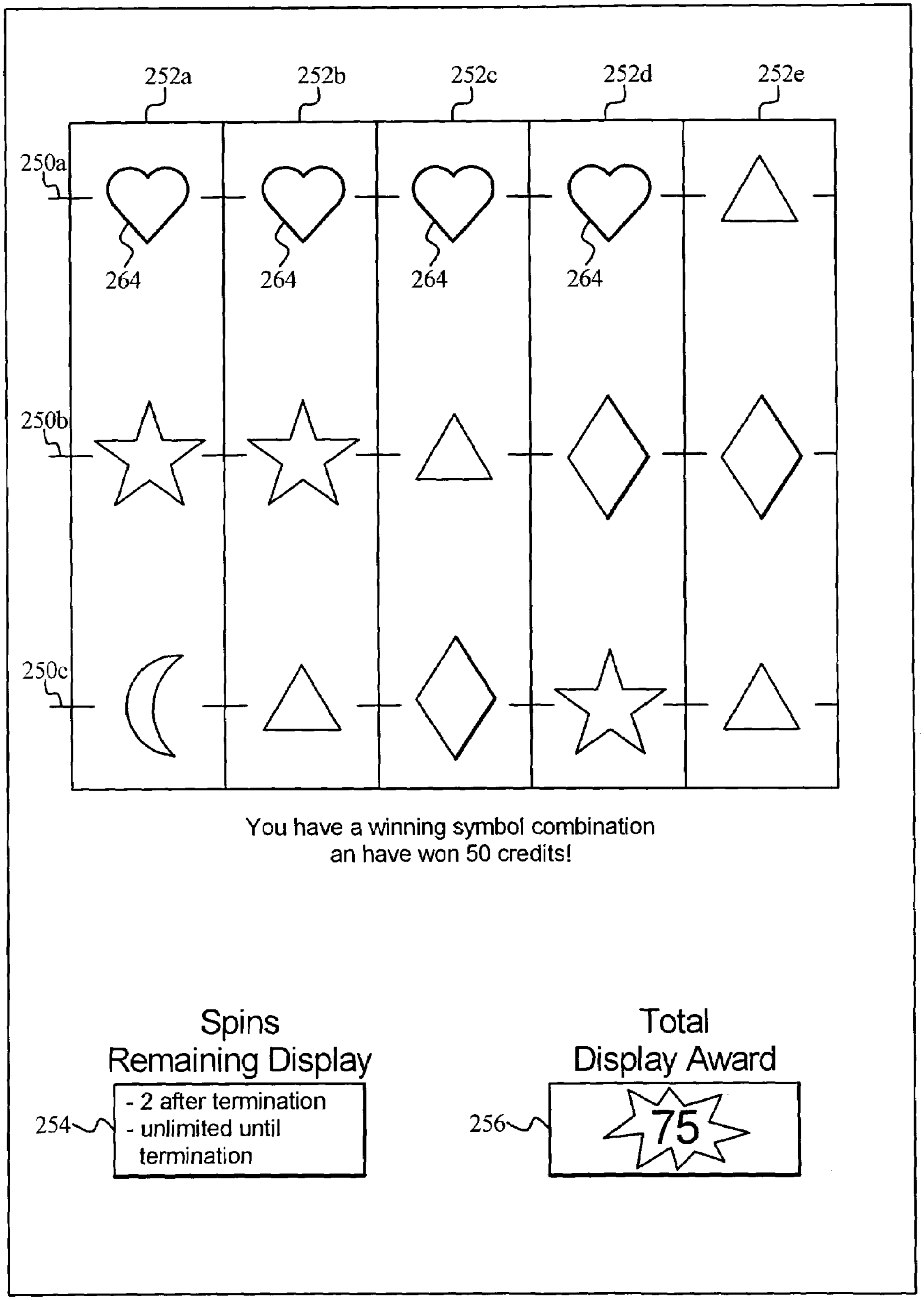

FIG. 14D illustrates the reels after the gaming device provides one of the unlimited additional free activations. In this example, four matching heart symbols 264, as indicated on payline 250*a* is a winning combination having an award of fifty credits. In one embodiment, the total award display 256 indicates the total award accumulated by the player in the game. In this example, this is the second award the player has received and the gaming device adds to the first award of twenty-five credits (from the first one of the initial free activations) the second award of fifty credits. Thus, the total award display 256 indicates a total award of seventy-five credits. In this example, the terminating event did not occur after the first additional free activation, thus the gaming device continues to provide unlimited additional free activations until the occurrence of the terminating event.

Figure 14E:
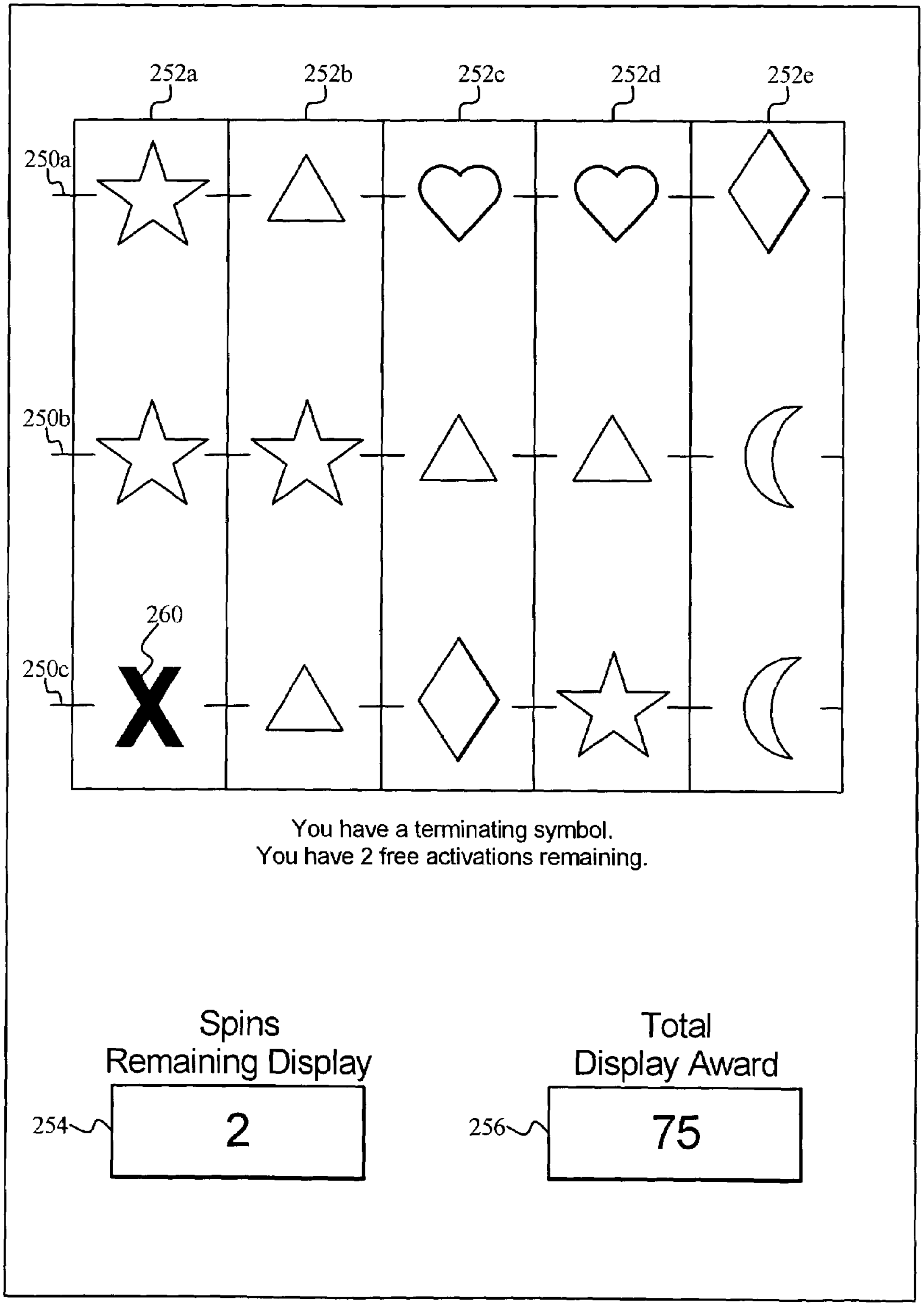

FIG. 14E depicts the reels after the gaming device has provided another one of the unlimited additional free activations. In this example, the terminating event (represented by the terminating symbol "X" 260) has occurred in the second additional free activation. The gaming device displays the message, "YOU HAVE A TERMINATING SYMBOL. YOU HAVE 2 FREE ACTIVATIONS REMAINING." The terminating event causes the gaming device to stop providing unlimited additional free activations and to recommence reducing the number of remaining free activations, as described above. The spins remaining display 254 indicates that the player has two free activations remaining. It should be appreciated that the terminating event may be associated with any suitable award as determined by the gaming device. In this example, the terminating event is not associated with an award and the total award display 256 continues to indicate seventy-five credits.

Figure 14F:
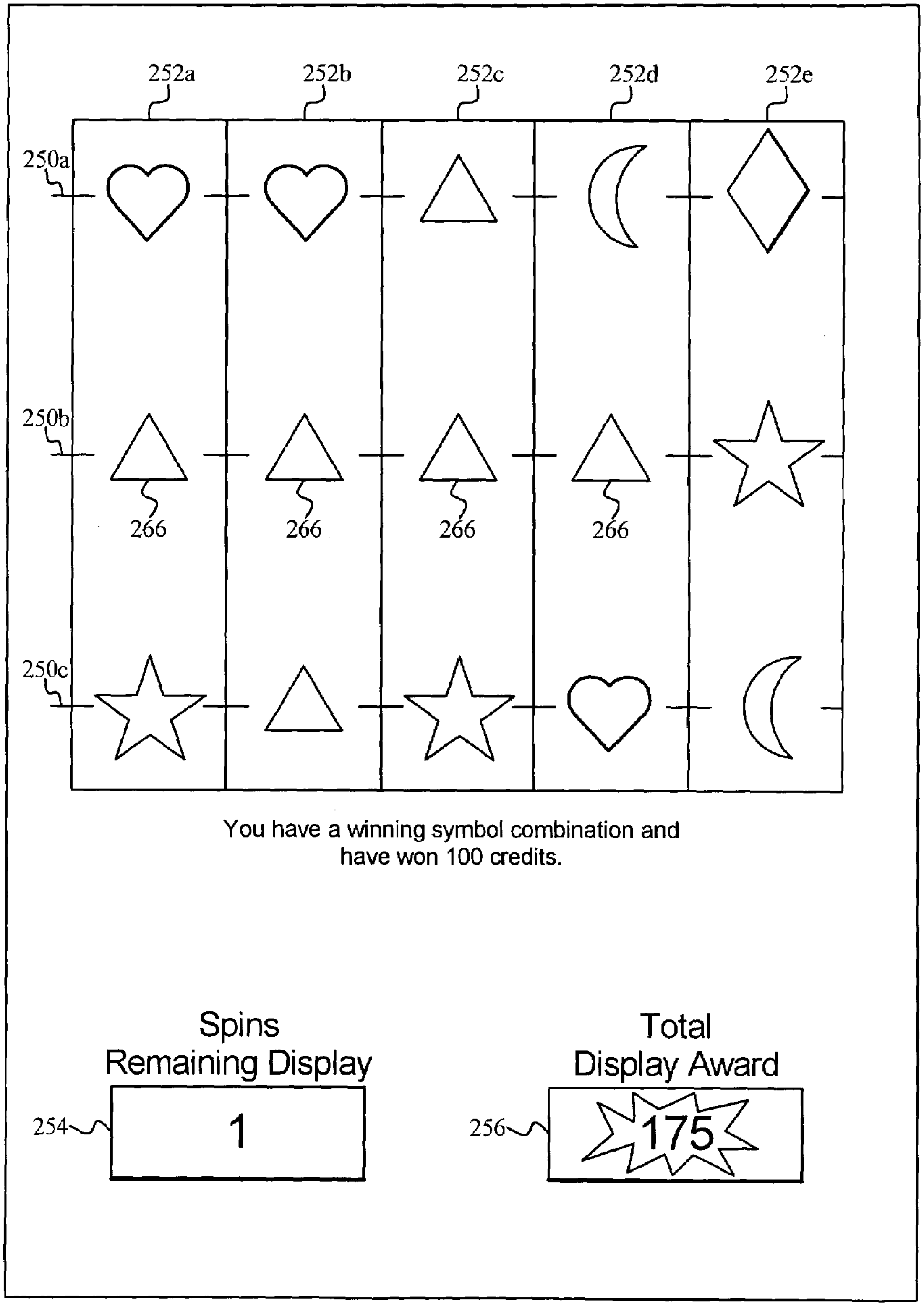

FIG. 14F depicts the reels after the gaming device has provided another one of the remaining free activations. The gaming device has reduced the number of remaining free spins to one as indicated on the spins remaining display 254. In this example, the generated symbols include four triangles 266 as indicated on payline 250*b* which includes an award of one-hundred credits. The gaming device adds this award to the previous award of seventy-five credits and indicates a total award of one-hundred seventy-five on the total award display 256.

Figure 14G:
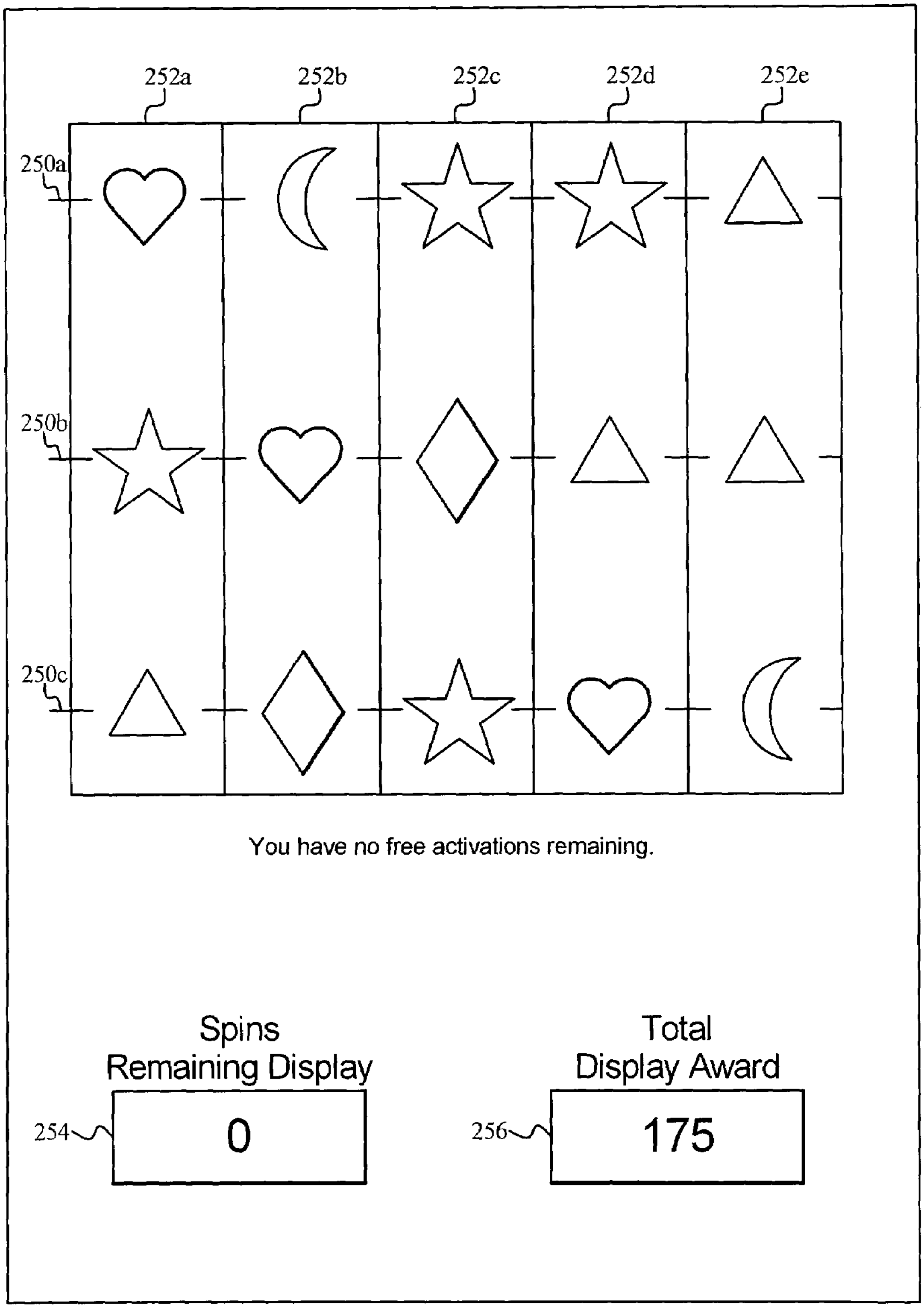

FIG. 14G illustrates the reels after the gaming device has provided the fourth free activation (from the initial free activations). In this example, the triggering event has not occurred and the generated symbol combinations are not associated with any of the awards. The gaming device displays the message, "YOU HAVE NO FREE ACTIVATIONS REMAINING," and the spins remaining display indicates zero. The gaming device thus terminates the free activation mode.

In another embodiment of the present invention, the triggering event depicted in FIG. 14A triggers a free activation mode including a locking event. As discussed above, in addition to causing the gaming device to provide unlimited additional free activations, the locking event locks one or more reels during the unlimited number of additional free activations.

Figure 15A:
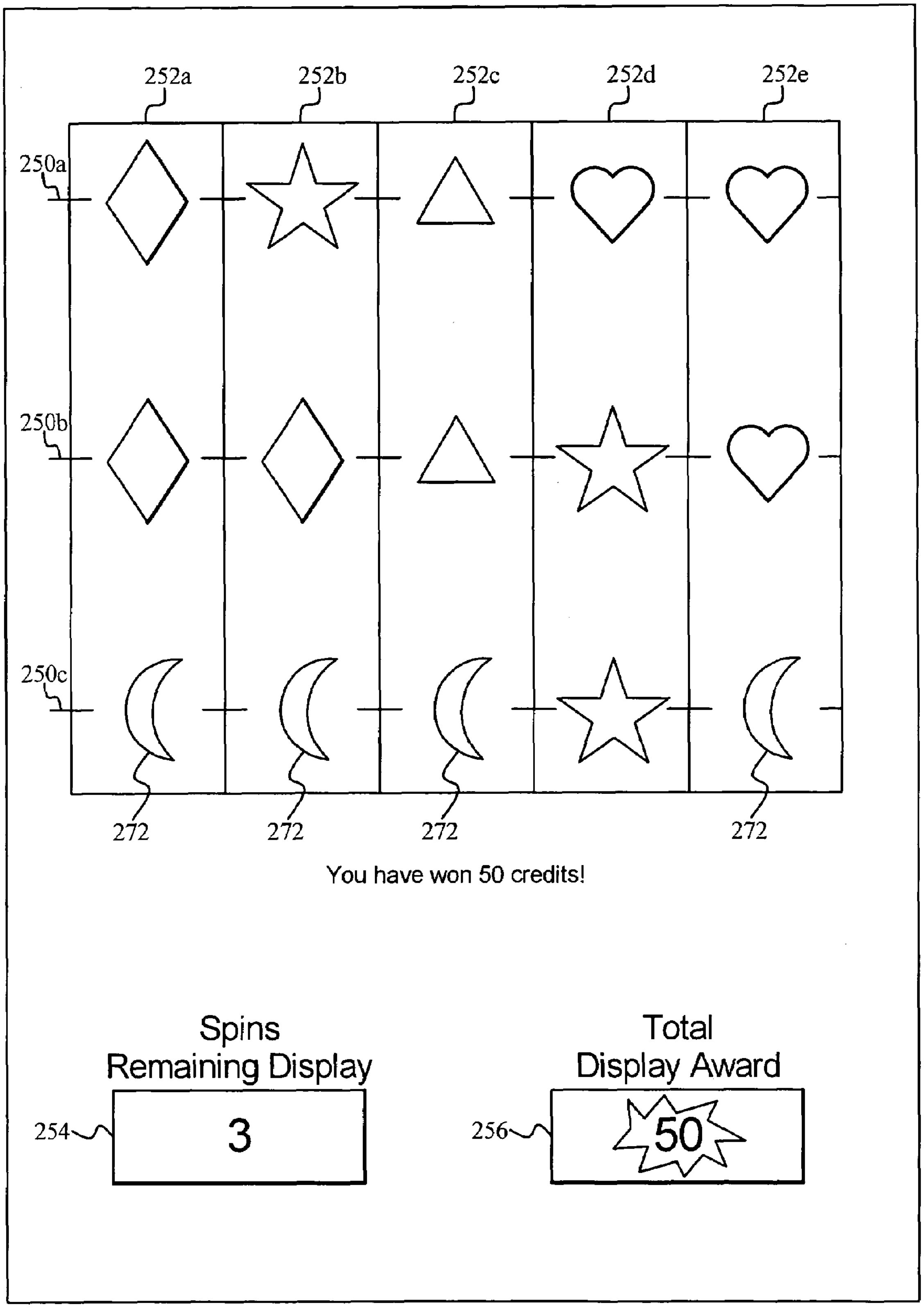
FIGS. 15A, 15B, 15C, 15D, 15E, and 15F are enlarged front elevation views of one of the display devices of FIGS. 1A and 1B illustrating an example of one of the embodiments of the present invention where a locking event initiates an unlimited number of additional free activations and locks one or more of the reels, and a terminating event which ends the unlimited number of additional free activation and unlocks the locked reel or reels.

FIG. 15A depicts the reels after the gaming device provides the first of the four free activations. In this example, the symbol combination includes a winning symbol combination of three moons 272 on payline 250*c*. The gaming device displays the message, "YOU HAVE WON 50 CREDITS!" to indicate to the player that fifty credits have been awarded for the winning symbol combination as indicated on the total award display 256. The spins remaining display 254 indicates the number of remaining free activations of three.

Figure 15B:
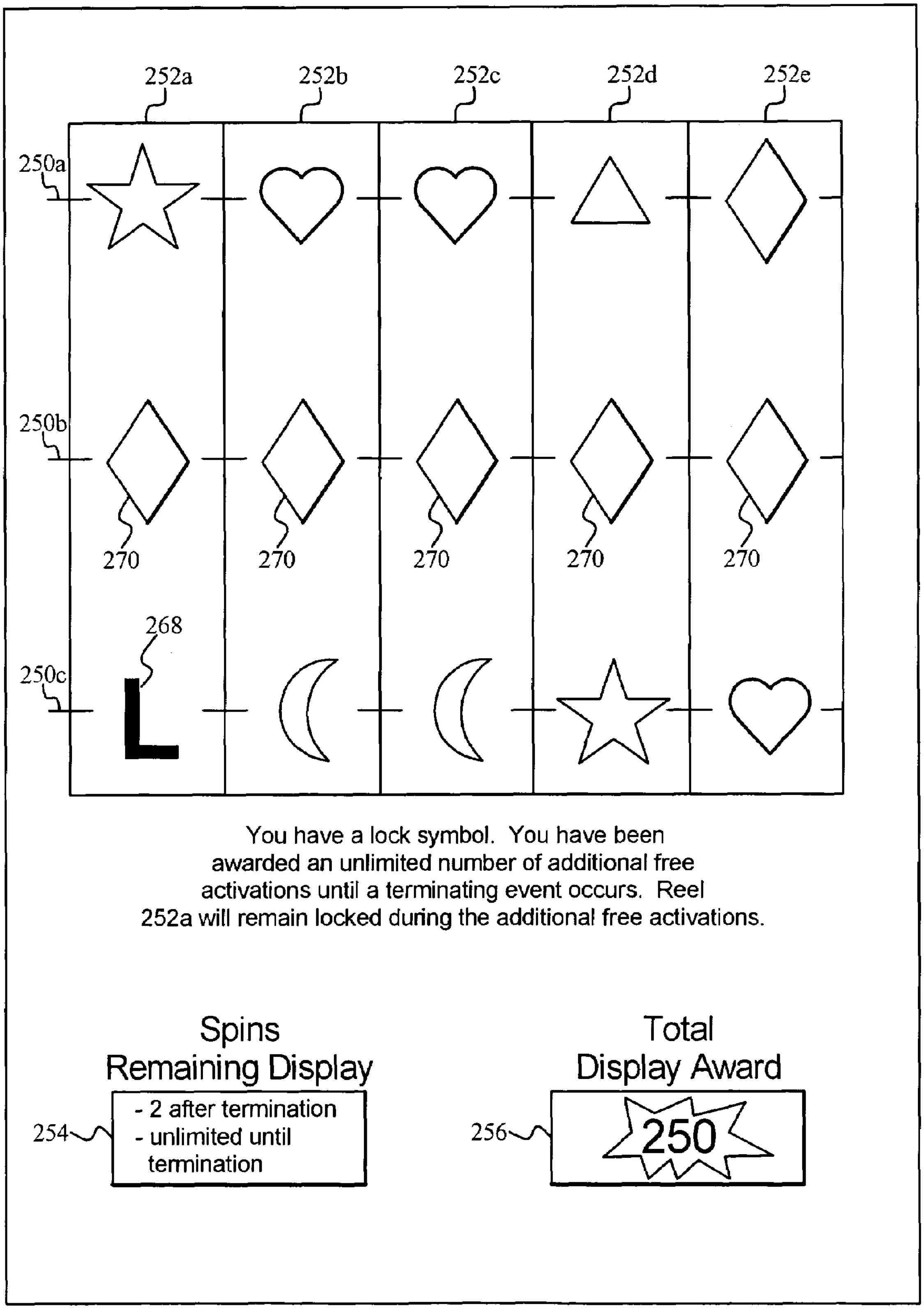

FIG. 15B depicts the reels after the gaming device provides the second of the four initially provided free activations. In this example, this free activation includes the locking event, represented by the "L" symbol 268 on the part of payline 250*c* associated with reel 252*a*. The gaming device indicates to the player that two free activations remain after the terminating event and an unlimited number of free activations until the terminating event occurs as indicated on the spins remaining display 254. The second free activation also resulted in a winning symbol combination of five diamonds 270 on payline 250*b* having an award of two-hundred credits. The gaming device thus indicates the total award of two-hundred fifty credits (i.e., the fifty credit award from the first free activation added to the two-hundred credit award from this free activation) on the total award display 256. In an alternative embodiment, the lock symbol can occur without the occurrence of a winning symbol combination.

Figure 15C:
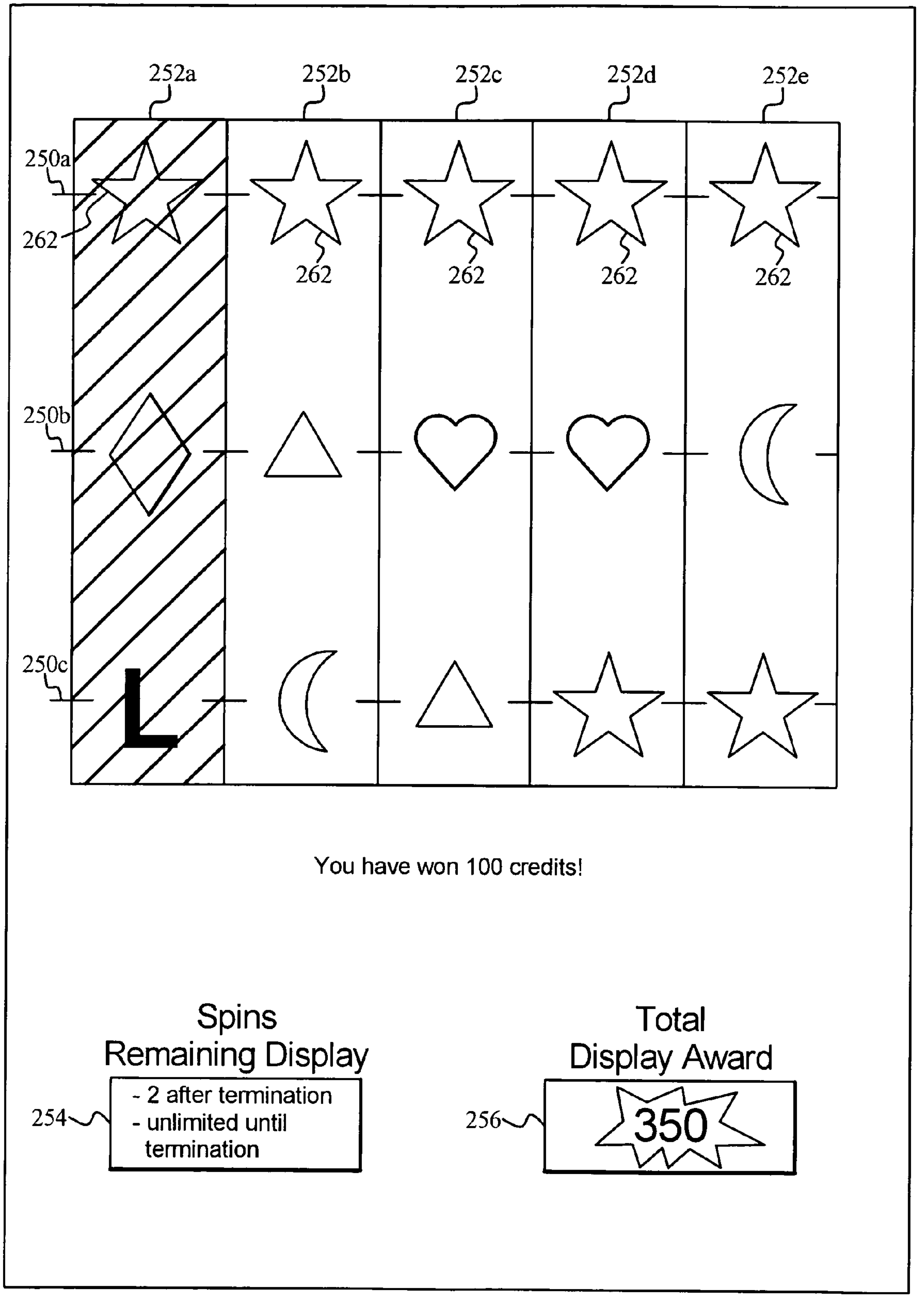

FIG. 15C depicts the reels after the gaming device provides one of the unlimited additional free activations triggered by the locking symbol. During the unlimited additional free activations, reel 252*a* remains locked. The symbol combination in the first free activation (the one which triggered the unlimited additional free activations) included a star symbol, a diamond symbol, and a lock symbol on reel 252*a*, as illustrated in FIG. 15B. Thus, in one embodiment, the symbols generated on reel 252*a* in the unlimited additional free activations will also include these symbols, as illustrated by the cross-hatch pattern of reel 252*a* in FIG. 15C. It should be appreciated that the locked reel may be the reel including the lock symbol or one or more other reels.

In this example, the first of the unlimited additional free activations results in winning combination of five star symbols 262 as illustrated in FIG. 15C. It should be appreciated that any one of the symbols on the locked reel, including the lock symbol, may act as a wild symbol for one or more of the free activations. It is also contemplated that any one of the symbols on the locked reel may be part of any winning or non-winning symbol combination. In this example, the five star symbols are associated with an award of one-hundred credits. Thus, the gaming device indicate a total award of three-hundred fifty credits (i.e., two-hundred fifty from the previous free activations added to the one-hundred credits awarded in this free activation). In this example, the terminating event has not occurred and the gaming device continues to provide additional unlimited free activations.

Figure 15D:
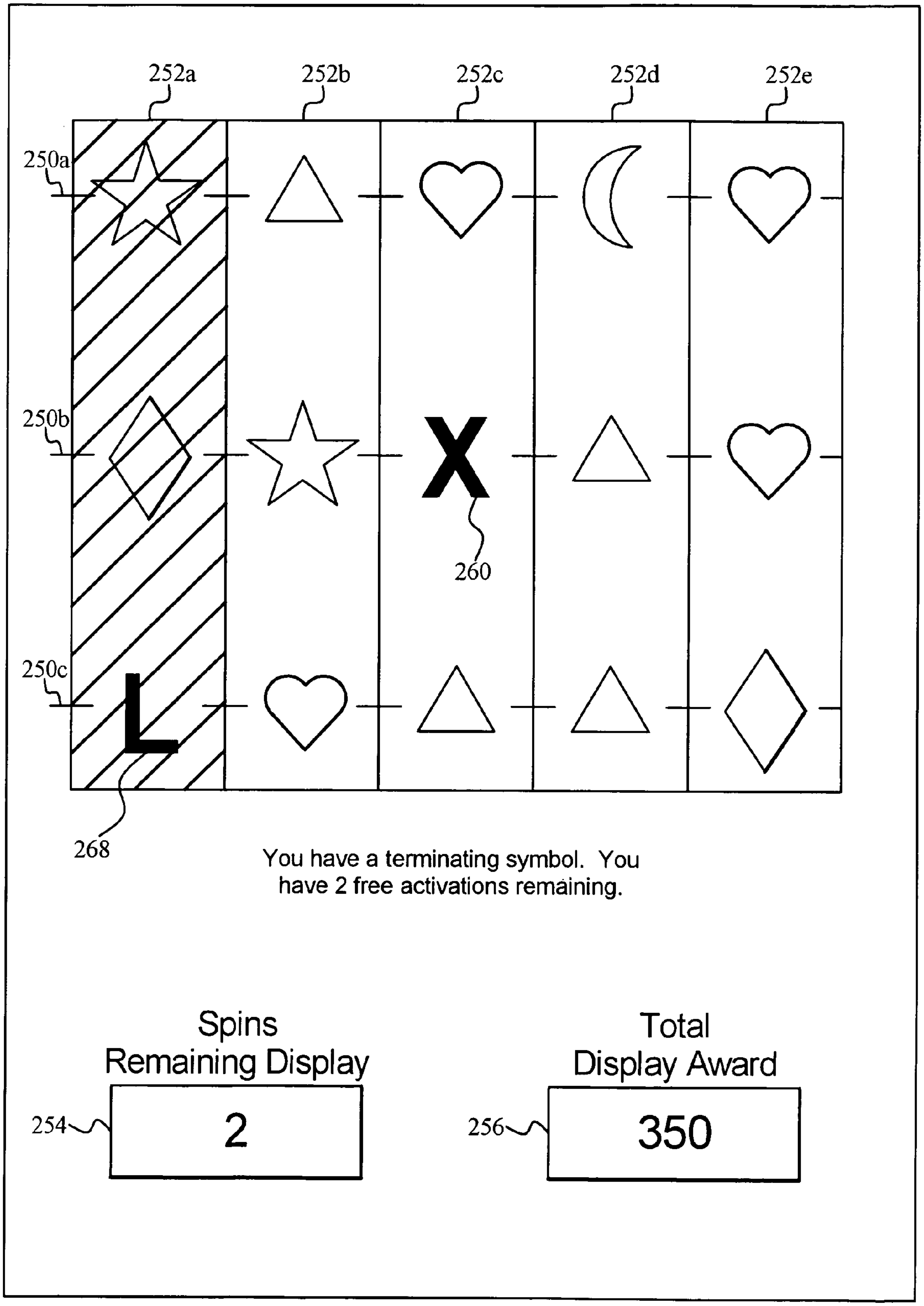
Figure 15E:
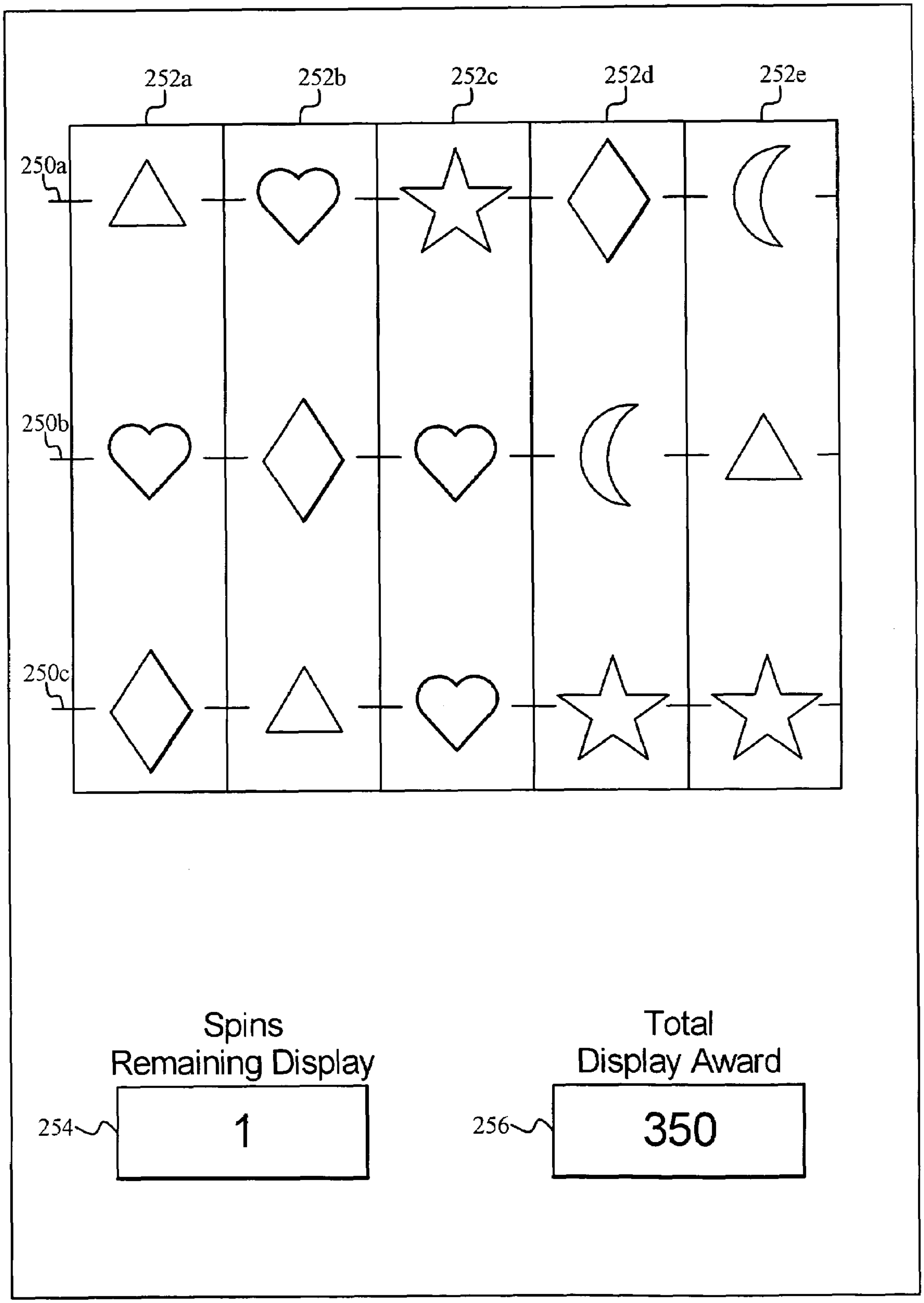
Figure 15F:
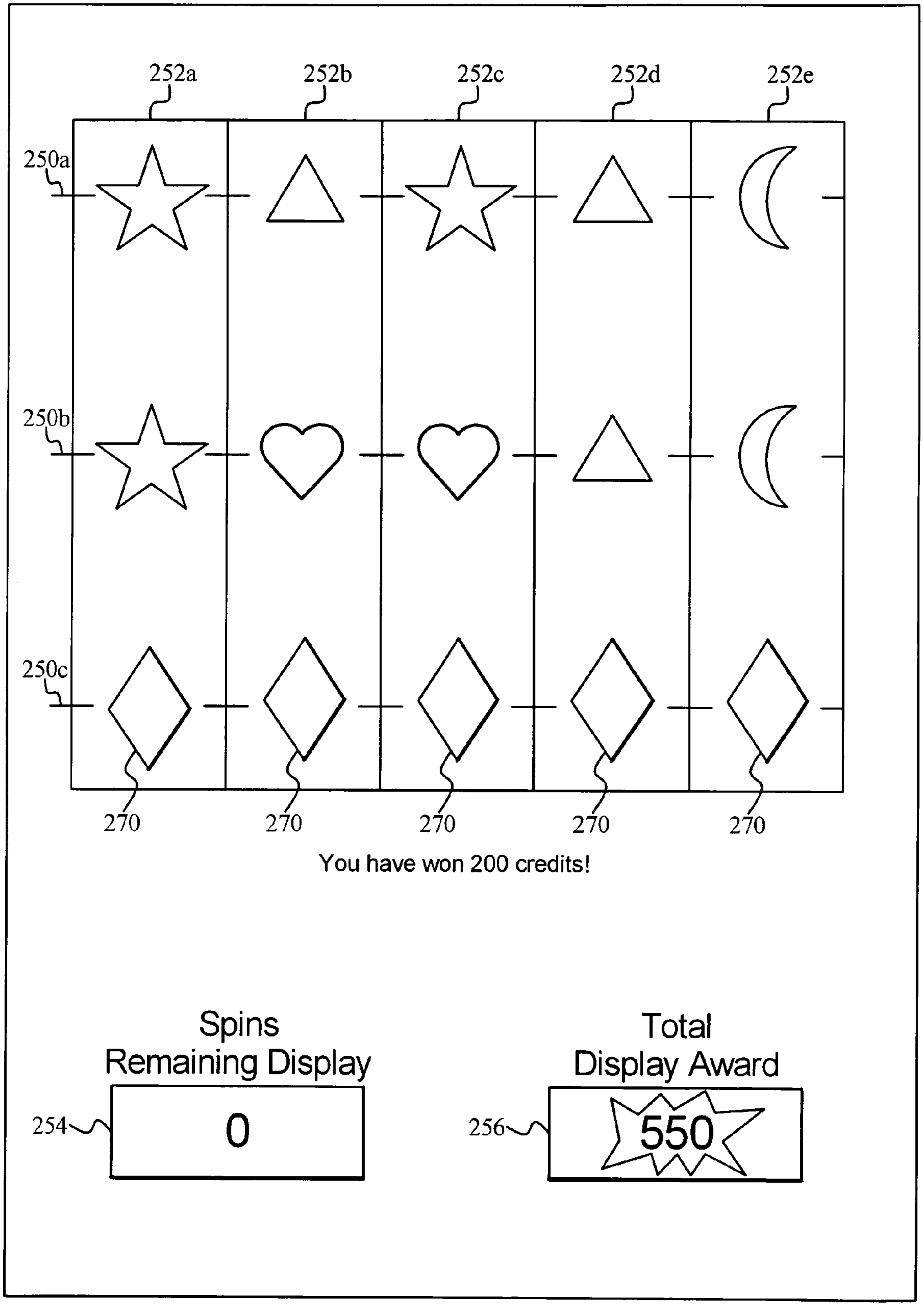

FIG. 15D depicts the reels after the gaming device provides another one of the unlimited additional free activations. In this example, this free activation resulted in the occurrence of a terminating event, represented by the "X" symbol 260 on the part of payline 250*b* associated with reel 252*c*. The gaming device displays the message, "YOU HAVE A TERMINATING SYMBOL. YOU HAVE 2 FREE ACTIVATIONS REMAINING." The gaming device thus provides another one of the remaining free activations (in this example, two free activations remain) and reduces by one, in this example, the number of remaining free activations (leaving one remaining free activation) as indicated on the spins remaining display 254 of FIG. 15E. In this example, the first of the remaining free activations did not result in a locking event and the symbol combinations do not include any winning symbol combinations. The gaming device thus provides the last remaining free activation, as illustrated in FIG. 15F. In this example, the last free activation resulted in a winning combination of five diamond symbols 270 and the gaming device displays the message, "YOU HAVE WON 200 CREDITS!" It should be appreciated that the last of the free activations (or any of the free activations) may or may not be associated with a winning combination of symbols. In this example, the last free activation did not result in a locking event. Thus, the gaming device terminates the free activation mode.

Figure 16A:
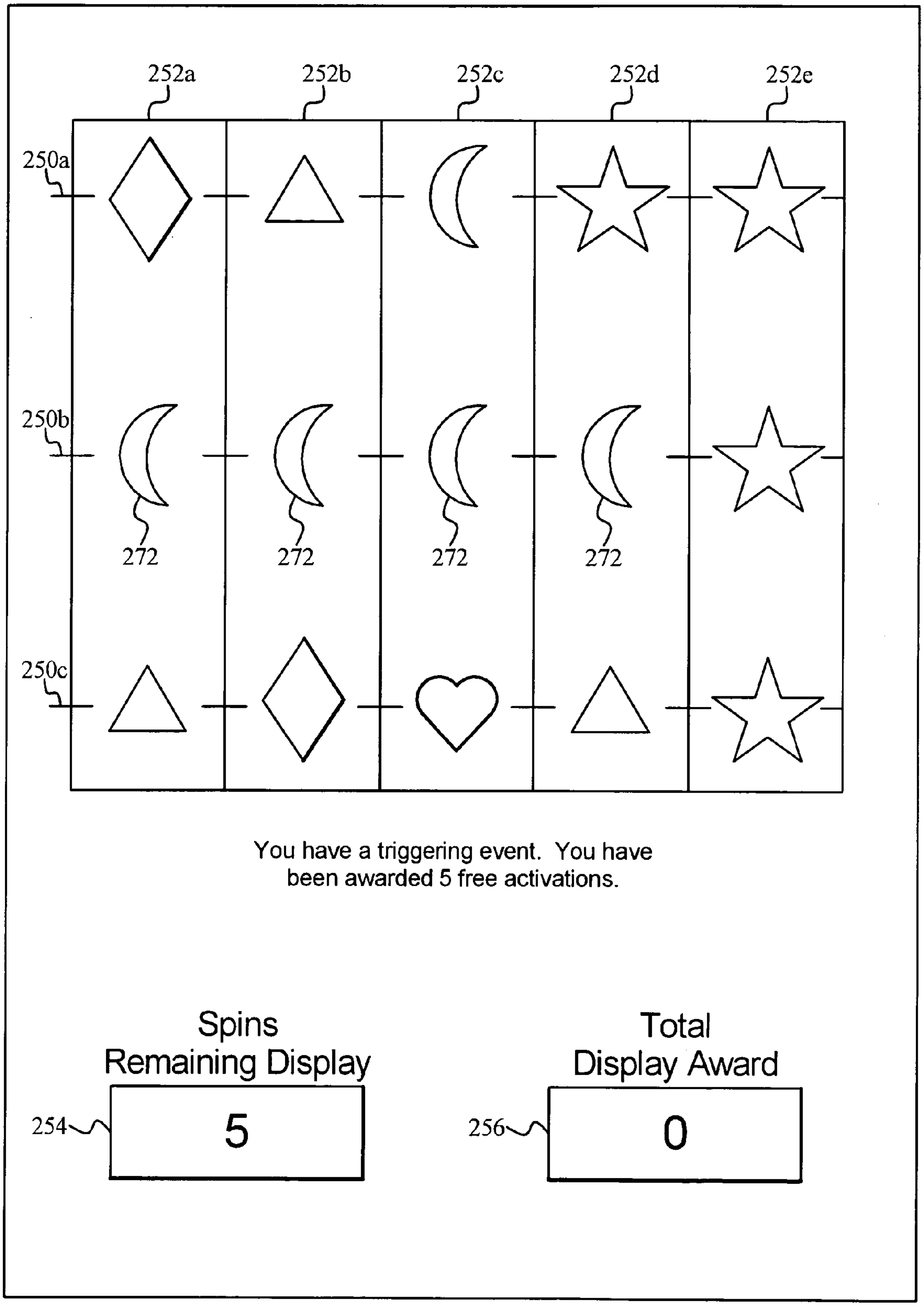
FIGS. 16A, 16B, 16C, and 16D are enlarged front elevation views of one of the display devices of FIGS. 1A and 1B illustrating an example of one of the embodiments of the present invention where a freezing event provides an unlimited number of additional free activations, a resetting events resets a remaining number of free activations, and a termination event ends the unlimited number of additional free activations.

In another embodiment of the present invention, the free activation mode includes a resetting event. FIG. 16A illustrates the reels wherein a triggering event in a primary game triggered the free activation mode having five free activations. In this example, the triggering event includes the occurrence of four moon symbols 272 on payline 250*b*. The gaming device displays the message, "YOU HAVE A TRIGGERING EVENT. YOU HAVE BEEN AWARDED 5 FREE ACTIVATIONS." The spins remaining display 254 thus indicates that the player has five free spins remaining.

Figure 16B:
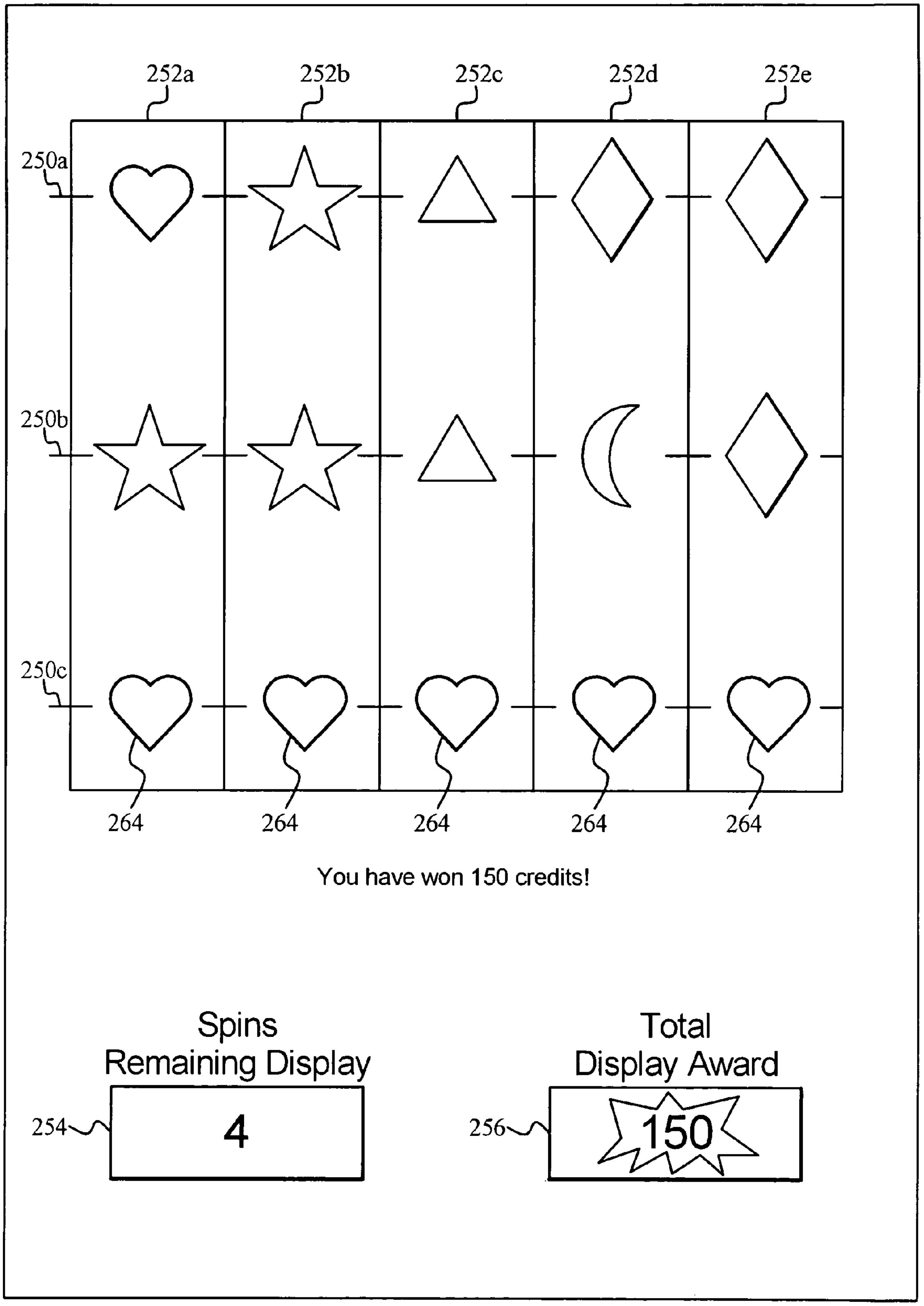

FIG. 16B depicts the reels after the first free activation which, in this example, reduced the number of remaining free activations to four, as indicated on the spins remaining display 254. This activation resulted in a winning combination of five heart symbols 264 which is associated with a an award of one-hundred fifty credits. It should be appreciated that any of the awards may be associated with any of the symbol combinations. In this example, the gaming device displays the message, "YOU HAVE WON 150 CREDITS!" The first of the five initial free activations did not result in a triggering event, thus the gaming device provides another one of the free activations.

Figure 16C:
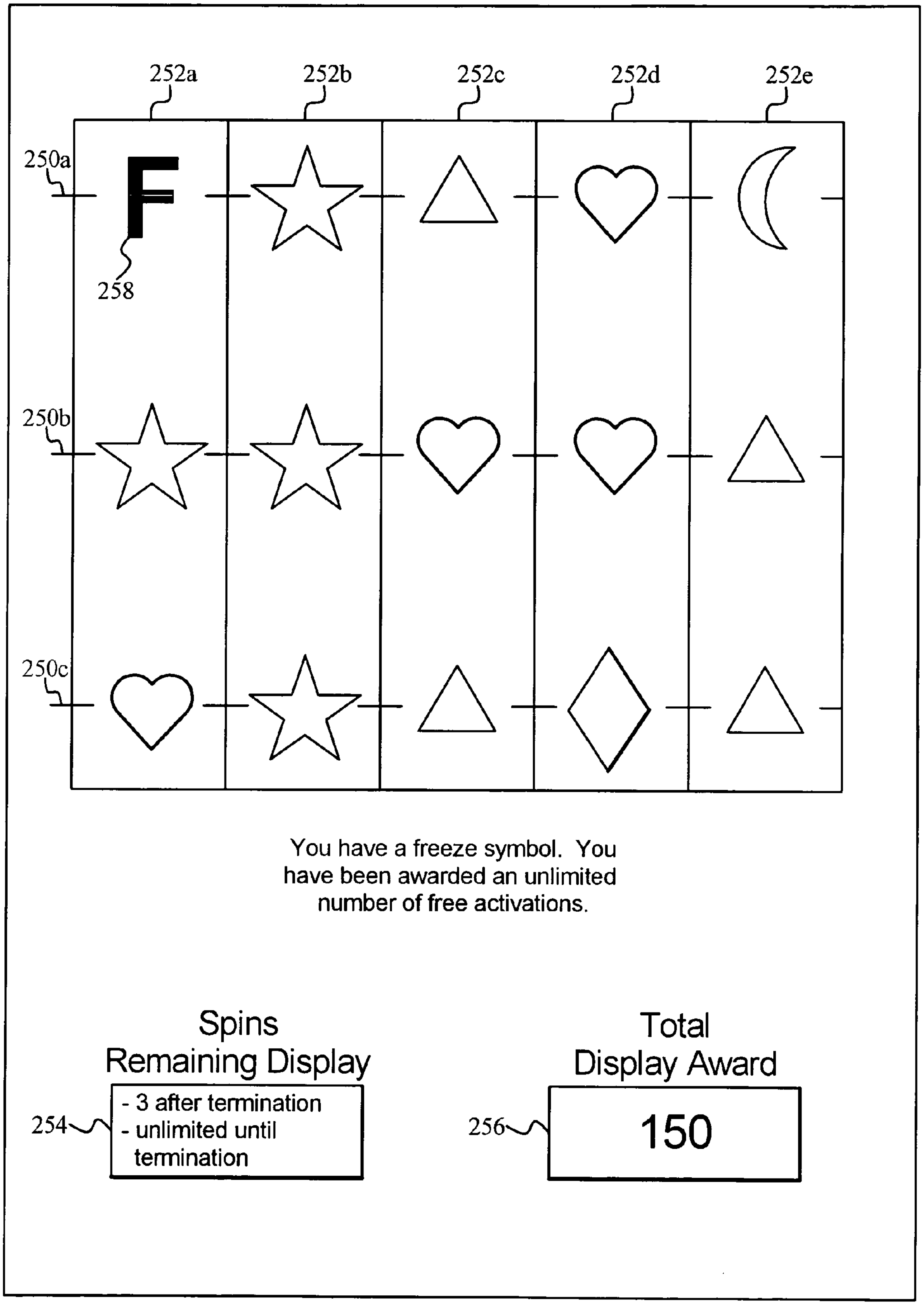

FIG. 16C depicts the reels after the gaming device provides the second one of the initial free activations. In this example, this free activation results in a freeze symbol 258 having a freezing function as described above. The gaming device thus initiates an unlimited number of additional free activations until the occurrence of a terminating event, as indicated on the spins remaining display 254.

Figure 16D:
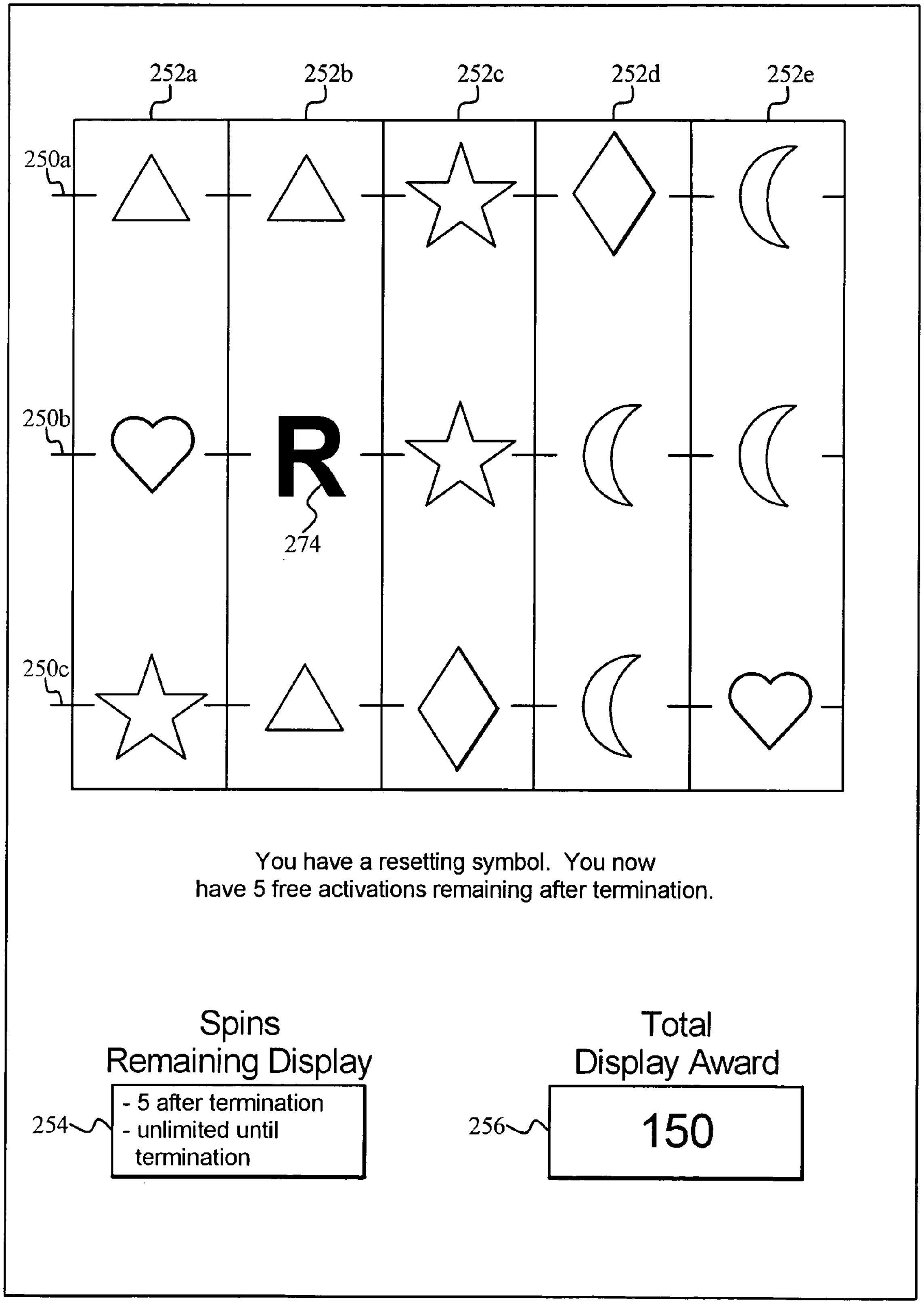

FIG. 16D illustrates the reels after one of the unlimited number of additional free activations. In this example, the resetting event (represented by the resetting symbol "R" 274) occurs in this additional free activation. It should be appreciated that the resetting event may cause the number of remaining free activations to change in any fashion according to a modifier, multiplier, other game event, or any suitable fashion as determined by the gaming device. Further, multiple resetting events may occur during the additional free activations. The occurrence of a second resetting event may cause, for example, the number of remaining free activations further increase or the gaming device may ascribe any other suitable function to that resetting event. In this example, the resetting event caused the gaming device to reset the number of remaining free activations to five (the initial number of free activations), as indicated on the spins remaining display 254. Thus, when the terminating event occurs the player receives five free activations. In the absence of the resetting event, the number of remaining free activations would have remained at three.

Although not illustrated, the gaming device continues to provide additional free activations until the occurrence of a terminating event, and after the terminating event, the gaming device provides the five free remaining free activations.

It should be appreciated that the embodiment(s) which include the locking of the reels can avoid player confusion by not generating the free spin symbol or freezing symbol prior to generating the terminating symbol or symbols.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

at least one display device;

at least one processor; and at least one memory device which stores a plurality of instructions, which when executed by the at least one processor, cause the at least one processor, upon a triggering event, to:

(a) provide an initial amount of free plays of a game, said game having a plurality of symbols, a plurality of winning symbols combinations, and a plurality of awards associated with the winning symbol combinations, wherein the initial amount is at least two;

(b) for each said free play of the game, provide any of the awards associated with winning symbol combinations which occur in said free play of the game;

(c) for each said free play of the game, reduce the number of remaining free plays of the game; and (d) if a freezing event occurs in any of said free plays of the game, provide additional free plays of the game:

(i) until a terminating event occurs;

(ii) without reducing the number of remaining free plays of the game, and (iii) for each said additional free play of the game, provide any awards associated with winning symbol combinations which occur in said additional free play of the game.

2. The gaming device of claim 1, wherein the triggering event must occur in a play of the game.

3. The gaming device of claim 1, which includes a resetting event, wherein the plurality of instructions, when executed by the at least one processor, cause the at least one processor to, if the resetting event occurs, reset the number of remaining free plays of the game to the initial amount of free plays of the game.

4. The gaming device of claim 1, which includes a resetting event, wherein the plurality of instructions, when executed by the at least one processor, cause the at least one processor to, if the resetting event occurs, reset the number of remaining free plays of the game to a number other than the initial amount of free plays of the game.

5. The gaming device of claim 1, which includes a locking event, wherein the plurality of instructions, when executed by the at least one processor, cause the at least one processor to, if the locking event occurs, lock at least one of the symbols for at least one of the free plays of the game.

6. The gaming device of claim 1, which includes a locking event wherein the plurality of instructions, when executed by the at least one processor, cause the at least one processor to, if the locking event occurs, lock at least one of the symbols for at least one of the additional free plays of the game.

7. The gaming device of claim 1, wherein the game includes a plurality of reels and the symbols are on the reels.

8. A gaming device comprising:

at least one display device;

at least one processor; and at least one memory device which stores a plurality of instructions, which when executed by the at least one processor, cause said at least one processor to operate with the at least one display device, upon a free activation mode triggering event, to:

(a) initiate a free activation mode of a game, said game including a plurality of symbols, a plurality of winning symbol combinations, and a plurality of awards associated with the winning symbol combinations;

(b) provide an initial amount of free activations of the game for said free activation mode, said initial amount being greater than one;

(c) generate a plurality of the symbols and decrease the number of remaining free activations of the game;

(d) display said generated plurality of the symbols;

(e) determine if any winning symbol combinations occur and display any awards associated with said winning symbol combinations;

(f) repeat (c) to (e) until a freezing event occurs or until the number of remaining free activations of the game reaches a designated number;

(g) if the freezing event occurs in the free activation mode:

(i) freeze the number of remaining free activations of the game;

(ii) generate a plurality of the symbols without decreasing the number of remaining free activations of the game;

(iii) display said generated plurality of the symbols;

(iv) determine if any winning symbol combinations occur and display any awards associated with said winning symbol combinations; and (v) repeat (ii) to (iv) until a terminating event occurs; and (iv) if a terminating event occurs and if the number of remaining free activations of the game has not reached the designated number, repeat (c) to (f); and (h) end the free activation mode if the number of remaining free activations reaches the designated number.

9. The gaming device of claim 8, wherein the free activation mode triggering event must occur in a play of the game.

10. The gaming device of claim 8, which includes a resetting event, wherein the plurality of instructions, when executed by the at least one processor, cause the at least one processor to operate with the at least one display device to, if the resetting event occurs, reset the number of remaining free activations of the game to the initial amount of free activations of the game.

11. The gaming device of claim 8, which includes a resetting event, wherein the plurality of instructions, when executed by the at least one processor, cause the at least one processor to operate with the at least one display device to, if the resetting event occurs in the free activation mode, reset the number of remaining free activations of the game to a number other than the initial amount of free activations of the game.

12. The gaming device of claim 8, which includes a locking event, wherein the plurality of instructions, when executed by the at least one processor, cause the at least one processor to operate with the at least one display device to, if the locking event occurs, lock one of the symbols for at least one of the free space activations.

13. The gaming device of claim 8, wherein the game includes a plurality of reels and the symbols are on the reels.

14. A method of operating a gaming device, said method comprising:

(a) providing a play of a game upon a wager by a player;

(b) providing any awards associated with winning symbol combinations which occur in said play of the game;

(c) providing an initial amount of free plays of the game if a triggering event occurs, wherein the initial amount is at least two;

(d) for each said free play of the game, providing any awards associated with winning symbol combinations which occur in said free play of the game;

(e) for each said free play of the game, reducing the number of remaining free plays of the game; and (f) if a freezing event occurs in any of said free plays of the game, providing additional free plays of the game:

(i) until a terminating event occurs;

(ii) without reducing the number of remaining free plays of the game, and (iii) for each said additional free play of the game, providing any awards associated with winning symbol combinations which occur in said additional free play of the game.

15. The method of claim 14, wherein the triggering event must occur in the play of the game.

16. The method of claim 14, which includes resetting the number of remaining free plays of the game to the initial amount of free plays of the game if a resetting event occurs.

17. The method of claim 14, which includes resetting the number of remaining free plays of the game to a number other than the initial amount of free plays if the game of a resetting event occurs.

18. The method of claim 14, which includes locking at least one of the symbols for at least one of the free plays of the game if a locking event occurs.

19. The gaming device of claim 14, which includes locking at least one of the symbols for at least one of the additional free plays of the game if a locking event occurs.

20. The method of claim 14, which includes displaying the symbols on a plurality of reels.

21. The method of claim 14, which is provided through a data network.

22. The method of claim 21, wherein the data network is an internet.

23. A method of operating a gaming device, said method comprising:

(a) initiating a free activation mode of a game if a free activation mode triggering event occurs, wherein the free activation mode has an initial amount of free activations, the initial amount being greater than one;

(b) generating a plurality of symbols and decreasing the number of remaining free activations of said free activation mode;

(c) causing at least one display device to display said generated plurality of symbols;

(d) determining if any winning symbol combinations occur and displaying any awards associated with said winning symbol combinations;

(e) repeating (b) to (d) until a freezing event occurs in the free activation mode or until the number of remaining free activations reaches a designated number;

(f) if a freezing event occurs in the free activation mode:

(i) freezing the number of remaining free activations;

(ii) generating another plurality of symbols without decreasing the number of remaining free activations;

(iii) causing the at least one display device to display said generated plurality of symbols;

(iv) determining if any winning symbol combinations occur and displaying any awards associated with said winning symbol combinations;

(v) repeating (ii) to (iv) until a terminating event occurs; and (vi) if a terminating event occurs and if the number of remaining free activations has not reached the designated number, repeating (b) to (e); and (g) ending the free activation mode if the number of remaining free activations reaches the designated number.

24. The method of claim 23, which includes resetting the number of remaining free activations to the initial amount of free activations if a resetting event occurs in the free activation mode.

25. The method of claim 23, which includes resetting the number of remaining free activations to a number other than the initial amount of free activations if a resetting event occurs in the free activation mode.

26. The method of claim 23, which includes locking one of the symbols for at least one of the free activations if a locking event occurs.

27. The method of claim 23, which includes causing the at least one display device to display the symbols on a plurality of reels.

28. The method of claim 23, which is provided through a data network.

29. The method of claim 28, wherein the data network is an internet.

* * * * *

UNITED STATES PATENT AND TRADEMARK OFFICE

CERTIFICATE OF CORRECTION

PATENT NO. : 7,682,246 B2
APPLICATION NO. : 11/217182
DATED : March 23, 2010
INVENTOR(S) : Cregan et al.

It is certified that error appears in the above-identified patent and that said Letters Patent is hereby corrected as shown below:

IN THE CLAIMS:

In Claim 8, Column 34, line 30, delete “and”.

Signed and Sealed this

Twenty-first Day of December, 2010

David J. Kappos
*Director of the United States Patent and Trademark Office*